(12) United States Patent
Filter et al.

(10) Patent No.: US 12,165,116 B2
(45) Date of Patent: Dec. 10, 2024

(54) ASSIGNABLE TOKEN BACKED REAL-TIME DIGITAL ASSET EXCHANGE

(71) Applicant: Flexa Inc., New York, NY (US)

(72) Inventors: Trevor Filter, New York, NY (US);
Zachary Kilgore, Brooklyn, NY (US);
Robert Leshner, New York, NY (US);
Tyler Robert Spalding, New York, NY (US)

(73) Assignee: Flexa Inc., New York, NY (US)

( * ) Notice: Subject to any disclaimer, the term of this patent is extended or adjusted under 35 U.S.C. 154(b) by 39 days.

(21) Appl. No.: 17/809,442

(22) Filed: Jun. 28, 2022

(65) Prior Publication Data

US 2022/0351163 A1 Nov. 3, 2022

Related U.S. Application Data

(63) Continuation of application No. 17/204,665, filed on Mar. 17, 2021, now Pat. No. 11,568,376, which is a
(Continued)

(51) Int. Cl.
*G06Q 20/10* (2012.01)
*G06F 16/27* (2019.01)
(Continued)

(52) U.S. Cl.
CPC .......... *G06Q 20/102* (2013.01); *G06F 16/27* (2019.01); *G06Q 10/10* (2013.01);
(Continued)

(58) Field of Classification Search
None
See application file for complete search history.

(56) References Cited

U.S. PATENT DOCUMENTS 10,540,639 B2    1/2020   Brock
11,308,487 B1*   4/2022   Foster ............... G06Q 20/3829
(Continued)

FOREIGN PATENT DOCUMENTS

CN          115699000 A   *  2/2023   ............. G06Q 20/36
WO    WO-2020097115 A1   *  5/2020   ......... G06F 21/6209

OTHER PUBLICATIONS

Google Patents English Language Translation of CN-115699000-A. https://patents.google.com/patent/CN115699000A/en?oq=CN-115699000-A (Year: 2023).*
(Continued)

*Primary Examiner* — Ayal I. Sharon
(74) *Attorney, Agent, or Firm* — Garlick & Markison; Patricia M. Healy

(57) ABSTRACT

A method includes sending, by a trader computing device, an amount of a first digital asset to a digital asset exchange device for an exchange of the amount of the first digital asset to an amount of a second digital asset. The trader computing device includes a trader wallet that stores assignable tokens. The method further includes determining to assign conditional access rights to an amount of the assignable tokens to the digital asset exchange device to back the exchange, locking the amount of the assignable tokens, and providing the conditional access rights to the amount of the assignable tokens to the digital asset exchange device. The method further includes exchanging, by the digital asset exchange device, the amount of the first digital asset to the amount of the second digital asset and sending the amount of the second digital asset to the trader computing device.

20 Claims, 31 Drawing Sheets assignable token balance distribution 124

Related U.S. Application Data continuation-in-part of application No. 17/014,624, filed on Sep. 8, 2020, now abandoned.

(51) Int. Cl.

| | |
|---|---|
| *G06Q 10/10* | (2023.01) |
| *G06Q 20/06* | (2012.01) |
| *G06Q 20/12* | (2012.01) |
| *G06Q 20/36* | (2012.01) |
| *G06Q 20/38* | (2012.01) |
| *G06Q 30/018* | (2023.01) |
| *G06Q 40/03* | (2023.01) |
| *G06Q 40/04* | (2012.01) |
| *G06Q 50/18* | (2012.01) |
| *H04L 9/32* | (2006.01) |

(52) U.S. Cl.
CPC ..... *G06Q 20/0655* (2013.01); *G06Q 20/1235* (2013.01); *G06Q 20/3674* (2013.01); *G06Q 20/3676* (2013.01); *G06Q 20/3678* (2013.01); *G06Q 20/389* (2013.01); *G06Q 30/0185* (2013.01); *G06Q 40/03* (2023.01); *G06Q 40/04* (2013.01); *G06Q 50/184* (2013.01); *H04L 9/3213* (2013.01); *G06Q 2220/00* (2013.01); *H04L 2209/56* (2013.01)

(56) References Cited

U.S. PATENT DOCUMENTS

| | | | | |
|---|---|---|---|---|
| 2006/0101130 | A1* | 5/2006 | Adams | H04L 61/00 709/218 |
| 2010/0235284 | A1* | 9/2010 | Moore | G06Q 20/401 709/204 |
| 2010/0235286 | A1* | 9/2010 | Moore | G06Q 20/3821 705/26.1 |
| 2010/0235882 | A1* | 9/2010 | Moore | H04L 63/168 709/219 |
| 2014/0164251 | A1* | 6/2014 | Loh | G06Q 20/065 705/67 |
| 2016/0292680 | A1* | 10/2016 | Wilson, Jr. | G06Q 40/06 |
| 2017/0123992 | A1* | 5/2017 | Bradbury | G06F 12/0828 |
| 2018/0285863 | A1* | 10/2018 | Loh | G06Q 20/0655 |
| 2018/0349478 | A1 | 12/2018 | Carlisle | |
| 2019/0066206 | A1* | 2/2019 | Marks | G06Q 40/06 |
| 2019/0080407 | A1* | 3/2019 | Molinari | G06Q 20/06 |
| 2019/0197622 | A1* | 6/2019 | Molinari | G06Q 20/065 |
| 2020/0042989 | A1* | 2/2020 | Ramadoss | G06Q 20/065 |
| 2020/0090143 | A1 | 3/2020 | Lervolino | |
| 2020/0184431 | A1 | 6/2020 | Sinmao | |
| 2020/0184556 | A1 | 6/2020 | Cella | |
| 2020/0265426 | A1* | 8/2020 | Furche | G06Q 20/3829 |
| 2020/0294128 | A1 | 9/2020 | Cella | |
| 2020/0294133 | A1 | 9/2020 | Cella | |
| 2020/0334752 | A1* | 10/2020 | Doney | G06Q 20/3672 |
| 2020/0380090 | A1 | 12/2020 | Marion | |
| 2020/0394709 | A1* | 12/2020 | Cella | G06Q 40/08 |
| 2021/0073913 | A1* | 3/2021 | Ingargiola | G06Q 20/02 |
| 2021/0082044 | A1 | 3/2021 | Sliwka | |
| 2021/0217001 | A1 | 7/2021 | Harrison | |
| 2021/0248594 | A1 | 8/2021 | Yantis | |
| 2021/0248694 | A1 | 8/2021 | Tian | |
| 2021/0342836 | A1 | 11/2021 | Cella | |
| 2022/0076331 | A1* | 3/2022 | Filter | G06Q 20/3276 |
| 2022/0076334 | A1* | 3/2022 | Filter | G06Q 20/12 |
| 2022/0374990 | A1* | 11/2022 | Doney | G06Q 20/02 |
| 2023/0011788 | A1* | 1/2023 | Wong | G06Q 20/40145 |

OTHER PUBLICATIONS

Balazs Bodó et al. "Blockchain and smart contracts: the missing link in copyright licensing?". International Journal of Law and Information Technology, vol. 26, Issue 4, Sep. 25, 2018, pp. 311-336, https://doi.org/10.1093/ijlit/eay014 (Year: 2018).

Bowen Liu et al. "SMACS: Smart Contract Access Control Service". Mar. 17, 2020. https://arxiv.org/pdf/2003.07 495.pdf (Year: 2020).

CleanApp. "'Self-Enforcing' Contracts Don't Exist". Oct. 29, 2019. https ://medium .com/cryptolawreview/the-myth-of-self-enforcing-contracts-973b467399b 7 (Year: 2019).

Khaledi, Hamed. "E-Constitutions: Conceptualization, Theory, Design Model and Experimental Evaluations". Michigan State Univ. ProQuest Dissertations Publishing, 2018. Number 10792537. https://www.proquest.com/openview/bfb9c14e6c38bef5a 1 b5cf023000797e/1 ?pq-origsite=gscholar&cbl=18750 (Year: 2018).

Michele Finck & Valentina Moscon. "Copyright Law on Blockchains: Between New Forms of Rights Administration and Digital Rights Management 2.0". Int'l Rev. of Intellectual Property and Competition Law. vol. 50, pp. 77-108 (2019). https:// link.springer.com/article/10.1007/s40319-018-00776-8 (Year: 2019).

Tudor Cioara et al. "Self-enforcing smart contracts for DR tracking and control". Tech. Univ. of Cluj-Napoca, eDREAM Consortium. May 17, 2019. https ://ec. europa. eu/research/partici pants/documents/down load Pu bl i c?docu mentlds=080166e5c486ed 3 7 &app Id= PPG MS (Year: 2019).

\* cited by examiner

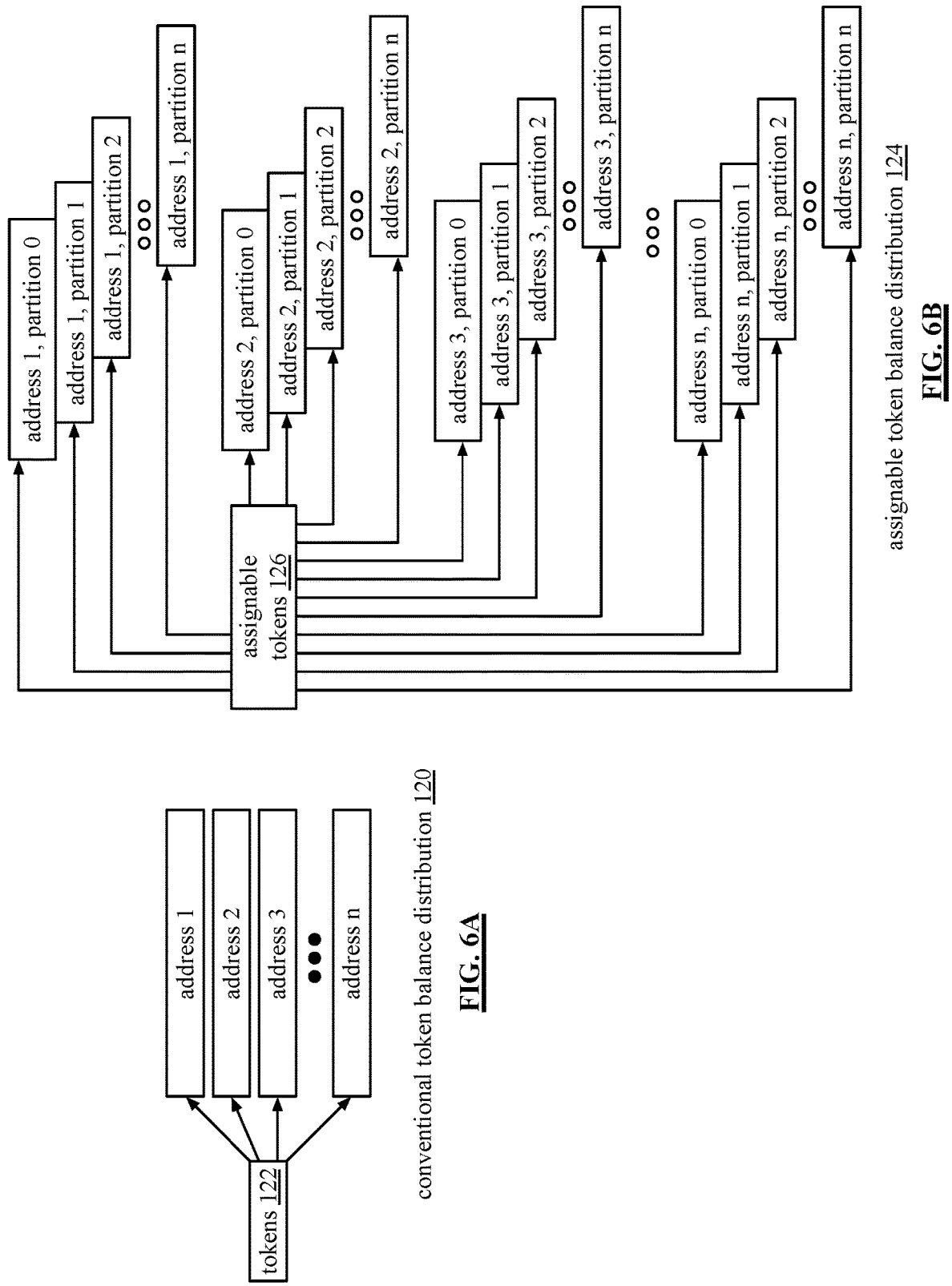

| Address | Balance |
|---|---|
| address 1 | 100 |
| address 2 | 200 |
| address 3 | 300 | conventional token balance distribution 128

FIG. 7A

| Address | Partition | partition 0 | partition 1 | partition 2 |
|---|---|---|---|---|
| address 1 | | 0 | 50 | 50 |
| address 2 | | 100 | 100 | 0 |
| address 3 | | 300 | 0 | 0 | assignable token balance distribution 130

FIG. 7B

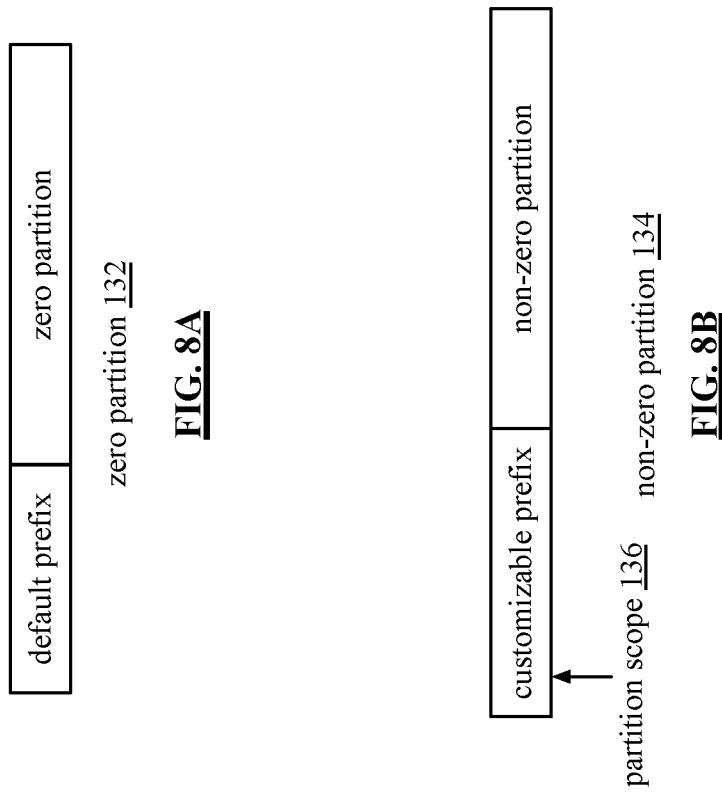

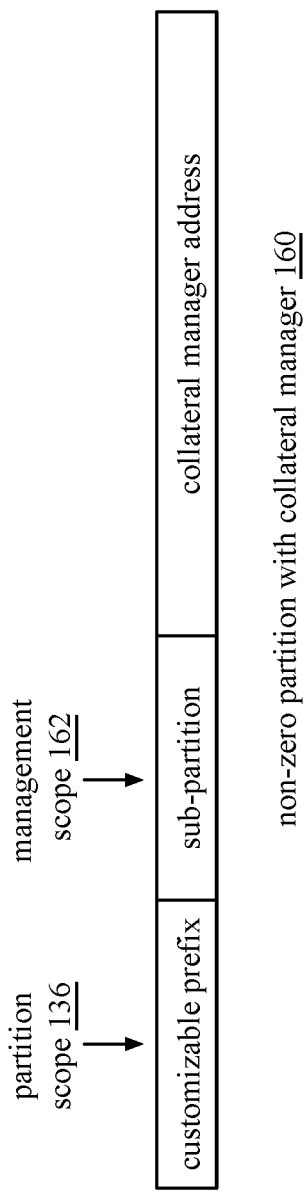

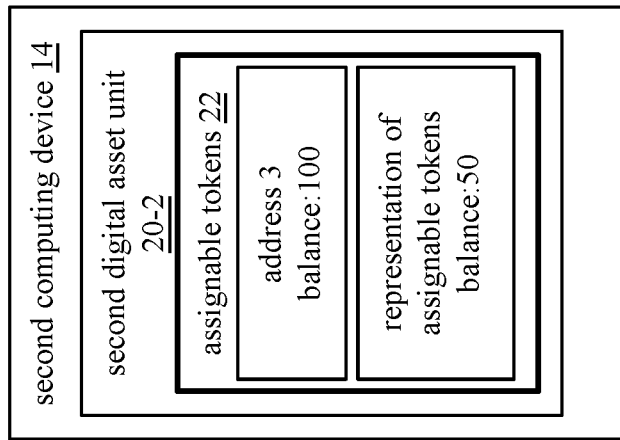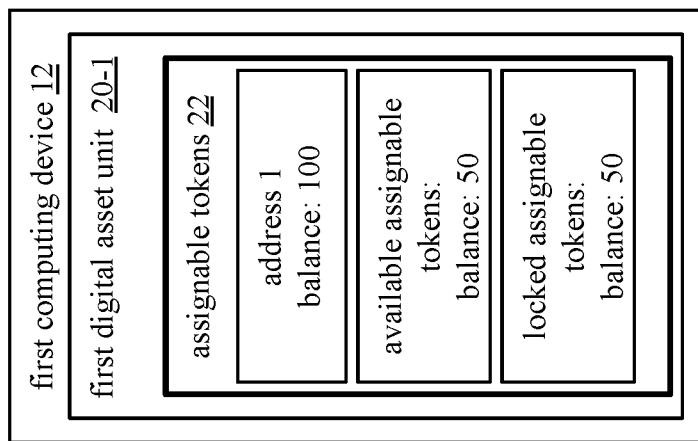
FIG. 11 cryptocurrency payment system 54

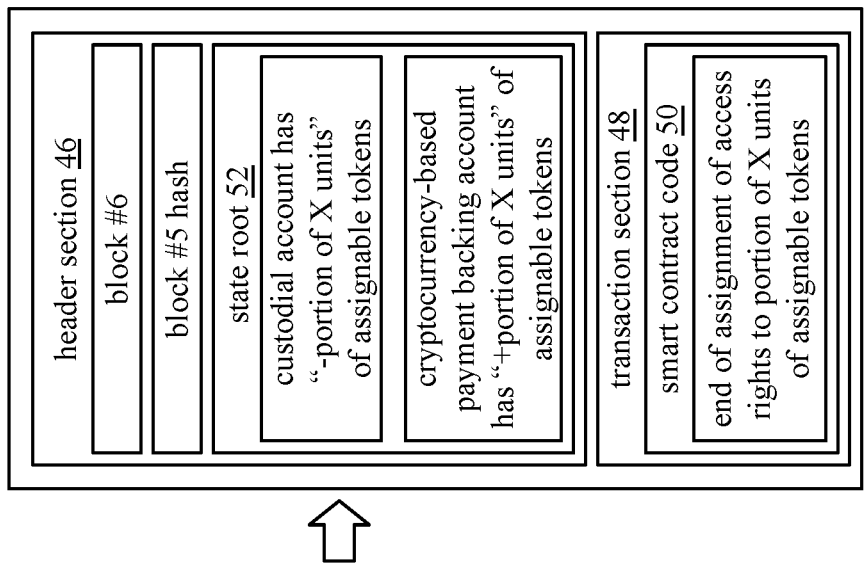

| Address \| Partition | partition 0 | partition 1 | address 4 controlled partition 2 | address 4 controlled partition 3 |
|---|---|---|---|---|
| address 1 | 0 | 50 | 50* | 0* |
| address 2 | 0 | 50 | 50* | 100* |
| address 3 | 200 | 0 | 0* | 100* |
| address 4 | 1000 | 0 | 0* | 0* |

← collateral manager 164

| Address \| Partition | partition 0 | partition 1 | address 4 controlled partition 2 | address 4 controlled partition 3 |
|---|---|---|---|---|
| address 1 | 0 | 50 | 75* | 0* |
| address 2 | 0 | 50 | 75* | 125* |
| address 3 | 200 | 0 | 0* | 125* |
| address 4 | 900 | 0 | 0* | 0* |

← collateral manager 164

| Address \| Partition | partition 0 | partition 1 | address 4 controlled partition 2 | address 4 controlled partition 3 |
|---|---|---|---|---|
| address 1 | 0 | 50 | 0* | 0* |
| address 2 | 0 | 50 | 0* | 0* |
| address 3 | 200 | 0 | 0* | 0* |
| address 4 | 1000 | 0 | 100* | 200* |

← collateral pool manager 166

FIG. 19

| Address \| Partition | partition 0 | partition 1 | address 4 controlled partition 2 | address 4 controlled partition 3 |
|---|---|---|---|---|
| address 1 | 0 | 50 | 0* | 0* |
| address 2 | 0 | 50 | 0* | 0* |
| address 3 | 200 | 0 | 0* | 0* |
| address 4 | 900 | 0 | 150* | 250* |

← collateral pool manager 166

FIG. 20

ASSIGNABLE TOKEN BACKED REAL-TIME DIGITAL ASSET EXCHANGE

CROSS-REFERENCE TO RELATED APPLICATIONS

The present U.S. Utility Patent Application claims priority pursuant to 35 U.S.C. § 120 as a continuation of U.S. Utility application Ser. No. 17/204,665 entitled "ASSIGNMENT OF CONDITIONAL ACCESS RIGHTS TO ASSIGNABLE TOKENS BASED ON AN INTERACTION," filed Mar. 17, 2021, which claims priority pursuant to 35 U.S.C. § 120 as a continuation-in-part of U.S. Utility application Ser. No. 17/014,624, entitled "ASSIGNMENT OF CONDITIONAL ACCESS RIGHTS TO ASSIGNABLE TOKENS BASED ON AN INTERACTION," filed Sep. 8, 2020, now abandoned, all of which are hereby incorporated herein by reference in their entirety and made part of the present U.S. Utility Patent Application for all purposes.

STATEMENT REGARDING FEDERALLY SPONSORED RESEARCH OR DEVELOPMENT

Not Applicable.

INCORPORATION-BY-REFERENCE OF MATERIAL SUBMITTED ON A COMPACT DISC

Not Applicable.

BACKGROUND OF THE INVENTION

Technical Field of the Invention

This invention relates generally to the management and storage of digital assets and more particularly to assignment of conditional access rights to an assignable token digital asset.

Description of Related Art

Digital assets are digitally stored content that comes with a right to use. As a few examples, digital assets include images, audio, videos, documents (e.g., contracts, legal documents, etc.), cryptocurrency, cryptocurrency tokens, stocks, and intellectual property rights.

Distributed ledger technology (DLT) is a digital system that provides a consensus of replicated, shared, and synchronized digital data spread across several nodes. Unlike traditional databases, DLTs lack central authority. The nodes of a DLT implement a consensus protocol to validate the authenticity of transactions recorded in the ledger.

A blockchain is a type of DLT consisting of a continuously growing list of blocks (i.e., groups of transactions) that are securely linked, continually reconciled, and shared among all network participants (i.e., a decentralized network). Transactions are validated and added to blocks via hashing algorithms, and then permanently written to the chain via consensus of the entire network. Once recorded on the blockchain, transactions cannot be altered.

A smart contract is a self-enforcing agreement embedded in computer code that can be managed by distributed ledger technology such as a blockchain. A smart contract contains a set of conditions under which the parties to the smart contract agree to interact. The code and the conditions are publicly available on the ledger. When an event outlined in the contract is triggered, the code executes. Ethereum is a blockchain built for creating smart contracts. Ethereum smart contracts execute a series of instructions written using the programming language "solidity" which works on the basis of IFTTT (IF-THIS-THEN-THAT) logic. For example, if the first set of instructions are complete, then execute the next set of instructions, and repeat until the end of the contract.

A cryptocurrency is a digital asset that is securely created and transferred via cryptography. Many cryptocurrencies are distributed networks based on distributed ledger technology (e.g., a blockchain). Decentralized networks like Bitcoin use pseudo-anonymous transactions that are open and public (i.e., anyone can join, create, and view transactions). To minimize fraudulent activity and deter malicious network activity, cryptocurrency transactions can be recorded by "miners" using "proof of work" secure hashing algorithms (SHA-256) that require significant computing power. A cryptocurrency token is a digital asset that exists on an existing cryptocurrency (e.g., an existing cryptocurrency's blockchain).

While many cryptocurrencies are blockchain based, other distributed ledger technologies may be used. For example, asynchronous consensus algorithms enable a network of nodes to communicate with each other and reach consensus in a decentralized manner. This method does not need miners to validate transactions and uses directed acyclic graphs for time-sequencing transactions without bundling them into blocks.

BRIEF DESCRIPTION OF THE SEVERAL VIEWS OF THE DRAWING(S)

FIGS. 6A-6B are schematic block diagrams of an embodiment of token balance distribution in accordance with the present invention;

FIGS. 7A-7B are schematic block diagrams of another embodiment of token balance distribution in accordance with the present invention;

FIGS. 8A-8B are schematic block diagrams of an embodiment of assignable token partitions in accordance with the present invention;

FIGS. 10A-10B are schematic block diagrams of an embodiment of a collateral manager partition strategy in accordance with the present invention;

FIG. 11 is a schematic block diagram of an embodiment of a collateral manager partition strategy in accordance with the present invention;

FIGS. 16A-16E are schematic block diagrams of an embodiment of an assignable token blockchain in accordance with the present invention;

FIG. 19 is a schematic block diagram of an embodiment of an assignable token balance distribution with a collateral pool manager in accordance with the present invention;

FIG. 20 is a schematic block diagram of an embodiment of an assignable token balance distribution with a pool-based staking rewards transfer in accordance with the present invention;

DETAILED DESCRIPTION OF THE INVENTION

Figure 1:
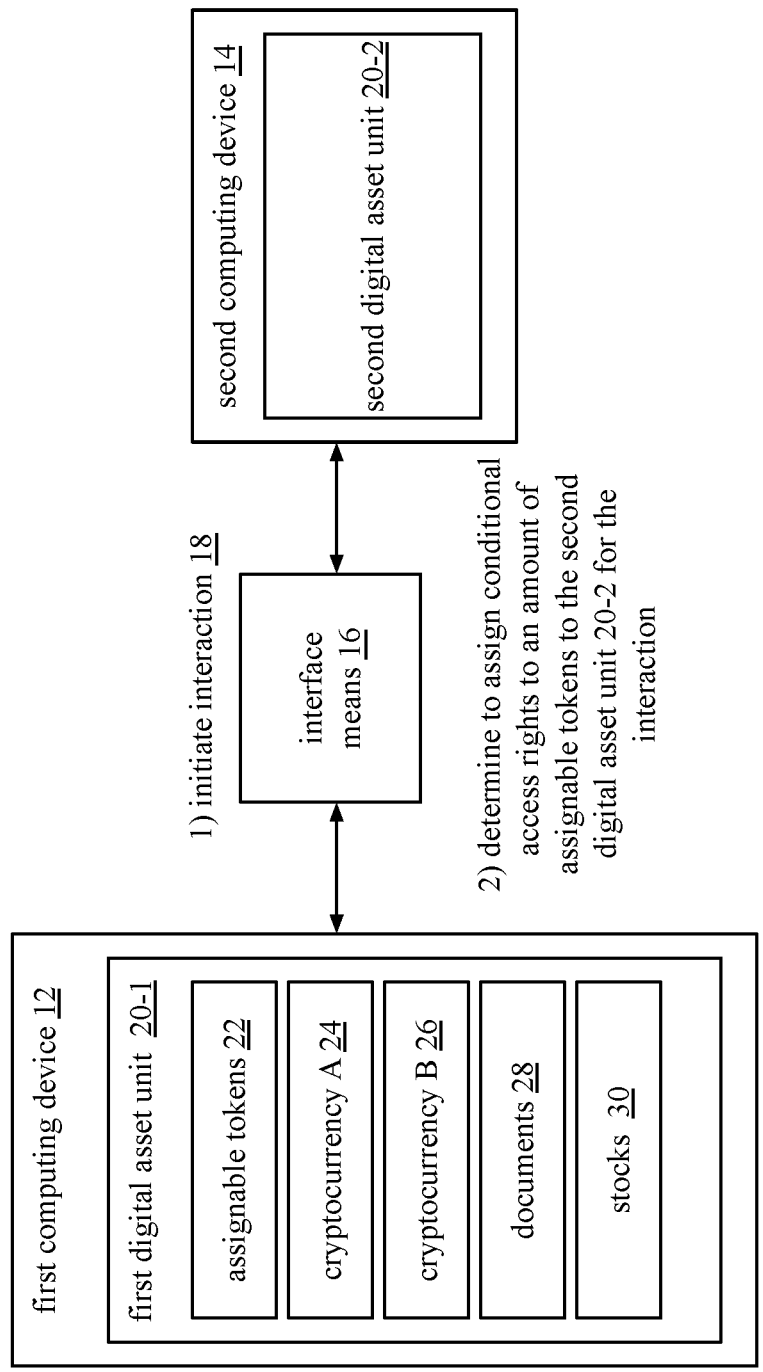
FIG. 1 is a flowchart of an example of a method of assigning conditional access rights to assignable tokens based on an interaction in accordance with the present invention.

FIG. 1 is a flowchart of an example of a method of assigning conditional access rights to assignable tokens based on an interaction 18. FIG. 1 includes a first computing device 12, a second computing device 14, and an interface means 16.

The first computing device 12 and the second computing device 14 may be portable computing devices and/or fixed computing devices. A portable computing device may be a social networking device, a gaming device, a cell phone, a smart phone, a digital assistant, a digital music player, a digital video player, a laptop computer, a handheld computer, a tablet, a video game controller, a portable merchant point-of-sale (POS) device (e.g., a mobile device with POS capabilities) and/or any other portable device that includes a computing core. A fixed computing device may be a computer (PC), a computer server, a cable set-top box, a satellite receiver, a television set, a printer, a fax machine, home entertainment equipment, a video game console, a fixed merchant point-of-sale (POS) device (e.g., cash register), and/or any type of home or office computing equipment.

The interface means 16 is one or more of: a direct link and a network connection. The direct link includes one or more of video, camera, infrared (IR), radio frequency (RF), barcode scanner, and/or near-field communication (NFC). The network connection includes one or more local area networks (LAN) and/or one or more wide area networks (WAN), which may be a public network and/or a private network. A LAN may be a wireless-LAN (e.g., Wi-Fi access point, Bluetooth, ZigBee, etc.) and/or a wired LAN (e.g., Firewire, Ethernet, etc.). A WAN may be a wired and/or wireless WAN. For example, a LAN is a personal home or business's wireless network and a WAN is the Internet, cellular telephone infrastructure, and/or satellite communication infrastructure.

The first computing device 12 includes a first digital asset unit 20-1 and the second computing device 14 includes a second digital asset unit 20-1. The first and second digital asset units 20-1 and 20-2 are applications installed on the first and second computing devices 12-14 that function to store and manage (e.g., buy, sell, trade, custody, etc.) digital assets. For example, a digital asset unit may be a custodial digital wallet associated with a digital asset management company (e.g., a digital asset holding and management company, a cryptocurrency holding company, a cryptocurrency holding and exchange company, etc.).

Alternatively, the digital asset unit may be a non-custodial digital wallet where the non-custodial digital wallet stores digital assets and the computing device manages the private key to the non-custodial digital wallet. Alternatively, the digital asset unit is a network enabled smart contract application. A network enabled smart contract application allows a user to upload digital assets to a network enabled smart contract using a private key (e.g., non-custodial) and eliminates double spending issues associated with non-custodial wallets. The first and second digital asset units may be the same or different type of digital asset unit, but both must be operable to hold assignable tokens 22 and any other digital assets required for the interaction 18.

In an alternative embodiment, the second computing device 14 does not include an appropriate digital asset unit (e.g., the second digital asset unit 20-2 is not operable to receive and/or hold assignable tokens). When an interaction 18 is initiated (or when an assignment of conditional access rights to assignable tokens is initiated and/or requested), the second computing device 14 is prompted to download an appropriate digital asset unit for the interaction 18 (e.g., a digital asset unit operable to receive and/or hold assignable tokens 22 and any other digital assets required for the interaction 18).

As shown, the first digital asset unit 20-1 stores and manages a variety of digital assets including assignable tokens 22, cryptocurrency A 24, cryptocurrency B 26, documents 28 (e.g., legal documents, contracts, etc.), and stocks 30. Digital assets are digitally stored content with a right to use. Examples of digital assets include images, audio, videos, documents (e.g., contracts, legal documents, etc.), cryptocurrency, cryptocurrency tokens (or simply "tokens"), stocks, intellectual property rights, etc. Cryptocurrency is a digital asset that is securely created and transferred via cryptography. A token is a digital asset that exists on an existing cryptocurrency (e.g., an existing cryptocurrency's blockchain).

The assignable tokens 22 are smart contracts (also referred to herein as "self-enforcing smart contracts"). A smart contract is a self-enforcing agreement written in computer code that can be embedded in distributed ledger technology (DLT). For example, a blockchain such as the Ethereum blockchain is operable to manage, execute, and/or run smart contracts. A smart contract contains a set of conditions under which the parties to the smart contract agree to interact. The code and the conditions can be publicly or privately available on the ledger. When an event outlined in the smart contract is triggered, the code is executable (e.g., automatically or based on a data input instructing the code to execute).

The assignable tokens 22 are uniquely structured to be stored in one location (e.g., a first digital asset unit 20-1 address) associated with one party (e.g., the first computing device 12) but are controllable/accessible by another party (e.g., the second computing device 14) associated with a different location (e.g., a second digital asset unit 20-2) under certain conditions. For example, a partitioning scheme that enables a collateral manager to control assignable tokens across partitions allows one party to assign conditional access rights to the assignable tokens 22 to another party while maintaining custody of the assignable tokens 22. The partitioning scheme and collateral manager concept will be discussed in more detail with reference to FIGS. 6A-11 and FIGS. 17-20.

The method begins at step 1 where the first computing device 12 initiates an interaction 18 with the second computing device 14 via an interface means 16. The interaction 18 is any type of digital content (e.g., documents, digital payment, audio files, video files, etc.) transfer between the first and second computing devices 12-14 and may include one or more of: a payment transaction, signing a contract, transferring property, executing and/or providing a loan, and sharing information (e.g., confidential documents, legal documents, etc.).

For example, the first computing device 12 is a smart phone, the second computing device 14 is a fixed merchant POS device (e.g., a POS register), interface means 16 is NFC, and the interaction 18 is a payment transaction. As another example, the first computing device 12 is a smart phone, the second computing device 14 is an e-commerce platform, the interface means 16 is a network connection, and the interaction 18 is a payment transaction. For example, a smart phone uses an internet browser application (via cellular or wireless internet connection) to access the e-commerce platform to complete a purchase.

As another example, the first computing device 12 is a smart phone, the second computing device 14 is a smart phone, and the interface means 16 is a Bluetooth connection. For example, the smart phones connect using Bluetooth in order to send a payment from one smart phone to another when the interaction 18 is a payment transaction. As another example, the smart phones connect using Bluetooth in order to share digital information pertinent to the interaction 18 (e.g., a contract, a loan agreement, etc.).

As yet another example, the first computing device 12 is a smart phone, the second computing device 14 is a smart phone, and the interface means 16 is a cellular or wireless internet connection. For example, the smart phones are installed with a digital asset unit application operable to initiate a variety of interactions. One or more of the smart phones access the digital asset unit applications via cellular or Wi-Fi to initiate the interaction.

Initiating the interaction 18 may include establishing a connection via the interface means 16 as discussed above and may further include sharing information regarding initiating the interaction 18 such as identifying information (e.g., a computing device identifier (ID), personal information, etc.) and/or details of the interaction (e.g., an amount of payment, a desired digital asset for payment, a location to send information, a document related to the interaction, etc.).

The method continues with step 2 where one or more of the first and second computing devices 12-14 determines to assign conditional access rights to an amount of assignable tokens 22 to the second digital asset unit 20-2 for the interaction 18. Access rights include: a right to consume the amount of the assignable tokens 22 (e.g., the amount of the assignable tokens 22 are transferrable to the second digital asset unit 20-2 via an on-chain transaction upon a consume condition), a right to view a representation of the amount of assignable tokens 22, a right to lock/unlock at least a portion of the amount of assignable tokens 22 (e.g., to back other interactions), a right to assign at least a portion of the amount of assignable tokens 22, a right to transfer at least a portion of the amount of assignable tokens 22, a right to move at least a portion of the amount of assignable tokens 22, and/or a right to trade at least a portion of the amount of assignable tokens 22. A variety of other access rights are possible.

The assignment of the conditional access rights is in accordance with a set of conditions. The set of conditions include one or more release conditions and one or more consume conditions. Other conditions are possible. Detection of a release or a consume condition both end the assignment of the conditional access rights but in different ways. For example, a release removes the access rights provided and/or promised to the second digital asset unit 20-2 and makes the amount of assignable tokens 20 available for use by the first digital asset unit 20-1.

A consume condition is an event that allows the second digital asset unit 20-2 to consume (i.e., take) the amount of the assignable tokens. A consume condition may apply to all of the amount of assignable tokens or a portion thereof. Consuming the amount of the assignable tokens means that the amount of the assignable tokens is transferrable to an address associated with the second digital asset unit 20-2 (e.g., the amount of the assignable tokens are sent to the second computing device as an on-chain transaction) and that the first digital asset unit 20-1 no longer can access the amount of the assignable tokens. The transfer may occur automatically or in response to a data input that executes the transfer. Examples of types of release and consume conditions are discussed in more detail with reference to FIGS. 2-3B.

Assigning conditional access rights to an amount of assignable tokens 22 for the interaction 18 provides a level of trust and security to the interaction 18. For example, the assignment provides the second computing device 14 a promise that the amount of the assignable tokens is immediately transferrable to the second computing device 14 under certain conditions (e.g., the first computing device fails to pay the second computing device). Because the assignable tokens 22 are smart contract code, neither party to the interaction 18 is tasked with verifying the conditions of the assignment and/or having to conduct any additional actions related to the assignment (e.g., when conditions are met, the smart contract code is executable).

The determination to assign the conditional access rights may be based on the type of interaction 18. For example, the interaction 18 is a payment transaction that requires a collateral backing (e.g., it is a large payment, a future payment, a loan, the currency used in the payment takes time to verify (e.g., a cryptocurrency), etc.). Alternatively, the determination may be made based upon request of one or more of the first and second computing devices as part of initiating the interaction 18. For example, the assignment of the conditional access rights is offered by the first computing device to incentivize the second computing device to complete the interaction 18 in a certain way (e.g., by a certain time, to a certain degree of quality, for a particular price, etc.). As another example, the assignment of the conditional access rights is requested by the second computing device as assurance that the interaction can be trusted.

Figure 2:
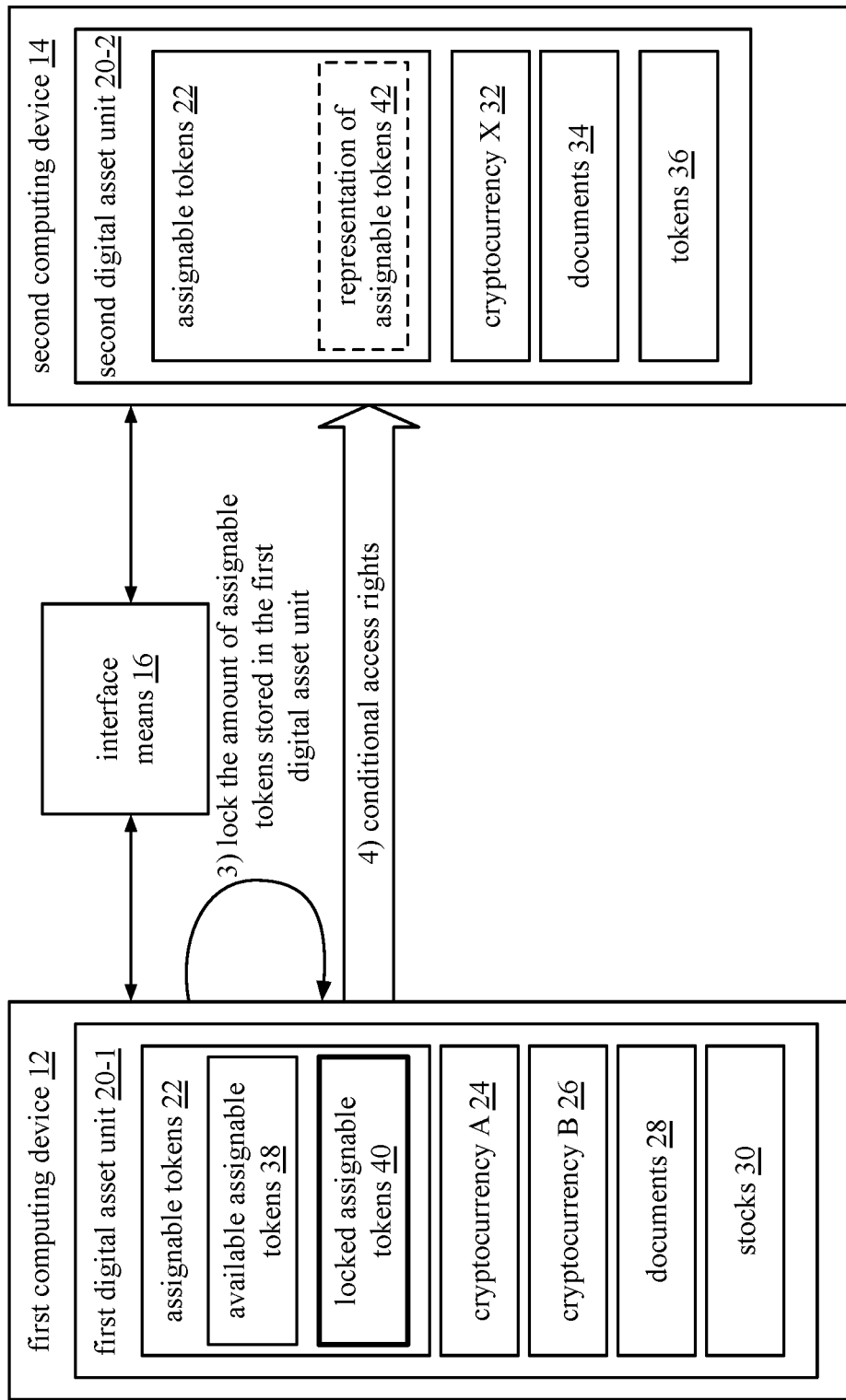
FIG. 2 is a flowchart of an example of a method of assigning conditional access rights to assignable tokens based on an interaction in accordance with the present invention.

FIG. 2 is a flowchart of an example of a method of assigning conditional access rights to assignable tokens based on an interaction. As shown, the second digital asset unit 20-2 is operable to store assignable tokens 22 and currently also stores cryptocurrency X 32, documents 34, and tokens 36. FIG. 2 continues the method of FIG. 1 with step 3 where, based on the determination to assign conditional access rights to the amount of assignable tokens to the second digital asset unit 20-2, the amount of assignable tokens stored in the first digital asset unit 20-1 are locked to the first digital asset unit 20-1.

In this example, the first digital asset unit 20-1 stores more assignable tokens 22 than the amount included in the assignment. Therefore, the first digital asset unit 20-1 has an amount of available assignable tokens 38 (e.g., assignable tokens that are not locked by the assignment) and the amount of locked assignable tokens 40 (e.g., assignable tokens that are locked by the assignment and shown in grey). However in a different embodiment, all of the assignable tokens in the first digital asset unit 20-1 may be locked for the assignment.

When locked, the first digital asset unit 20-1 has limited access to the locked assignable tokens 40 even though the locked assignable tokens 40 remain stored and owned by the first digital asset unit 20-1. Limited access means that the locked assignable tokens 40 are viewable by a user of the first digital asset unit 20-1 but any instruction by the first digital asset unit 20-1 to move, transfer, withdraw, sell, etc., the locked assignable tokens 40 would fail.

The method continues with step 4 where the first digital asset unit 20-1 provides the second digital asset unit 20-2 the conditional access rights to the amount of the assignable tokens in accordance with a set of conditions. Here, the conditional access rights provided include a right to take (e.g., via an on-chain transaction) the amount of assignable tokens upon a consume condition and a right to view a representation of the amount of assignable tokens 42 during the assignment. While the second digital asset unit 20-2 has conditional access rights to the amount of the assignable tokens 40, the second digital asset unit 20-2 does not actually store the amount of the assignable tokens 40 (e.g., a representation of the assignable tokens 42 is available to the second digital asset unit 20-2).

The set of conditions include one or more release conditions and one or more consume conditions. Detection of a release condition ends the assignment of the conditional access rights to the amount of assignable tokens. For example, upon a release condition, the second computing device no longer has conditional access rights to the amount of assignable tokens (e.g., a user of the second digital asset unit 20-2 can no longer view the amount of the assignable tokens) and the amount of assignable tokens are unlocked to the first digital asset unit 20-1.

A release condition may be the successful completion of the interaction 18, an authorized termination of the interaction 18 by either party, and/or a failed performance associated with the interaction 18. For example, if the assignment of conditional access rights to take an amount of assignable tokens is provided as a collateral backing to a payment transaction, a release condition may be a successful payment transaction. As another example, if the assignment of conditional access rights to take an amount of assignable tokens is provided as a collateral backing to a payment transaction, a release condition may be an authorized termination of the payment transaction by either the first or second computing device. For example, termination of the payment transaction may be authorized under certain circumstance (e.g., before a certain time, upon agreement by both parties, etc.).

As another example, if the assignment of conditional access rights to take an amount of assignable tokens is provided to the second computing device as an incentive to perform the interaction in a certain way (e.g., by a quality standard), a release condition may be a failed performance. For example, if the interaction is a service agreement and the service was not provided to a level of agreed upon quality, the release condition is met.

Detection of a consume condition allows for the second digital asset unit 20-2 to consume (i.e., take) the amount of the assignable tokens. Consume means that the amount of the assignable tokens is transferrable to the second digital asset unit 20-2 (e.g., as an on-chain transaction) and the amount of the assignable tokens is made inaccessible to the first digital asset unit 20-1. The amount of the assignable tokens may be automatically transferred to an address associated with the second digital asset unit 20-2 or transferred based upon a data input to execute the transfer. A consume condition may be an unsuccessful completion of the interaction, an unauthorized termination of the interaction by either party, and/or a successful performance associated with the interaction.

For example, if the assignment of conditional access rights to take an amount of assignable tokens is provided as a collateral backing to a payment transaction, a consume condition may be an unsuccessful payment (e.g., the payment is not received by a deadline, the payment is not the correct amount, the payment is declined, etc.). As another example, if the assignment of conditional access rights to take an amount of assignable tokens is provided as a collateral backing to a payment transaction, a consume condition may be an unauthorized termination of the payment transaction (e.g., the first computing device cancels the payment transaction).

As another example, if the assignment of conditional access rights is provided to the second computing device as an incentive to perform an interaction in a certain way (e.g., by a quality standard), a consume condition may be a successful performance. For example, if the interaction is a service agreement and the service was provided to a level of agreed upon quality, the consume condition is met.

The assignable token distributed ledger technology is operable to verify one or more aspects of the interaction in order to verify when conditions are met. For example, the smart contract code pertaining to the assignment on the assignable token distributed ledger technology includes the information related to the one or more aspects of the interaction. As an example, a contract pertaining to the interaction 18 is stored in the smart contract.

As another example, the smart contract code pertaining to the assignment on the assignable token distributed ledger technology receives one or more data inputs (e.g., other self-enforcing smart contracts) containing information related to the one or more aspects of the interaction. For example, when the assignment of conditional access rights is provided as a collateral backing to a payment transaction, a consume condition may specify a certain date for payment. If the payment is received successfully before or on the desired date, the consume condition is met.

Figure 3A:
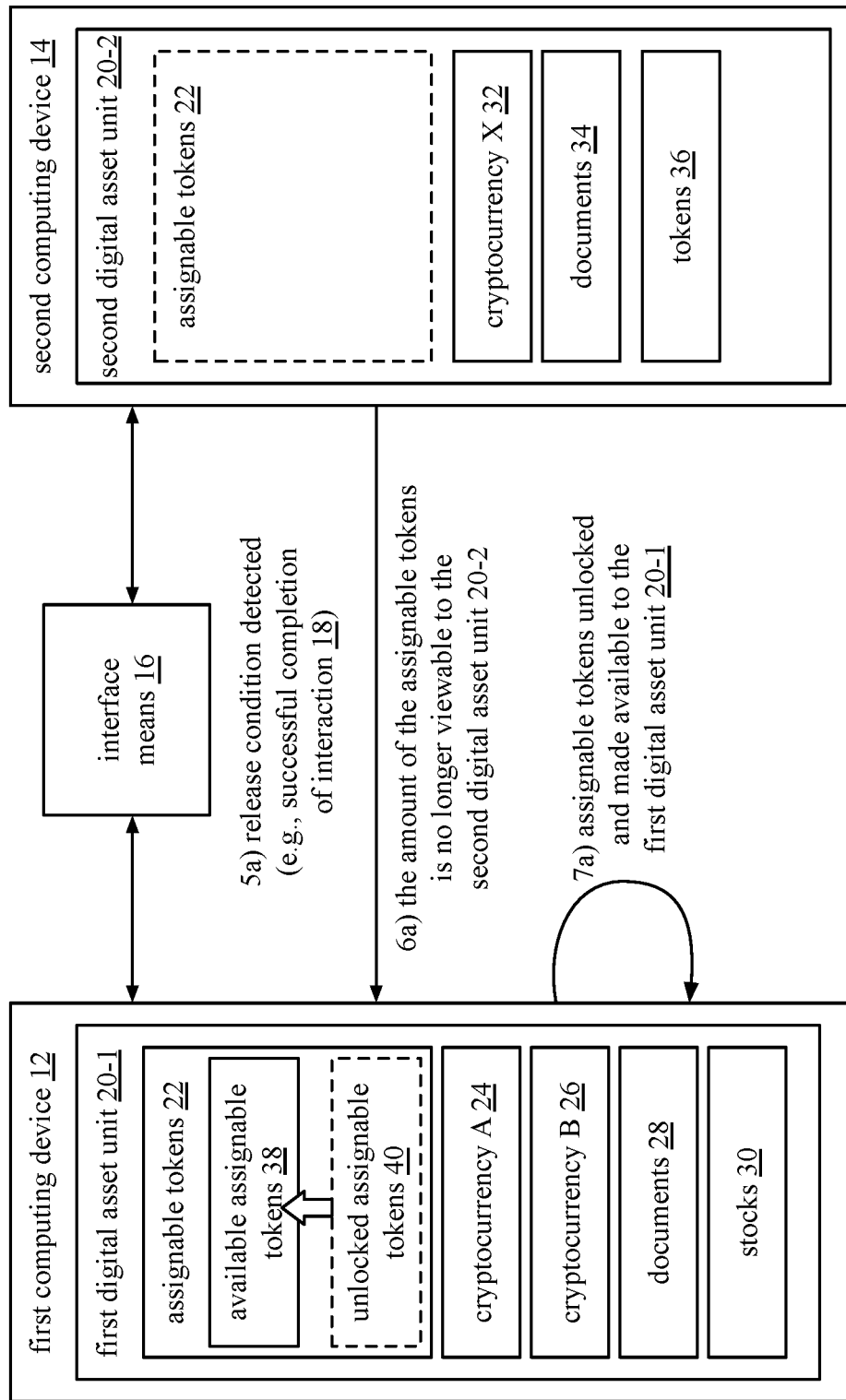
FIGS. 3A-3B are flowcharts of an example of a method of assigning conditional access rights to assignable tokens based on an interaction in accordance with the present invention.
Figure 3B:
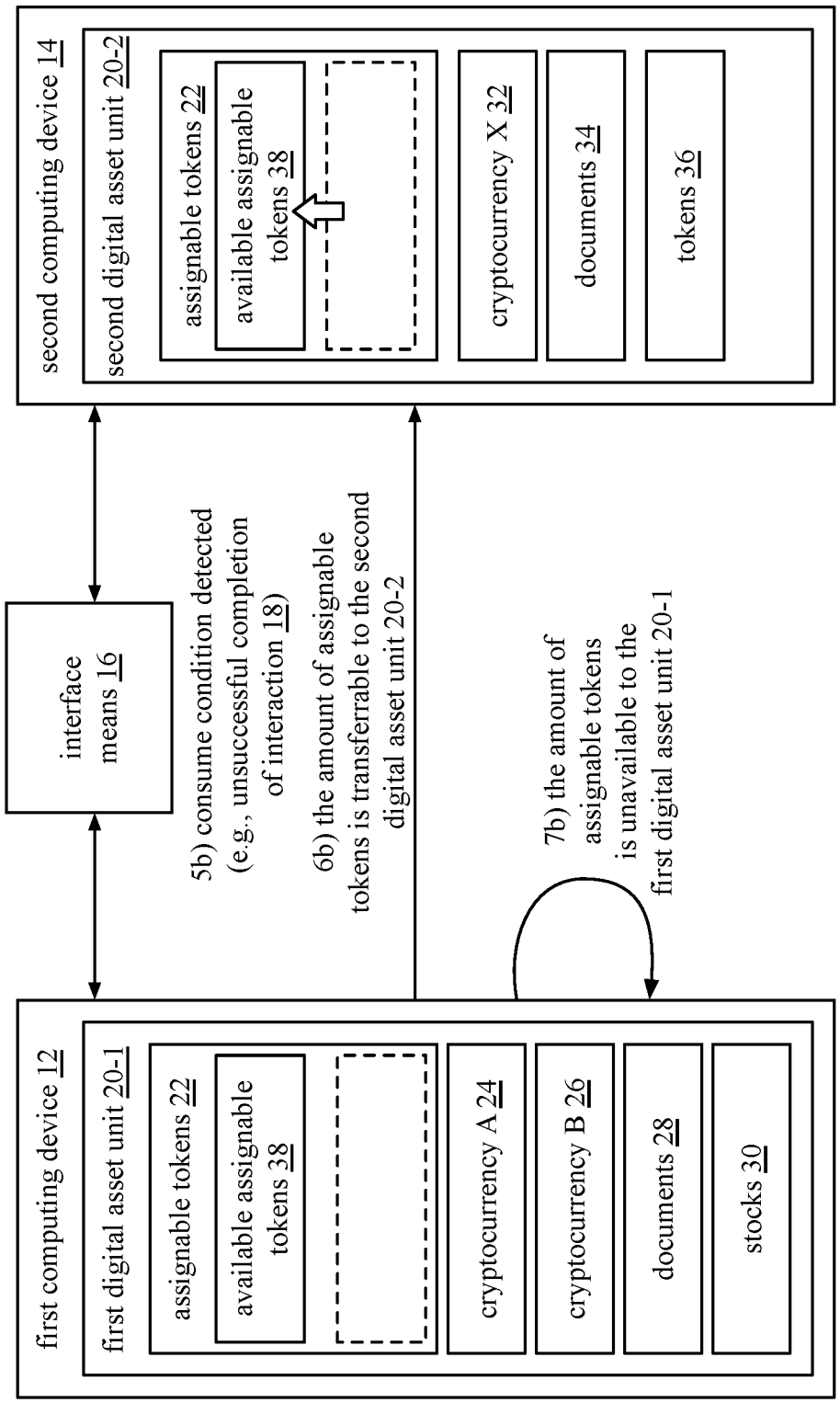

FIGS. 3A-3B are flowcharts of an example of a method of assigning conditional access rights to assignable tokens based on an interaction. FIG. 3A continues the method of FIGS. 1-2 and depicts an example where a release condition of the set of conditions occurs.

The assignable token distributed ledger technology is operable to verify one or more aspects of the interaction in order to verify when conditions occur. For example, the smart contract code pertaining to the assignment of the conditional access right to the amount of the assignable tokens includes information related to the one or more aspects of the interaction. As another example, the smart contract code pertaining to the assignment of the conditional access right to the amount of the assignable tokens receives one or more data inputs (e.g., other smart contracts) containing information related to one or more aspects of the interaction.

The method continues with step 5*a*) where a release condition is detected. For example, a release condition may be a successful completion of the interaction 18. The smart contract code includes definitions of what a successful completion of the interaction means and detects a release condition based on those definitions. For example, in a payment transaction, a successful completion of the interaction may include the second computing device 14 receiving funds from the first computing device 12 within a certain time period. The smart contract code managed by the assignable token distributed ledger technology may receive the funds and keep track of a deadline in order to detect when the release condition is met. Alternatively, the smart contract code managed by the assignable token distributed ledger technology receives another smart contract (or other data) as a data input verifying the successful payment to detect when the release condition is met.

As another example, when the interaction is signing a contract, a successful completion of the interaction may include receiving signatures within a certain time period. The smart contract code managed by the assignable token distributed ledger technology may include an executable contract where signatures are detectable and keep track of the deadline in order to detect when the release condition is met. Alternatively, the smart contract code managed by the assignable token distributed ledger technology receives another smart contract (or other data) as a data input that verifies the executed contract.

The method continues at step 6*a* where, upon detection of a release condition, the assignment of the conditional access rights ends and the amount of assignable tokens is no longer viewable to the second digital asset unit 20-2. The method continues at step 7*a* where, as part of the assignment of the conditional access rights ending, the amount of the assignable tokens is unlocked in the first digital asset unit 20-1 such that the amount of the assignable tokens is made available to the first digital asset unit 20-1 (e.g., the first digital asset unit 20-1 is able to move, transfer, sell, withdraw, etc., the amount of the assignable tokens). As such, a release involves ending the conditional access rights provided to the second digital asset unit 20-2 and making the amount of assignable tokens fully available to the first digital asset unit 20-1.

FIG. 3B continues the method of FIGS. 1-2 and depicts an example where a consume condition of the set of conditions occurs. The smart contract code of the assignable token distributed ledger technology is operable to verify one or more aspects of the interaction in order to detect the occurrence of conditions.

The method continues with step 5*b*) where a consume condition is detected. For example, a consume condition may be an unsuccessful completion of the interaction 18. The smart contract code includes definitions of what an unsuccessful completion of the interaction means and detects a consume condition based on those definitions. For example, in a payment transaction, an unsuccessful completion of the interaction may include the second computing device's 14 failure to receive funds from the first computing device 12 within a certain time period. The smart contract code managed by the assignable token distributed ledger technology may be operable to receive funds directly and keep track of a deadline in order to detect the consume condition. Alternatively, the smart contract code managed by the assignable token distributed ledger technology is operable to receive a data input (e.g., another smart contract) verifying the successful payment by a certain time. When the payment or payment notification is not received within the time frame, the interaction is deemed unsuccessful and thus, a consume condition is detected.

As another example, when the interaction is signing a contract, an unsuccessful completion of the interaction may include not receiving signatures within a certain time period or one party expressly rejecting the contract. A consume condition is detected when the smart contract code managed by the assignable token distributed ledger technology does not receive an executed contract by the deadline or receives a contract rejection notice. Alternatively, a consume condition may be detected when the smart contract code managed by the assignable token distributed ledger technology does not receive a data input including the executed contract by a deadline.

The method continues at step 6*b* where, when the consume condition is detected, the amount of the assignable tokens is transferrable to the second digital asset unit 20-2 via an on-chain transaction. The amount of assignable tokens may be transferred automatically to the second digital asset unit 20-2 or based on a data input instructing the transfer. As shown, the amount of assignable tokens have been transferred and the representation of the amount of assignable tokens in the second digital asset unit 20-2 is now shown as available assignable tokens 38 stored in the in the second digital asset unit 20-2.

The method continues at step 7*b* where the locked amount of the assignable tokens in the first digital asset unit 20-1 are no longer available to the first digital asset unit 20-1. As such, a consume involves allowing the second digital asset unit 20-2 to take the amount of the assignable tokens and rendering the amount of the assignable tokens unavailable to the first digital asset unit 20-1.

Figure 4:
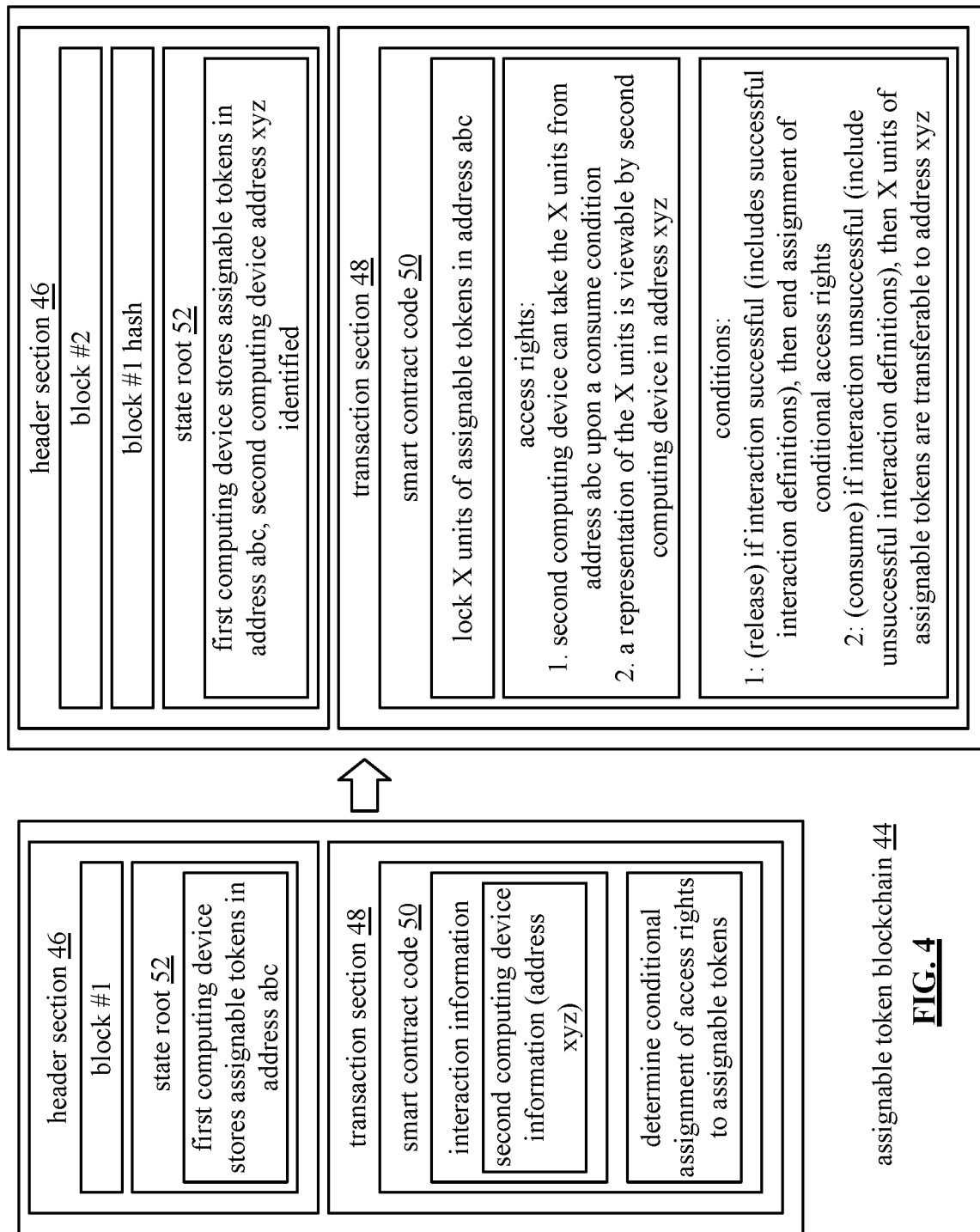
FIG. 4 is a schematic block diagram of an embodiment of an assignable token blockchain in accordance with the present invention.

FIG. 4 is a schematic block diagram of an embodiment of an assignable token blockchain 44. Assignable tokens are smart contracts written to a blockchain or similar database implementation, and executable by network users. For example, assignable tokens are smart contracts on the Ethereum blockchain. While a blockchain example is shown here, other distributed ledger technologies are possible to manage, run, and/or execute the assignable token smart contract code. When an event outlined in the smart contract is triggered, the code is executable. Therefore, a smart contract runs exactly as programmed without any possibility of censorship, downtime, fraud, or third party interference.

The Ethereum blockchain is a distributed blockchain network that is able to run programming code of any decentralized application through the use of Turing complete software. The assignable token blockchain 44 shown is based on a simplified version of an Ethereum blockchain. An Ethereum block includes a header section 46 and a transaction section 48. The structure of the Ethereum blockchain is similar to the structure of other traditional blockchains such as Bitcoin in that it is a shared record of the entire transaction history.

However, an Ethereum block stores not only transactions that have been collected since the last block in the blockchain was mined (like in Bitcoin) but also the recent "state" of each smart contract. A consensus network (i.e., a network of miners) is responsible for shifting the smart contract from state to state. The header section 46 includes these states in a root hash value (i.e., the state root 52) which summarizes the state changes. The header section 46 further includes other identifying information such as a block number and a hash of a previous block.

The transaction section 48 in Ethereum includes a nonce (a unique transaction identifier), an address of a recipient account, a value, a sending account's signature, code to be run (e.g., smart contract code 50), mining related fields (e.g., start gas and gas price), and possibly some data (e.g., input values for the code). Here, the transaction section 48 is shown as including the smart contract code 50 for simplicity.

FIG. 4 depicts an example of assigning conditional access rights to an amount of assignable tokens based on an interaction between a first and second computing device similar to the method discussed with reference to FIGS. 1-2. For simplicity, the assignment of the conditional access rights to the amount of assignable tokens begins with block #1 although numerous blocks would proceed this block. The header section 46 of block #1 includes a state root 52 which includes a current summary of the states of the accounts of the system.

Here, state root 52 includes an entry that the first computing device stores assignable tokens in an address "abc." The transaction section 48 of block #1 includes smart contract code 50 which includes code for interaction information (from a newly initiated interaction) and that the assignment of the conditional access rights to assignable tokens has been determined based on the initiation of the interaction. The interaction information may include either setting up an account address or locating an account address for the second computing device (e.g., address "xyz" in the second computing device's digital asset unit). As block #1 is mined, the smart contract code 50 of block #1 runs.

The header section 46 of block #2 includes a hash of block #1 and a state root 52. The state root 52 includes information pertaining to the current state of the assignable token accounts. For example, the state root 52 of block #2 states that the first computing device stores assignable tokens in address "abc" and that the second computing device account (e.g., address "xyz") has been identified (e.g., created or found based on initiating the interaction).

The transaction section 48 of block #2 includes smart contract code 50 which includes the terms of the assignment of the conditional access rights. For example, the smart contract code 50 states that X units of assignable tokens are locked in address "abc" and that the second computing device is provided conditional access rights to the X units in address "abc" (e.g., the access rights are defined and the conditions to those access rights are defined). In this example, the access rights include the second computing device's ability to take the X units of assignable tokens upon detection of a consume condition and that the second computing device can view a representation of the X units of assignable tokens in address "xyz" (even though the second computing device does not store the X units of assignable tokens in address "xyz"). More or less access rights are possible. The set of conditions to the access rights includes a release condition, and a consume condition, however, more or less conditions are possible.

In this example, the release condition specifies that if the interaction is successful, the assignment of the conditional access rights to the X units of assignable tokens ends. Definitions are included to specify what a successful interaction is, how it is verified, and what ending the assignment (i.e., executing a release) entails. For example, a release unlocks the X units of assignable tokens to address "abc," removes the representation of the X units in address "xyz," and terminates any conditional access rights provided to the second computing device.

In this example, the consume condition specifies that if the interaction is unsuccessful, then the X units of assignable tokens are transferrable to the second computing device's account address "xyz" (e.g., as an on-chain transaction). For example, the X units of assignable tokens may be automatically transferred upon a detection of a consume condition or upon a data input that instructs the transfer. Definitions are included to specify what an unsuccessful interaction is and how it is verified. As block #2 is mined, the smart contract code 50 of block #2 runs.

Figure 5A:
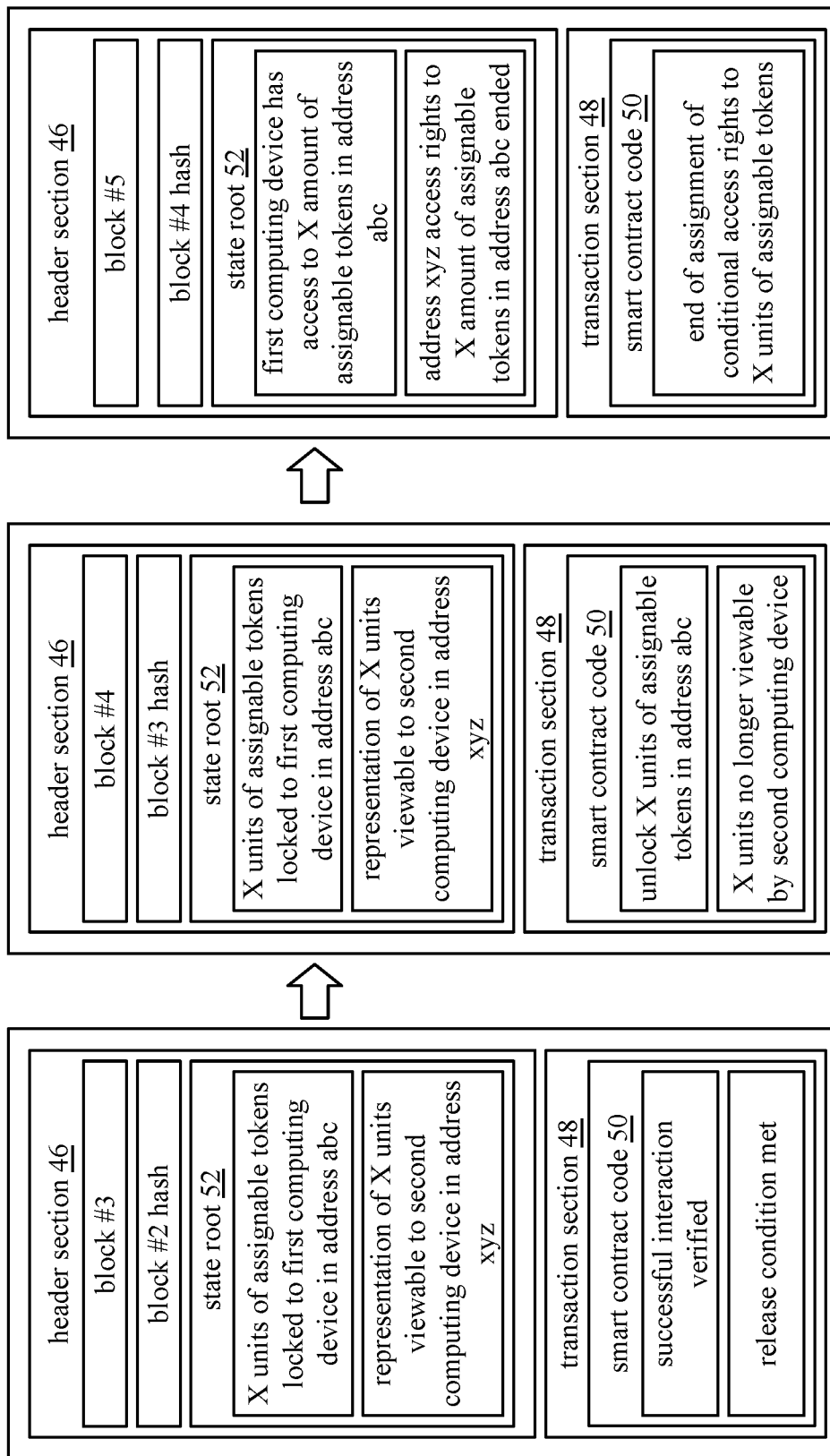
FIGS. 5A-5B are schematic block diagrams of an embodiment of an assignable token blockchain in accordance with the present invention.
Figure 5B:
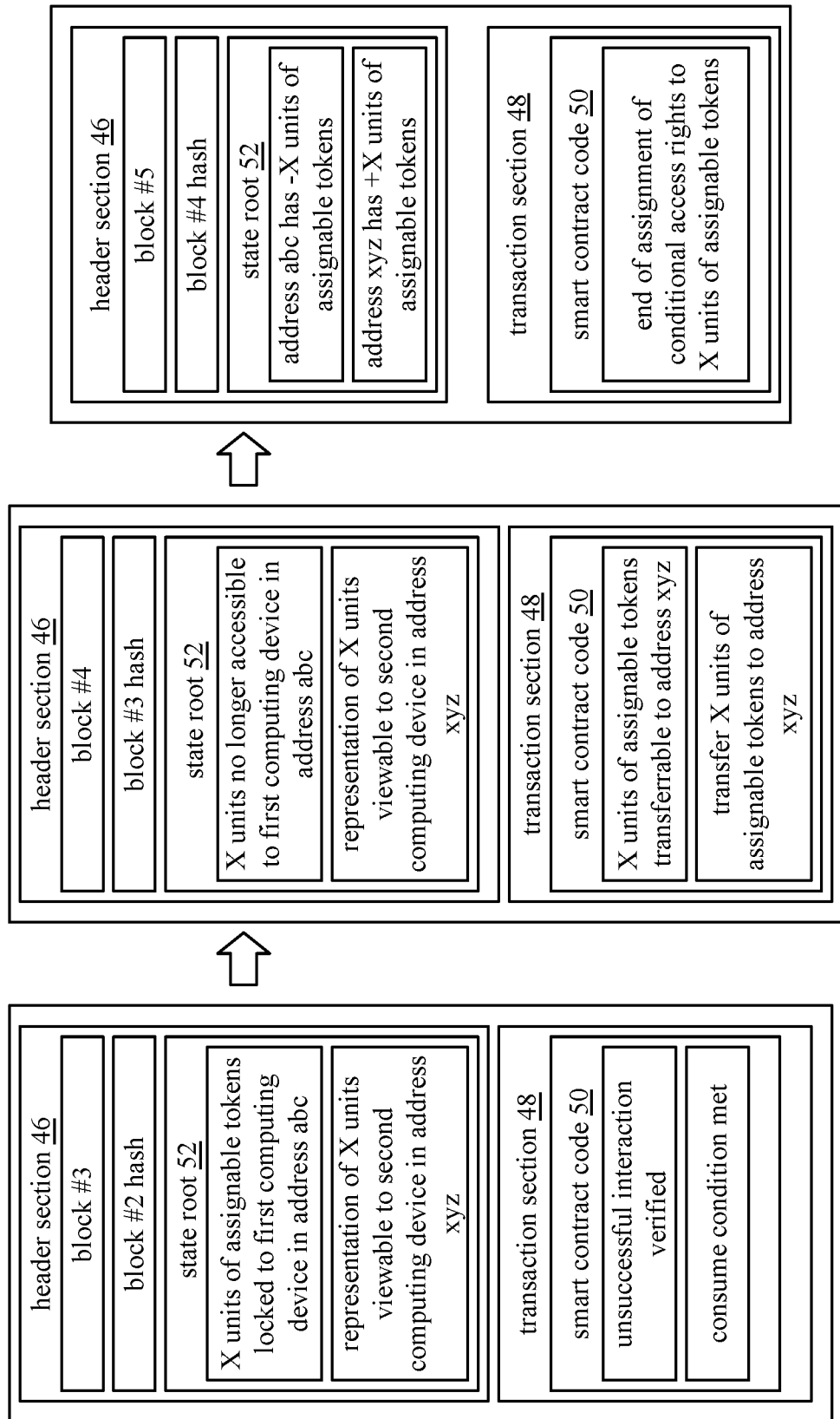

FIGS. 5A-5B are schematic block diagrams of an embodiment of an assignable token blockchain 44. FIG. 5A continues the example of FIG. 4 and includes an example of detecting a release condition. The header section 46 of block #3 includes a hash of block #2 and a state root 52. The state root 52 includes information pertaining to the current state of the assignable token accounts.

For example, the state root 52 of block #3 states that the X units of assignable tokens are locked in address "abc" to the first computing device and a representation of the X units of assignable tokens are viewable to the second computing device in address "xyz." The transaction section 48 of block #3 includes smart contract code 50 which includes a verification of a successful interaction and that a release condition is met. For example, the assignable token blockchain 44 is provided a data input (e.g., another smart contract) indicating that the interaction was completed successfully.

The header section 46 of block #4 includes a hash of block #3 and a state root 52. The state root 52 includes information pertaining to the current state of the assignable token accounts. For example, the state root 52 of block #4 states that the X units of assignable tokens are locked in address "abc" to the first computing device and a representation of the X units of assignable tokens are viewable to the second computing device in address "xyz." The transaction section 48 of block #4 includes smart contract code 50 which includes the actions associated with a release. Here, the release instructs the X units of assignable tokens to be unlocked in address "abc" to the first computing device and for the representation of the X units of assignable tokens to no longer be viewable by the second computing device in address "xyz."

The header section 46 of block #5 includes a hash of block #4 and a state root 52. The state root 52 includes information pertaining to the current state of the assignable token accounts. For example, the state root 52 of block #4 states that the first computing device has full access to the X units of assignable tokens in address "abc" (e.g., the X units of assignable tokens are unlocked to the first computing device). The state root 52 of block #4 also states that the access rights to the X units of assignable tokens in address "abc" provided to the second computing device via address "xyz" has ended. The transaction section 48 of block #5 includes smart contract code 50 indicating that the assignment of the conditional access rights to the X units of assignable tokens has ended.

FIG. 5B continues the example of FIG. 4 and includes an example of detecting a consume condition. The header section 46 of block #3 includes a hash of block #2 and a state root 52. The state root 52 includes information pertaining to the current state of the assignable token accounts.

For example, the state root 52 of block #3 states that the X units of assignable tokens are locked to the first computing device in address "abc" and a representation of the X units of assignable tokens are viewable to the second computing device in address "xyz." The transaction section 48 of block #3 includes smart contract code 50 which includes a verification of an unsuccessful interaction and an indication that a consume condition is met. For example, the assignable token blockchain is provided a data input (e.g., another smart contract) indicating that the interaction was unsuccessful.

The header section 46 of block #4 includes a hash of block #3 and a state root 52. The state root 52 includes information pertaining to the current state of the assignable token accounts. For example, the state root 52 of block #4 states that the X units of assignable tokens are no longer accessible by the first computing device in address "abc" and that a representation of the X units of assignable tokens are viewable to the second computing device in address "xyz." The transaction section 48 of block #4 includes smart contract code 50 which includes the actions associated with a consume. Here, the consume causes the X units of assignable tokens to be transferrable (e.g., as an on-chain transaction) to the second computing device's account address "xyz." The smart contract code 50 further indicates a transfer of the X units of assignable tokens (e.g., as an on-chain transaction) to the second computing device's account address "xyz" (e.g., in response to a data input).

The header section 46 of block #5 includes a hash of block #4 and a state root 52. The state root 52 includes information pertaining to the current state of the assignable token accounts. For example, the state root 52 of block #4 states that the X units of assignable tokens have been removed from the first computing device's account address "abc" and that the second computing device's account address "xyz" now has the X units of assignable tokens (the second computing device stores the X units of assignable tokens in account address "xyz"). The transaction section 48 of block #5 includes smart contract code 50 indicating that the assignment of the conditional access rights to the X units of assignable tokens has ended.

FIGS. 6A-6B are schematic block diagrams of an embodiment of token balance distribution. In particular, a comparison of a conventional token balance distribution 120 and an embodiment of an assignable token balance distribution 124 are shown. In FIG. 6A, a conventional token balance distribution 120 is shown. In a conventional token balance distribution 120, tokens 122 are assigned to addresses (e.g., addresses 1-n). The aggregate amount of the balances in the addresses 1-n is the total supply of the token.

FIG. 6B depicts an example of an assignable token balance distribution 124. The assignable token balance distribution 124 is similar to the conventional token balance 120 of FIG. 6A in that assignable tokens are assigned to addresses, however; unlike the conventional token balance 120, the assignable token balance distribution 124 includes a unique partitioning scheme. The partitioning scheme is a distribution array that includes conventional addresses as well as a second dimension of partitions (also referred to herein as assignable token partitions).

For example, address 1 includes partitions 0-n, address 2 includes partitions 0-n, address 3 includes partitions 0-n, and so on.

The partitioning scheme enables assignable tokens 126 to be stored in one address but controlled by a party not associated with that address. For example, the party associated with address 1 may not have access to the assignable tokens assigned to address 1, partition 1 when another party is provided conditional access rights to assignable tokens in partition 1. The partitioning scheme will be described in further detail with reference to one or more of FIGS. 6B-11 and 17-20.

FIGS. 7A-7B are schematic block diagrams of another embodiment of token balance distribution. FIG. 7A depicts another representation of a conventional token balance distribution 128. For example, Ethereum Request for Comments 20 ("ERC20") is a conventional token that abides by a conventional token balance distribution 128. ERC20 tokens reside on the Ethereum blockchain and are stored on hexadecimal Ethereum addresses. ERC20 is a standard for Ethereum smart contracts that effectively allows smart contracts to act similarly to conventional cryptocurrency.

The ERC20 standard includes a list of functions and events that each contract must implement to render them ERC20 compatible. An ERC compliant token hosted on the Ethereum blockchain can be sent, received, checked of total supply, and checked for the amount that is available on an individual address. In this example, an address 1 stores 100 conventional tokens, an address 2 stores 200 conventional tokens, and an address 3 stores 300 conventional tokens. In this example, the total supply of the conventional tokens is 600.

FIG. 7B depicts a conventional token-compatible assignable token balance distribution 130. For example, the assignable tokens are hosted on the Ethereum blockchain and are ERC20 compatible. In other examples, the assignable tokens may be designed to be compatible with a different token standard, may be designed in accordance with a unique standard, and/or may be hosted on a different blockchain that supports smart contracts.

The assignable token balances are assigned to conventional addresses (e.g., hexadecimal Ethereum addresses) but the assignable tokens can also belong to a particular partition (e.g., a 32 byte partition) which effectively serves as a second-dimension in the distribution array of the balances. The assignable tokens are not reciprocal across partitions (consistent with address parameters) such that the sum of the balances across all addresses and partitions is the total supply of the assignable tokens. To maintain compatibility with a conventional token such as ERC20, the zero partition (i.e., the default partition) is used for conventional token operations.

The zero (i.e., default) partition of addresses 1-3 is shaded to demonstrate that this section resembles the conventional token balance distribution discussed with reference to FIG. 7A. In this example, the zero partition of address 1 is assigned 0 assignable tokens, the zero partition of address 2 is assigned 100 assignable tokens, and the zero partition of address 3 is assigned 300 assignable tokens. The owners (i.e., assignable token holders) of addresses 1-3 are able to perform conventional token operations as well as partition specific operations on the assignable tokens within their respective zero partitions.

In this example, partition 1 of address 1 is assigned 50 assignable tokens, partition 1 of address 2 is assigned 100 assignable tokens, and partition 1 of address 3 is assigned 0 assignable tokens. The owners of addresses 1-3 may or may not be able to control the assignable tokens within their respective partition 1s. Assignable tokens stored on the partition 1 are controlled by a first partition strategy that is defined by a set of custom rules (e.g., conditional access rights, set of conditions, etc.). Partition strategies will be discussed in further detail with respect to one or more of the following Figures.

A partition 2 of address 1 is assigned 50 assignable tokens, a partition 2 of address 2 is assigned 0 assignable tokens, and a partition 2 of address 3 is assigned 0 assignable tokens. The owners of addresses 1-3 may or may not be able to control the assignable tokens within their respective partition 2s. Assignable tokens stored on the partition 2 are controlled by a second partition strategy that includes a second set of custom rules.

In an example, those in control of the assignable tokens stored on any non-zero partition are able to perform partition specific operations in accordance with partition strategies pertaining to the partition but not conventional token operations that are available to holders of assignable tokens stored on any zero partition. In that example, assignable tokens stored on a non-zero partition would need to be transferred to the zero partition if conventional token operations are desired.

FIGS. 8A-8B are schematic block diagrams of an embodiment of assignable token partitions. Partitions include a prefix (e.g., first 4 bytes of the partition) that corresponds to a partition scope as set by a partition strategy. A partition strategy is an external contract that can be encoded with custom rules. Custom rules may include automatically granting operator statuses, calling hooks, and authorizing discrete transfers based on external oracles. A hook is a function that is called before or after an action takes place. A hook provides a centralized point to "hook into" and extend the original behavior (e.g., call a manager to authorize or reject a transfer).

An oracle is a data feed from external system that feed vital information into blockchains that smart contracts may need to execute under specific conditions. In summary, partition strategies can be used to systematically grant controller-like permissions to various actors in the assignable token ecosystem. The controller-like permissions allow for conditional access rights to assignable tokens to be assigned to a party and/or entity who does not have custody of the assignable tokens as discussed in one or more of the previous Figures.

When the assignable tokens are conventional token compatible, a partition strategy cannot be set for a zero partition prefix. As shown in FIG. 8A, the zero partition prefix is a default prefix (e.g., 00000000) and cannot be changed as this scope includes the default partition for conventional token compatibility. FIG. 8B depicts a non-zero partition 134 having a partition scope 136 that is defined by a set of custom rules for the partition in accordance with a partition strategy. Partition strategies are append only (i.e., the base rules for a partition are immutable) and transfers to partitions with prefixes that do not have assigned partition strategies is disallowed. This prevents a partition strategy from being added that would retroactively control assignable tokens within its partition scope (e.g., as defined in its customizable prefix).

Figure 9A:
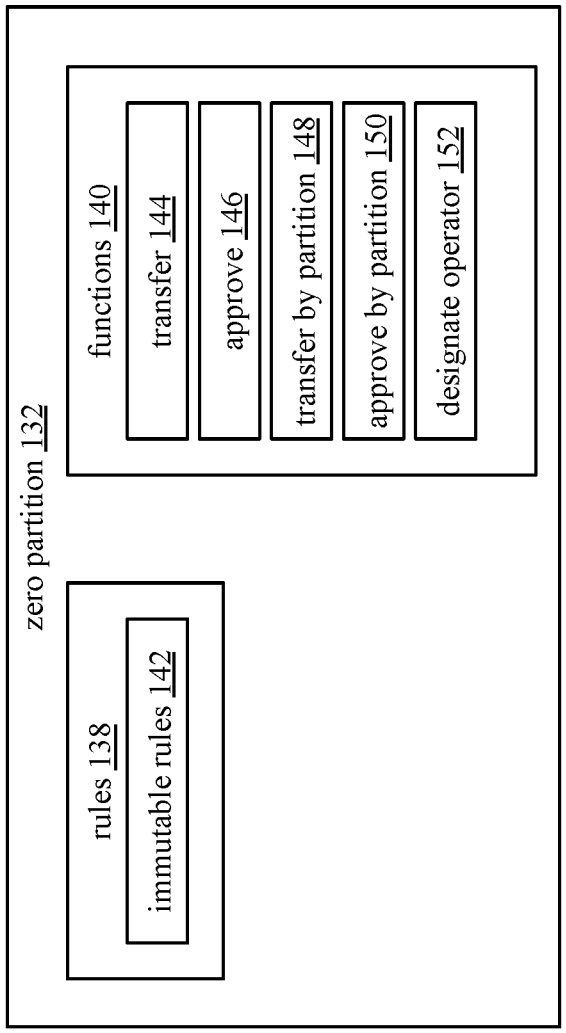
FIGS. 9A-9B are schematic block diagrams of another embodiment of assignable token partitions in accordance with the present invention.
Figure 9B:
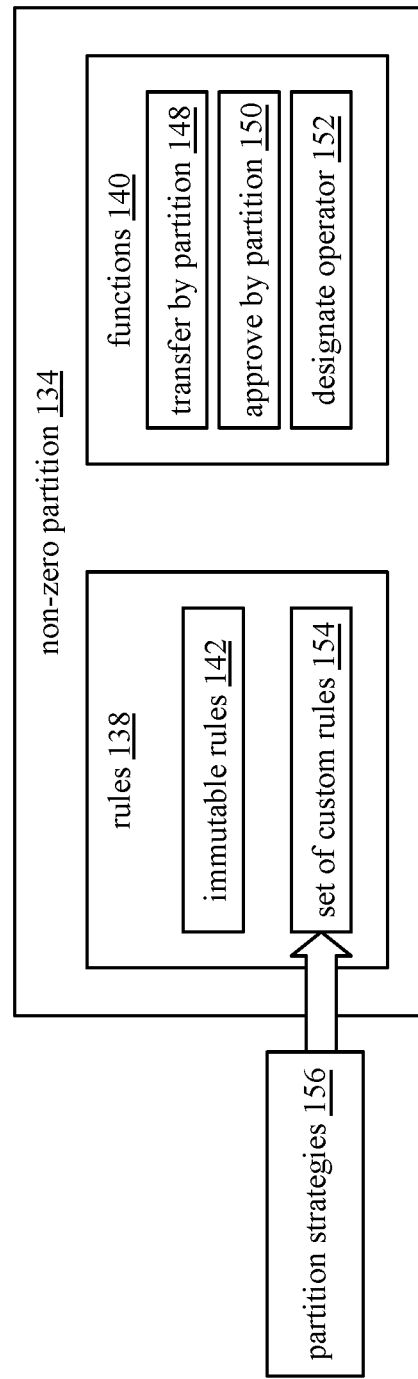

FIGS. 9A-9B are schematic block diagrams of another embodiment of assignable token partitions ("partition"). Partitions are bound by rules 138 and those in control of a partition can perform functions 136 on the assignable tokens within that partition in accordance with the rules 138. As shown in FIG. 9A, when the assignable tokens are conventional token compatible, the rules 138 of a zero (i.e., default) partition 132 include a set of immutable rules 142.

Immutable rules 138 include base rules that apply to all partitions and cannot be changed by external contracts (e.g., no administrative privileges exist). The functions 140 of the zero partition 132 include conventional token (e.g., ERC20) compatible functions such as transfer 144 and approve 146 as well as partition specific functions such as transfer by partition 148, approve by partition 150, and designate operator 152. When calling the conventional token compatible approve 146 function, an owner authorizes (i.e., approves) a given address to withdraw an amount of assignable tokens from the zero partition of the owner's address. When calling the conventional token compatible transfer 144 function, an owner sends a given amount of assignable tokens to another zero partition of another address just like a conventional cryptocurrency transaction.

The transfer by partition 148 function allows for transfers between partitions and the approve by partition 150 function authorizes transfers between partitions up to a maximum amount. The designate operator 152 function allows an assignable token holder to designate an operator for their assignable tokens within a particular partition. This grants the operator the ability (until revoked) to transfer an unlimited number of assignable tokens from the delegating address and partition.

As shown in FIG. 9B, the rules 138 of a non-zero partition 134 includes the set of immutable rules 142 as well as a set of custom rules 154. The set of custom rules 154 are defined by one or more external contracts called partition strategies 156. The functions 140 of the non-zero partition 134 include partition specific functions such as transfer by partition 148, approve by partition 150, and designate operator 152 as discussed above. The functions 140 of the non-zero partition do not include conventional token compatible functions.

FIGS. 10A-10B are schematic block diagrams of an embodiment of a collateral manager partition strategy. FIG. 10A depicts a non-zero partition with collateral manager 160. A collateral manger partition strategy is used to define the custom set of rules for the non-zero partition.

The non-zero partition with collateral manager 160 includes a customizable prefix that defines the partition scope 136, a sub-partition that defines the management scope 162, and the collateral manager address. The collateral manger partition strategy defines a collateral manager (i.e., partition owner) with control of assignable tokens within a particular partition scope 136. The collateral manager is the operator on all partitions that includes its address and are within the particular partition scope 136. The sub-partition can be used in any way the collateral manager wishes to manage the assignable tokens.

The collateral manager partition strategy allows a single collateral manager to control a large number of partitions. The assignable tokens support transfer hooks on chain with time-of-transfer calls to external (non-assignable token) smart contracts that are configured to receive and react to individual transfer operations. Metadata included with the assignable token transfer (e.g., from, to, operator, amount, and partitions) are included as parameters in the transfer hook calls. This enables the hook implementations to act/react on the full breadth and scope of individual transfers.

Upon a transfer from a partition within the collateral manager's partition scope, a transfer hook of the collateral manager will be called. This enables the collateral manager to restrict a transfer even if it is not from its address. This strategy allows for a collateralization mechanism where an assignable token holder retains assignable tokens at their address while simultaneously providing assignable tokens as collateral to the delegated collateral manager.

If an implementation is present and has registered the supported interface, transfer and transfer by partition calls may invoke a tokens to transfer hook (e.g., a hook called on behalf of the token sender generally used to gate/block a transfer) and a tokens received hook (e.g., a hook called on behalf of the token receiver used to perform additional processing of transfer data such as storing on-chain versions or propagating data to an off-chain system through the emission of a bespoke event and/or reject an invalid transfer (e.g., lack of appropriate data or unsupported partition)). In either case, both the assignable token sender and receiver hook implementations can revert the transaction.

This is possible when ownership of the assignable tokens is not retroactively removed (i.e., a sender can block their own transfer, or the receiver can block the reception of assignable tokens from a third party, but not vice versa). Assignable token transfer hooks may not be required for standard account transfers but may be required for smart contract collateral managers to react to new collateral and perform scope specific features (e.g., withdrawal, authorization, and processing rewards).

FIG. 10B shows an assignable token balance distribution with a collateral manager 164. The assignable token balance distribution includes a first assignable token holder with an address 1 and a collateral manager with an address 2. Each address in the assignable token balance distribution includes three partitions: a zero partition (partition 0), a partition 1, and a partition 2 controlled by the collateral manager 164.

The collateral manager 164 controls 50 assignable tokens (denoted with an asterisk) within partition 2. The address 1 has an assignable token balance of 100 where 50 assignable tokens are within partition 1 and controlled by the first assignable token holder and 50 assignable tokens are within partition 2 and controlled by the collateral manager 164.

The collateral manager 164 holds 100 assignable tokens in the zero partition of address 2 which it could use to grant rewards to the first assignable token holder as an incentive for delegating control of assignable tokens to the collateral manager 164.

To remove assignable tokens delegated to the collateral manager 164, an assignable token holder can invoke a transfer by partition function to transfer assignable tokens from partition 2 to any of their other partitions. The collateral manager 164 will receive a tokens to transfer hook which is capable of rejecting the operation if the transfer is not authorized. For example, the collateral manager may reject the transfer if the holder attempts to withdraw an amount that is too much or attempts to withdraw an amount too soon (e.g., as determined and set by the custom set of rules that includes partition scope and management scope).

FIG. 11 is a schematic block diagram of an embodiment of a collateral manager partition strategy and includes a first computing device 12 and a second computing device 14. The first computing device 12 includes a first digital asset unit 20-1 that stores assignable tokens 22 in an address 1.

The second computing device 14 includes a second digital asset unit 20-2 that stores assignable tokens 22 in an address 3. FIG. 11 is similar to the example of FIG. 2 in that it shows conditional access rights to an amount of assignable tokens assigned from the first digital asset unit 20-1 to the second digital asset unit 20-2. FIG. 11 illustrates the example discussed with reference to FIG. 10B.

For example, the first computing device 12 is the first assignable token holder from FIG. 10B and the second computing device 14 is the collateral manager 164 of FIG. 10B. The assignable tokens 22 of the first digital asset unit 20-1 show an overall balance of 100 assignable tokens. Of those 100 assignable tokens, 50 assignable tokens are available (e.g., the first assignable token holder can control them freely), and 50 assignable tokens are locked (e.g., if the first assignable token holder attempted to transfer or otherwise move the 50 assignable tokens, the transaction would fail). The 50 assignable tokens are locked because conditional access rights to them have been assigned to the collateral manager (i.e., the second computing device 14).

The assignable tokens 22 of the second digital asset unit 20-3 show an overall balance of 100 assignable tokens (e.g., within its zero partition) as well as a representation of the 50 assignable tokens that the first computing device 12 assigned conditional access rights to.

The conditional access rights to an amount of assignable tokens are assigned to the second computing device 20-2 in accordance with set of conditions (e.g., a partition strategy). The set of conditions include one or more release conditions and one or more consume conditions. Detection of a release condition ends the assignment of the conditional access rights to the amount of assignable tokens. For example, upon a release condition, the amount of assignable tokens are transferrable to the first digital asset unit 20-1 such that if the first digital asset unit 20-1 transfers the 50 assignable tokens back to one of its partitions via the transfer by partition function, the request would be allowed, and the 50 assignable tokens would no longer be viewable and controllable by the second digital asset unit 20-2.

As another example, upon a consume condition, the amount of assignable tokens are transferrable to the second digital asset unit 20-2 such that if the second digital asset unit 20-1 transfers the 50 assignable tokens to its address, another partition, or to another address via the transfer or transfer by partition function, the request would be allowed, and the 50 assignable tokens would no longer be viewable by the first digital asset unit 20-1.

Figure 12:
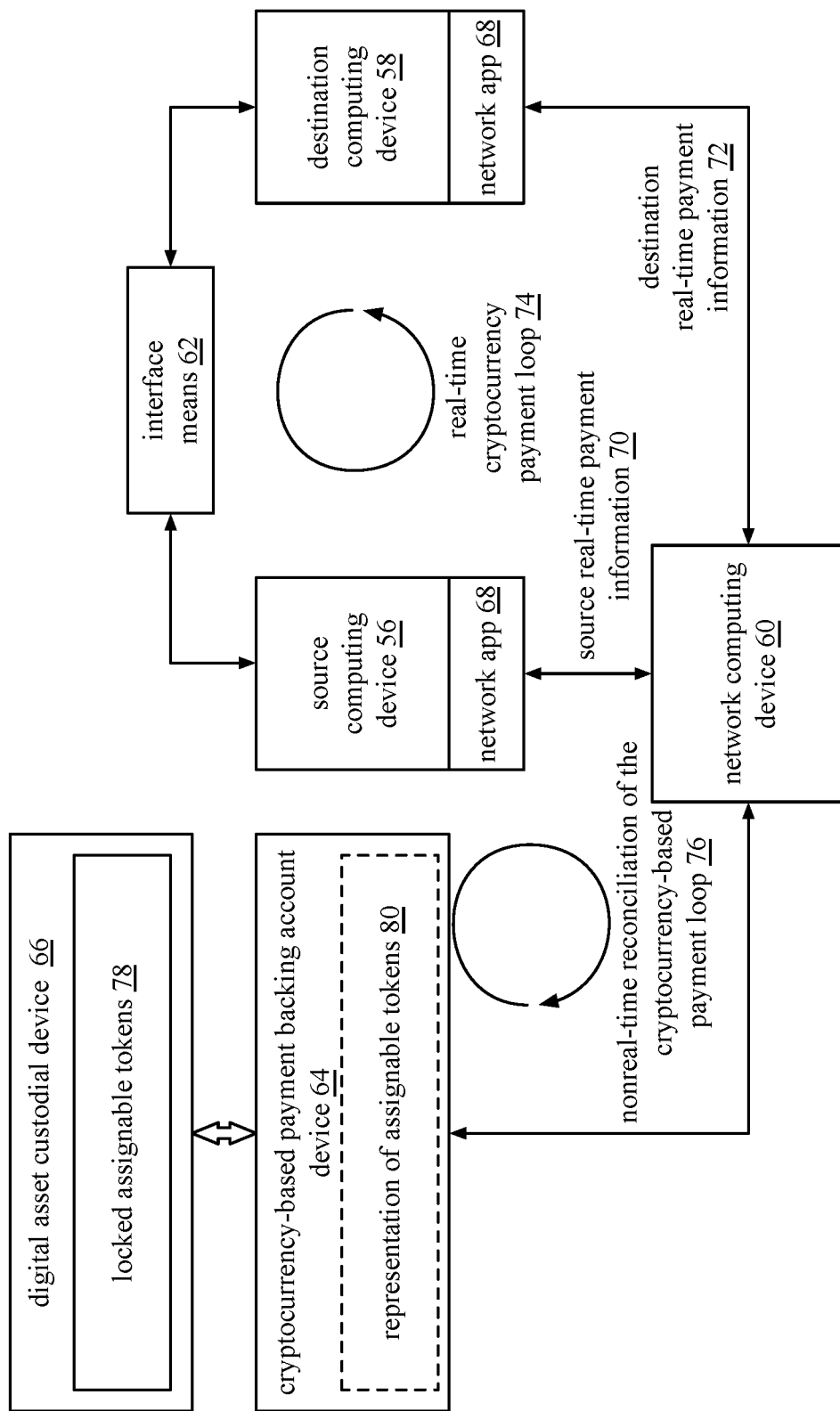
FIG. 12 is a schematic block diagram of an embodiment of a cryptocurrency payment system in accordance with the present invention.

FIG. 12 is a schematic block diagram of an embodiment of a cryptocurrency payment system 54 that includes a source computing device 56, a destination computing device 58, a network computing device 60, an interface means 62, a cryptocurrency-based payment backing account device 64, and a digital asset custodial device 66. The cryptocurrency payment system 54 facilitates a payment from the source computing device 56 paying with a cryptocurrency (or other digital asset) to a destination computing device 58 accepting a desired digital asset (e.g., fiat currency, a different cryptocurrency, etc.) and overcomes the following issues.

At the filing of this application, digital assets such as cryptocurrency are not widely accepted by merchants as a form of payment for a variety of reasons. For one, many merchants do not want to hold cryptocurrency. Holding cryptocurrency involves several issues merchants are unfamiliar with and/or unequipped to deal with. These issues include holding private key information, legal compliance, government regulation, timing issues such as waiting for transaction confirmations, etc. Accepting digital assets such as cryptocurrency presents operational security issues and includes a level of technical complexity outside the scope of general merchant capabilities. As another reason, the value of digital assets such as cryptocurrency can be volatile, sometimes fluctuating dramatically in the course of one day. As another reason, merchants are reluctant to invest in expensive point-of-sale upgrades to accommodate cryptocurrency payments directly. As yet another reason, many cryptocurrency payments are public and expose sensitive merchant/customer information.

While some digital wallet applications enable retail blockchain payments, they are universally dependent on existing payment networks and thus are susceptible to the fraud attacks of the existing payment networks. For example, a cryptocurrency is linked to a payment card (e.g., a credit card, debit card, gift card, etc.), where a cryptocurrency payment is converted and conducted as a payment card transaction and, thus susceptible to the same fraud attacks as the payment card. Further, a billing address and/or other personal customer information may be required for a merchant to verify traditional payment card payments. A merchant may store this information which consumes data storage space and renders additional private customer information vulnerable to theft and fraud. Additionally, the costs of the existing payment network (e.g., payment transaction costs, fees, etc.) are maintained. Adding a digital asset payment option within an existing payment network only increases those costs.

Even though digital asset payments such as cryptocurrency payments significantly reduce fraudulent activity as compared to traditional payment systems, fraudulent digital asset transactions are possible. For example, malicious users can manipulate a cryptocurrency blockchain to "double spend" (e.g., create one transaction within a block to transfer an amount to a merchant and create another block without that transaction such that the transfer to the merchant does not exist). As another example, malicious or faulty digital wallet software can prevent a cryptocurrency transaction from being authorized and completed correctly.

The cryptocurrency payment system 54 is a merchant payment network designed to enable universal acceptance of digital assets. While the term "cryptocurrency" is used throughout, any other acceptable digital asset can be used in a payment via the cryptocurrency payment system 54. Decentralized networks such as the cryptocurrency payment system 54 allow for independent verification of state via open validator sets and distributed convergence mechanisms making verification of digital assets much less complex and expensive than traditional payment networks. Payments for goods and services are authorized instantly (in-store or online) without fraud and at net cost less than interchange. The cryptocurrency payment system 54 includes various exchanges and financial institutions to provide compliant settlement across multiple jurisdictions. The cryptocurrency payment system 54 integrates natively with existing point-of-sale (POS) systems and online platforms to enable payment in a typical checkout experience.

Within the cryptocurrency payment system 54, the source computing device 56, the destination computing device 58, the network computing device 60, the cryptocurrency-based payment backing account device 64, and the digital asset custodial device 66 may be one or more computing devices, one or more distributed computing devices, and/or a module executing on one or more computing devices.

The source computing device 56, the destination computing device 58, the network computing device 60, the cryptocurrency-based payment backing account device 64, and the digital asset custodial device 66 may be portable computing devices and/or a fixed computing devices. A portable computing device may be a social networking device, a gaming device, a cell phone, a smart phone, a digital assistant, a digital music player, a digital video player, a laptop computer, a handheld computer, a tablet, a video game controller, a portable merchant point-of-sale (POS) device (e.g., a mobile device with POS capabilities) and/or any other portable device that includes a computing core. A fixed computing device may be a computer (PC), a computer server, a cable set-top box, a satellite receiver, a television set, a printer, a fax machine, home entertainment equipment, a video game console, a fixed merchant point-of-sale (POS) device (e.g., cash register), and/or any type of home or office computing equipment. The cryptocurrency-based payment backing account device 64 may be a standalone device or incorporated into the network computing device 60.

In this example, the source computing device 56 and the destination computing device 58 include a network application ("app") 68 that associates the respective devices to the network computing device 60. The network application 68 may be a digital wallet application or network enabled smart contract application associated with the network computing device 60. For example, the source computing device 56 is a smart phone and the network application 68 is a digital wallet application or network enabled smart contract associated with the network computing device 60 downloaded and/or otherwise accessible via the smart phone. As another example, the destination computing device 58 is a POS device and the network application is software associated with the network computing device 60 installed in the POS device.

The source computing device 56 and the destination computing device 58 interact via the interface means 62. The interface means 62 is one or more of: a direct link and a network connection. The direct link includes one or more of video, camera, infrared (IR), radio frequency (RF), barcode scanner, and/or near-field communication (NFC). The network connection includes one or more local area networks (LAN) and/or one or more wide area networks (WAN), which may be a public network and/or a private network. A LAN may be a wireless-LAN (e.g., Wi-Fi access point, Bluetooth, ZigBee, etc.) and/or a wired LAN (e.g., Firewire, Ethernet, etc.). A WAN may be a wired and/or wireless WAN. For example, a LAN is a personal home or business's wireless network and a WAN is the Internet, cellular telephone infrastructure, and/or satellite communication infrastructure.

As an example, the source computing device 56 is a smart phone, the destination computing device 58 is a fixed merchant POS device (e.g., a POS register) and the interface means 62 is the fixed merchant POS device's NFC barcode scanner. The smart phone is operable to generate a code and display the code to the fixed merchant POS device, where the fixed merchant POS device's NFC barcode scanner is operable to read the code.

As another example, the source computing device 56 is a smart phone, the destination computing device 58 is a fixed merchant POS device (e.g., a POS register) and the interface means 62 is the smart phone's camera. The smart phone is operable to read a barcode generated by the fixed merchant POS device via the smart phone's camera.

As another example, the source computing device 56 is a smart phone, the destination computing device 58 is an e-commerce platform, and the interface means 62 is a network connection. For example, a smart phone uses an internet browser application (via cellular or wireless internet connection) to access the e-commerce platform.

As another example, the source computing device 56 is a smart phone, the destination computing device 58 is a smart phone, and the interface means 62 is a Bluetooth network. For example, the two smart phones connect using Bluetooth in order to send a payment from one smart phone to another.

As yet another example, a combination of interface means 62 is possible. For example, a source computing device 56 is a smart phone and the destination computing device 58 is an online POS connection device (e.g., an e-commerce website). A user of the source computing device 56 accesses the e-commerce platform via a network connection interface means 62 on another computing device associated with the user of the source computing device 56 (e.g., a laptop or desktop computer). The laptop or desktop computer displays information for use in a direct link with the smart phone. For example, a code is generated by the e-commerce platform and displayed on the laptop's display. The smart phone's camera scans the code to further interact with e-commerce platform (e.g., complete a payment).

The network computing device 60 is or is associated with an entity that may be specially licensed to convert cryptocurrency (or any digital asset) to a desired digital asset (e.g., fiat currency, another cryptocurrency, etc.) (also referred to herein as "desired currency") such as the digital asset custodial device 66.

The network computing device 60 may be associated with a stored value account (SVA) device where the SVA device is associated with the destination computing device 58 (e.g., the destination computing device has an SVA account with the SVA device) such that an SVA is generated for payment. In another embodiment, the network computing device 60 is operable to generate stored value accounts (SVAs). Generation of SVAs for transactions is described in co-pending patent application Ser. No. 16/376,911, entitled, "SECURE AND TRUSTED DATA COMMUNICATION SYSTEM," filed Apr. 5, 2019.

The digital asset custodial device 66 is a digital asset holding company device that may be specially licensed to custody (e.g., hold, move, and protect) digital assets such as cryptocurrency, tokens, etc. The digital asset custodial device 66 may further be certified as a digital asset exchange. The digital asset custodial device 66 provides custodial services that are attractive to institutions and individuals alike. For example, the digital asset custodial device 66 securely stores and manages keys on behalf of account holders, backs holdings with adequate monetary reserves, and has insurance policies to protect against theft and fraud.

The digital asset custodial device 66 is associated with the cryptocurrency-based payment backing account device 64. For example, the digital asset custodial device 66 stores assignable tokens on behalf of the cryptocurrency payment system 54 as collateral to back cryptocurrency-based payments of the cryptocurrency payment system 54. In order to unconditionally and immediately guarantee all merchant payments made without trusting external protocols and network participants, decentralized collateral (i.e., assignable tokens) is the critical foundation of the cryptocurrency payment system 54.

For example, a custodial account holder of the digital asset custodial device 66 stores assignable tokens in an account of the digital asset custodial device 66 (e.g., as opposed to directly in the cryptocurrency-based payment backing account device 64) in order to receive the benefits provided by the custodial account. As discussed with reference to previous Figures, due to the unique nature of the assignable tokens (e.g., the partitioning scheme and collateral manager functionality), the assignable tokens can be stored on the digital asset custodial device 66 (or within any other address associated with an assignable token holder) while conditional access rights to the assignable tokens can be assigned to the cryptocurrency-based payment backing account device 64 to back cryptocurrency-based payments of the cryptocurrency payment system 54.

Assignable tokens can serve as a fundamental collateral token used to secure payments within the cryptocurrency payment system 54, where network applications (e.g., wallets) are "staked" with assignable tokens to enable spending capacity. For each successful transaction, merchants may be charged a small (e.g., percentage-based) fee that is less than the prevailing interchange rate. This remuneration is the only acceptance expense for the finality-as-a-service and elimination of fraud that the cryptocurrency payment system 54 provides.

If the custodial account holder (or other external account holder) wishes to back payments on the cryptocurrency payment system 54, the custodial account holder assigns conditional access rights to the assignable tokens (e.g., pledges/stakes assignable tokens) to an account of the cryptocurrency-based payment backing account device 64 without the assignable tokens actually "leaving" the custodial account. An entity who pledges assignable tokens to back payments on the cryptocurrency payment system 54 is referred to as a staking entity (or "staker"). A staking entity may be an individual, a digital wallet developer, a business entity, etc. Assigning conditional access rights to assignable tokens to back payments on the cryptocurrency payment system 54 is discussed in more detail with reference to FIGS. 13-20.

The staking entity is associated with one or more of the source computing device 56, the destination computing device 58, and a type of digital asset. Commonly, the staking entity is associated with the source computing device 56. For example, the staking entity is associated with a digital wallet of the source computing device 56 (e.g., a digital asset unit). The developer of the digital wallet has a custodial account with the digital asset custodial device 66 and deposits assignable tokens therein. The developer of the digital wallet assigns conditional access rights to an amount of the assignable tokens to an account on the cryptocurrency-based payment backing account device 64 (i.e., a collateral contract) to back cryptocurrency-based payments made by users of the digital wallet.

The proceeds from merchant fees are used by the network computing device to open-market purchase assignable tokens for autonomous distribution to cryptocurrency-based payment backing accounts (i.e., collateral contracts). As such, staking entities are able to receive non-inflationary rewards pro rata based on the quantity of assignable tokens staked. The developer of the digital wallet (i.e., the staking entity) is incentivized to back its wallet users' transactions by receiving rewards from the cryptocurrency-based payment backing account device 64 such as a percentage of assignable tokens back on all successful wallet transactions. This self-reinforcing cadence of increasing payment utility (spending throughput), collateral requirements, and compounding rewards provides a framework to ensure cryptocurrency payment system value is captured within the assignable tokens. Further, because the developer is backing wallet user payments, the developer is incentivized to produce a quality digital wallet that prevents user fraud and to remedy faulty software that affects user transaction success.

When the conditional access rights to the amount of assignable tokens is assigned to the cryptocurrency-based payment backing account device 64, the amount of assignable tokens is locked in the custodial account of the digital asset custodial device 66 (e.g., locked assignable tokens 78) and the conditional access rights to the assignable tokens are provided to the cryptocurrency-based payment backing account device 64 (e.g., the cryptocurrency-based payment backing account device 64 is operable to view a representation of the amount of assignable tokens 80, etc.). Therefore, the assignable tokens are stored by the digital asset custodial device 66 but the cryptocurrency-based payment backing account device 64 has conditional access rights to the assignable tokens to back cryptocurrency-based payments of the system.

Access rights include: a right to consume locked assignable tokens 78 (e.g., assignable tokens are transferrable to the cryptocurrency-based payment backing account device 64 via an on-chain transaction upon a stake consume condition), a right to view a representation of the locked assignable tokens 78 (e.g., the representation of assignable tokens 80), a right to lock/unlock at least a portion of the locked assignable tokens 78 (e.g., to back payments within the cryptocurrency payment system), a right to assign at least a portion of the locked assignable tokens 78, a right to transfer at least a portion of the locked assignable tokens 78, a right to move at least a portion of the locked assignable tokens 78, and/or a right to trade at least a portion of the locked assignable tokens 78. A variety of other access rights are possible.

The assignment of conditional access rights of the assignable tokens is in accordance with a set of conditions. The set of conditions includes one or more stake release conditions and one or more stake consume conditions. Other conditions are possible. A stake release condition is an express instruction by a custodial account holder (e.g., the staking entity) of the digital asset custodial device 66 to un-stake a desired amount (e.g., some or all) of locked assignable tokens 78 thus removing the assignment of conditional access rights to the desired amount of assignable tokens (i.e., no longer stake the desired amount of assignable tokens on the cryptocurrency payment system 54).

A stake release is similar to the example of a release described in previous Figures except that it may apply to some or all of the assignable tokens involved in the assignment. When the stake release condition is detected, the assignment of conditional access rights to the desired amount of assignable tokens ends, the cryptocurrency cryptocurrency-based payment backing account device 64 no longer has conditional access rights to the desired amount of assignable tokens, and the desired amount of the assignable tokens are unlocked and accessible to the digital asset custodial account 66.

An example of a stake consume condition is a failed payment within the cryptocurrency payment system 54. A stake consume is similar to the example of a consume described in previous Figures except that it may apply to some or all of the assignable tokens involved in the assignment. For example, the cryptocurrency-based payment backing account device 64 is provided conditional access rights to lock and unlock at least a portion of the locked assignable tokens as needed to back payments within the cryptocurrency payment system. Therefore, because a payment is backed with some or all of the assignable tokens involved in the assignment, a stake consume may apply to some or all of the assignable tokens involved in the assignment.

When a stake consume condition is detected, the at least a portion of the assignable tokens locked by the cryptocurrency-based payment backing account device 64 to back the failed payment is made transferrable (e.g., as an on-chain transaction) to the cryptocurrency-based payment backing account device 64 (e.g., automatically or based on a data input) and unavailable to the custodial account associated with the failed payment.

In an example of operation, the source computing device 56 and the destination computing device 58 interact via the interface means 62. For example, the source computing device 56 establishes a direct communication link with the destination computing device 58 via an NFC interface means 62.

The source computing device 56 sends source real-time payment information 70 to the network computing device 60 via its network application 68 and the destination computing device 58 sends destination real-time payment information 72 to the network computing device 60 its network application 68. The source real-time payment information 70 includes a source identifier (ID) and a type of cryptocurrency it wishes to use in a real-time payment to the destination computing device 56. The destination real-time payment information 72 includes a destination identifier (ID) and a type of desired currency (e.g., a fiat currency, a different cryptocurrency, etc.) it wishes to receive in the real-time payment from the source computing device 56. One or more of the source real-time payment information 70 and the destination real-time payment information 72 includes the amount of the real-time payment.

When the network computing device 60 receives the source and destination real-time payment information, the network computing device 60 initiates 1) a real-time cryptocurrency-based payment process (e.g., the real-time cryptocurrency-based payment loop 74) and 2) a nonreal-time reconciliation process to reconcile the cryptocurrency-based payment with the cryptocurrency-based payment backing account device 64 (e.g., the nonreal-time reconciliation of the cryptocurrency-based payment loop 76). The reconciliation of the cryptocurrency-based payment with the cryptocurrency-based payment backing account device 64 occurs within a time frame that is longer than the time frame of the real-time cryptocurrency-based payment. For example, the reconciliation of the cryptocurrency-based payment with the cryptocurrency-based payment backing account device 64 occurs over the course of minutes whereas the time frame of the real-time cryptocurrency-based payment takes a few seconds.

Within the nonreal-time reconciliation of the cryptocurrency-based payment loop 76, when the source and destination real-time payment information is received, the network computing device 60 instructs the cryptocurrency-based payment backing account device 64 to lock at least a portion of the assignable tokens that the cryptocurrency-based payment backing account device 64 has conditional access rights to (e.g., are viewable as the representation of assignable tokens 80) to back the real-time cryptocurrency-based payment.

Within the real-time cryptocurrency-based payment loop 74, when the network computing device 60 receives an amount of cryptocurrency from the source computing device 56 to use in the real-time cryptocurrency-based payment, a network acknowledgment (ACK) of the receipt of the amount of the cryptocurrency is generated. If the payment initiation is terminated (e.g., payment initiation fails and/or is cancelled by the source and/or the destination computing device) within a certain amount of time prior to the network computing device 60 continuing with the following steps of the real-time cryptocurrency-based payment loop 74 (e.g., paying the destination computing device), the ACK is not generated, and the real-time payment is terminated. Within the nonreal-time reconciliation of the cryptocurrency-based payment loop 76, when the ACK is not generated, the network computing device 60 instructs the cryptocurrency-based payment backing account device 64 to release the at least a portion of the assignable tokens locked to back the real-time cryptocurrency-based payment.

Sending the amount of cryptocurrency to the network computing device 60 is a transaction added to the cryptocurrency blockchain of the cryptocurrency used by the source computing device 56 (e.g., this information is published). However, other details related to the transaction (e.g., the identity of the destination computing device 56, transaction fees owed by the destination computing device 58, etc.) are managed privately by the network computing device 60 off-chain. Therefore, the cryptocurrency payment system 54 keeps confidential destination computing device 58 related information (e.g., revenue, consumer spending behavior, etc.) and confidential source computing device 56 related information (e.g., consumer identity of purchases, amount spent at a particular merchant, payees/merchants frequented, etc.) private (i.e., not published on a blockchain for anyone to see).

Continuing with the real-time cryptocurrency-based payment loop 74, when the ACK is generated, the network computing device 60 exchanges the amount of the cryptocurrency received from the source computing device 56 to an amount of the desired currency. Cryptocurrency exchange is done quickly (e.g., 30 seconds to a few minutes) to account for exchange rate volatility. The exchange can also be performed in real-time on a credit-based account to eliminate any pricing volatility. The network computing device 60 sends the amount of the desired currency to the destination computing device 58 to complete the real-time cryptocurrency-based payment.

Continuing with the nonreal-time reconciliation of the cryptocurrency-based payment loop 76, the network computing device 60 verifies the amount of the cryptocurrency received from the source computing device 56. For example, the network computing device 60 connects to a consensus network that verifies the amount of the cryptocurrency received from the source computing device 56. The consensus network implements a verification process that may take minutes to hours of time.

For example, in the Bitcoin blockchain, miners record new transactions into blocks that verify all previous transactions within the blockchain. At the filing of this application, it takes a miner ten minutes, on average, to write a block on the Bitcoin blockchain and the average block time depends on a total hash power of the Bitcoin network. Once a block is created and a new transaction is verified and included in a block, the transaction will have one confirmation. Each subsequent block (which verifies the previous state of the blockchain) provides one additional network confirmation.

Typically, between 5-10 transaction confirmations (depending on the monetary value of the transaction) are acceptable for cryptocurrency exchanges to avoid losses due to potential fraud. Therefore, if the source computing device 56 is using Bitcoin, the network computing device 60 seeks a desired number of confirmations of the amount of the cryptocurrency received by the source computing device 56 from the consensus network (e.g., via Bitcoin miners). The transaction may not be verified by the network computing device 60 for an hour or more. As such, the nonreal-time reconciliation of the cryptocurrency-based payment loop 76 takes longer than the real-time cryptocurrency-based payment loop 74.

When the network computing device 60 verifies the amount of the cryptocurrency received by the source computing device 56, the network computing device 60 instructs the cryptocurrency-based payment backing account device 64 to release the at least a portion of the locked assignable tokens that are locked to back the real-time cryptocurrency-based payment.

When the network computing device 60 does not verify the amount of the cryptocurrency received by the source computing device 56, a stake consume condition is met. For example, the network computing device 60 provides a data input to the assignable token distributed ledger technology indicating that the verification of the cryptocurrency payment failed. The verification failure is a stake consume condition that makes the at least a portion of the assignable tokens that are currently locked by the cryptocurrency-based payment backing account device 64 to back the payment transferrable from the digital asset custodial device 66 to the cryptocurrency-based payment backing account device 64 such that the network computing device 60 can withdraw the assignable tokens to cover the real-time payment.

For example, if fraudulent activity occurs (e.g., the source computing device acts maliciously to spend at two destination computing devices simultaneously, software of the network application 68 is corrupted, etc.) the network computing device 60 is operable to consume the at least a portion of the locked assignable tokens associated with the real-time cryptocurrency-based payment.

As a specific example, if the source computing device 56 attempts to double spend a transaction, the verification (e.g., the desired number of confirmations in a Bitcoin blockchain example) will not be received and the network computing device 60 will not be able to verify the amount of the cryptocurrency received by the source computing device 56. If the verification is not received, the least a portion of the locked assignable tokens associated with the real-time cryptocurrency-based payment is made transferrable to the cryptocurrency-based payment backing account device 64. The network computing device 60 is operable to withdraw (e.g., consume) the transferred amount of assignable tokens from the cryptocurrency-based payment backing account device 64 to cover the real-time payment that occurred with the destination computing device 58.

Figure 13:
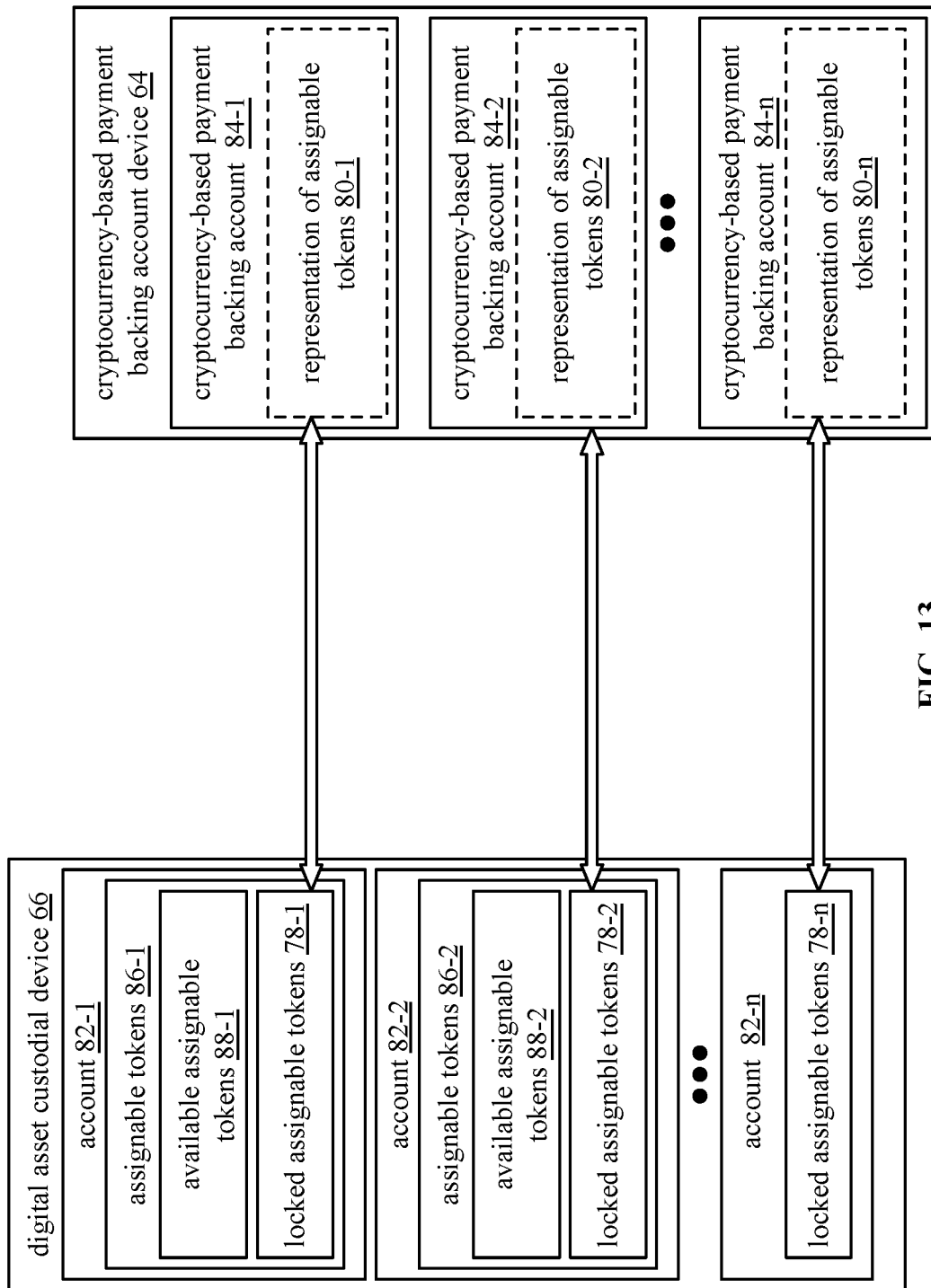
FIG. 13 is a schematic block diagram of an embodiment of a digital asset custodial device and a cryptocurrency-based payment backing account device in accordance with the present invention.

FIG. 13 is a schematic block diagram of an embodiment of a digital asset custodial device 66 and a cryptocurrency-based payment backing account device 64. The digital asset custodial device 66 includes a plurality of accounts 82-1 through 82-*n* and the cryptocurrency-based payment backing account device 64 includes a plurality of cryptocurrency-based payment backing accounts 84-1 through 84-*n*.

The account 82-1 of the digital asset custodial device 66 is associated with a first staking entity of the cryptocurrency payment system 54. The first staking entity stores assignable tokens 86-1 in account 82-1 and has assigned conditional access rights to an amount of the assignable tokens 86-1 to the cryptocurrency-based payment backing account 84-1. The first staking entity may establish the cryptocurrency-based payment backing account 84-1 or the cryptocurrency-based payment backing account 84-1 may be established by another staking entity.

The assignment of conditional access rights to the amount of the assignable tokens renders the amount of the assignable tokens locked in account 82-1 (e.g., locked assignable tokens 78-1) and a representation of the amount of the assignable tokens may be viewable to the cryptocurrency-based payment backing account 84-1 (e.g., representation of assignable tokens 80-1). In this example, the first staking entity has assigned conditional access rights to a portion of the assignable tokens 86-1 stored in account 82-1. Therefore, there is a remaining amount of available assignable tokens 88-1 (un-staked assignable tokens) of the assignable tokens 86-1 and locked assignable tokens 78-1 (staked assignable tokens). While account 82-1 is shown only storing assignable tokens 86-1, the account 82-1 may be operable to store a variety of digital assets on behalf of the first staking entity.

The account 82-2 of the digital asset custodial device 66 is associated with a second staking entity of the cryptocurrency payment system 54. The second staking entity stores assignable tokens 86-2 in account 82-2 and has assigned conditional access rights to an amount of the assignable tokens 86-2 to the cryptocurrency-based payment backing account 84-2. The assignment of conditional access rights to the amount of the assignable tokens renders the amount of the assignable tokens locked in account 82-2 (e.g., locked assignable tokens 78-2) and a representation of the amount of the assignable tokens may be viewable to the cryptocurrency-based payment backing account 84-2 (e.g., representation of assignable tokens 80-2). Similar to the above example, the second staking entity has assigned access rights to a portion of the assignable tokens 86-2 stored in account 82-2. Therefore, the account 82-2 stores assignable tokens 88-2 (un-staked assignable tokens) and locked assignable tokens 78-2 (staked assignable tokens).

The account 82-n of the digital asset custodial device 66 is associated with an nth staking entity of the cryptocurrency payment system 54. The nth staking entity stores assignable tokens in account 82-n and has assigned conditional access rights to all of the assignable tokens to the cryptocurrency-based payment backing account 84-n. The assignment of conditional access rights to the amount of the assignable tokens renders the amount of the assignable tokens locked in account 82-n (e.g., locked assignable tokens 78-n) and a representation of the amount of the assignable tokens may be viewable to the cryptocurrency-based payment backing account 84-n (e.g., representation of assignable tokens 80-n). In this example, the nth staking entity has assigned conditional access rights to all of the assignable tokens stored in account 82-n. Therefore, there are only locked assignable tokens 78-n (staked assignable tokens) shown.

While the accounts 82-1 through 82-n of the digital asset custodial device 66 are shown as holding assignable tokens and staking assignable tokens on the cryptocurrency-based payment backing account device 64, accounts of the digital asset custodial device 66 may hold assignable tokens without staking. Further, accounts of the digital asset custodial device 66 may not hold any assignable tokens.

Figure 14:
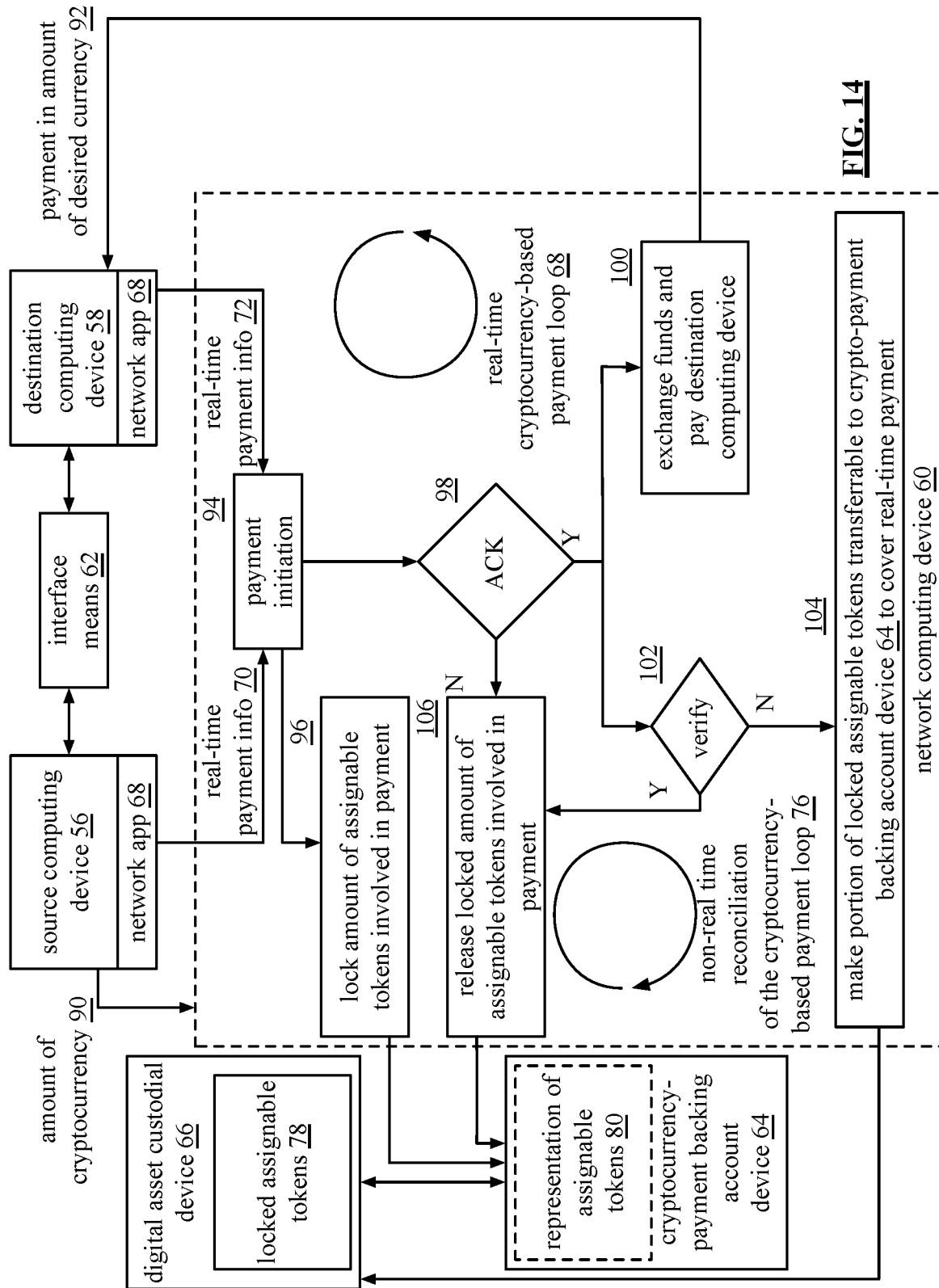
FIG. 14 is a flowchart of an example of a method for execution by a network computing device of the cryptocurrency payment system in accordance with the present invention.

FIG. 14 is a flowchart of an example of a method for execution by a network computing device 60 of the cryptocurrency payment system 54 of FIG. 12. FIG. 14 includes a source computing device 56, a destination computing device 58, a network computing device 60, an interface means 62, a cryptocurrency-based payment backing account device 64, and a digital asset custodial device 66. In this example, the source computing device 56 and the destination computing device 58 include a network application ("app") 68 that associates the respective devices to the network computing device 60.

The digital asset custodial device 66 is operable to securely store digital assets such as assignable tokens. A user of the digital asset custodial device 66 may decide to assign conditional access rights (e.g., pledge/stake) to an amount of assignable tokens to the cryptocurrency payment system 54 as collateral to back cryptocurrency-based payments of the cryptocurrency payment system 54. A user that pledges access rights to assignable tokens as collateral the cryptocurrency payment system 54 is referred to as a staking entity of the cryptocurrency payment system 54.

Due to the unique nature of the assignable tokens (e.g., via the partitioning scheme and collateral manager functionality), the assignable tokens can be stored on the digital asset custodial device 66 (or any other address controlled by an assignable token holder) while conditional access rights to the assignable tokens can be provided to the cryptocurrency-based payment backing account device 64. When conditional access rights to an amount of assignable tokens is assigned to the cryptocurrency-based payment backing account device 64, the amount of assignable tokens is locked in the custodial account of the digital asset custodial device 66 (e.g., locked assignable tokens 78) and access rights are provided to the cryptocurrency-based payment backing account device 64 in accordance with a set of conditions. Therefore, the assignable tokens are stored by the digital asset custodial device 66 but the cryptocurrency-based payment backing account device 64 is operable to have conditional access rights to the assignable tokens to back cryptocurrency-based payments of the system.

While a variety of access rights are possible, the access rights provided to the cryptocurrency-based payment backing account device 64 in this example include a right to take (e.g., via an on-chain transaction) at least a portion of the assignable tokens upon a stake consume condition, the right to lock and unlock at least a portion of the assignable tokens involved in the assignment to back transactions of the cryptocurrency payment system 54, and the right to view a representation of the assignable tokens involved in the assignment (e.g., the representation of assignable tokens 88).

The assignment of conditional access rights of the assignable tokens is in accordance with a set of conditions. The set of conditions include one or more stake release conditions and one or more consume conditions. A stake release condition is an express instruction by an account holder (e.g., the staking entity) of the digital asset custodial device 66 to un-stake at least a portion of locked assignable tokens 78. When a stake release condition is detected, the assignment of the conditional access rights to the at least a portion of assignable tokens indicated ends, the cryptocurrency-based payment backing account device 64 no longer has conditional access rights the at least a portion of assignable tokens, and the at least a portion of assignable tokens are unlocked and accessible to the digital asset custodial account 66.

A failed payment within the cryptocurrency payment system 54 is a stake consume condition. Detection of a stake consume condition renders at least a portion of the assignable tokens involved in the assignment that is currently locked to back a payment to be transferrable (e.g., as an on-chain transaction) to the cryptocurrency-based payment backing account device 64 (e.g., automatically or based on a data input) and unavailable to the custodial account associated with the failed payment.

The source computing device 56 and the destination computing device 58 interact via the interface means 62. The interface means 62 is one or more of: a direct link and a network connection. The method begins with step 94 where the network computing device 60 receives real-time payment information regarding a cryptocurrency-based payment from a source computing device 56 to a destination computing device 58. For example, the source computing device 56 sends source real-time payment information 70 to the network computing device 60 via its network application 68 and the destination computing device 58 sends destination real-time payment information 72 to the network computing device 60 its network application 68.

The source real-time payment information 70 includes a source identifier (ID) and a type of cryptocurrency it wishes to use in a real-time payment to the destination computing device 58. The destination real-time payment information 72 includes a destination identifier (ID) and a type of desired/selected currency (e.g., a fiat currency, another cryptocurrency) it wishes to receive in the real-time payment from the source computing device 56. One or more of the source real-time payment information 70 and the destination real-time payment information 72 includes the amount of the real-time payment.

When the network computing device 60 receives the real-time payment information, the network computing device 60 initiates 1) a real-time cryptocurrency-based payment process (e.g., the real-time cryptocurrency-based payment loop 68) and 2) a nonreal-time reconciliation process to reconcile the cryptocurrency-based payment with the cryptocurrency-based payment backing account device 64 (e.g., the nonreal-time reconciliation of the cryptocurrency-based payment loop 76) (i.e., "payment initiation"). The reconciliation of the cryptocurrency-based payment with the cryptocurrency-based payment backing account device 64 occurs within a time frame that is longer than the time frame of the real-time cryptocurrency-based payment.

The method continues with step 96 where, within the nonreal-time reconciliation of the cryptocurrency-based payment loop 76, the network computing device 60 instructs the cryptocurrency-based payment backing account device 64 to lock an amount of assignable tokens that it has conditional access rights to that is associated with the real-time cryptocurrency-based payment.

The method continues with step 98 where a network acknowledgment (ACK) of the receipt of the amount of the cryptocurrency is or is not generated. For example, when the network computing device 60 receives an amount of cryptocurrency 90 from the source computing device 56 to use in the real-time cryptocurrency-based payment, the ACK is generated and the method continues to steps 100 and 102. If the payment initiation is terminated (e.g., payment initiation fails and/or is cancelled by the source and/or the destination computing device) within a certain amount of time prior to the network computing device 60 continuing with the following steps of the real-time cryptocurrency-based payment loop 68, the ACK is not generated, and the real-time payment terminates. Within the nonreal-time reconciliation of the cryptocurrency-based payment loop 76, when the ACK is not generated, the method continues with step 106 where the network computing device 60 instructs the cryptocurrency-based payment backing account device 64 to release the amount of assignable tokens it has conditional access rights to that were locked for the real-time cryptocurrency-based payment.

Within the real-time cryptocurrency-based payment loop 68, when the ACK is generated, the method continues with step 100 where the network computing device 60 exchanges the amount of the cryptocurrency 90 received from the source computing device 56 to an amount of the desired currency. Cryptocurrency exchange is done quickly (e.g., 30 seconds to a few minutes) to account for exchange rate volatility. The network computing device 60 sends the payment in the amount of the desired currency 92 to the destination computing device 58 to complete the real-time cryptocurrency-based payment.

Within the nonreal-time reconciliation of the cryptocurrency-based payment loop 76, when the ACK is generated at step 98, the method continues with step 102 where the network computing device 60 verifies the amount of the cryptocurrency 90 received from the source computing device 56. For example, the network computing device 60 connects to a consensus network that verifies the amount of the cryptocurrency received from the source computing device 56. The consensus network implements a verification process that may take minutes to hours of time.

When the network computing device 60 verifies the amount of the cryptocurrency received by the source computing device 56 at step 102, the method continues to step 106 where the network computing device 60 instructs the cryptocurrency-based payment backing account device 64 to release the amount of assignable tokens it has conditional access rights to that were locked for the real-time cryptocurrency-based payment.

When the network computing device 60 does not verify the amount of the cryptocurrency received by the source computing device 56 at step 102, the method continues to step 104 where a stake consume condition is met which renders the amount of assignable tokens that were locked for the real-time cryptocurrency-based payment transferrable from the digital asset custodial device 66 to the cryptocurrency-based payment backing account device 64 such that the network computing device 60 can withdraw the amount of assignable tokens necessary to cover the real-time payment.

Figure 15:
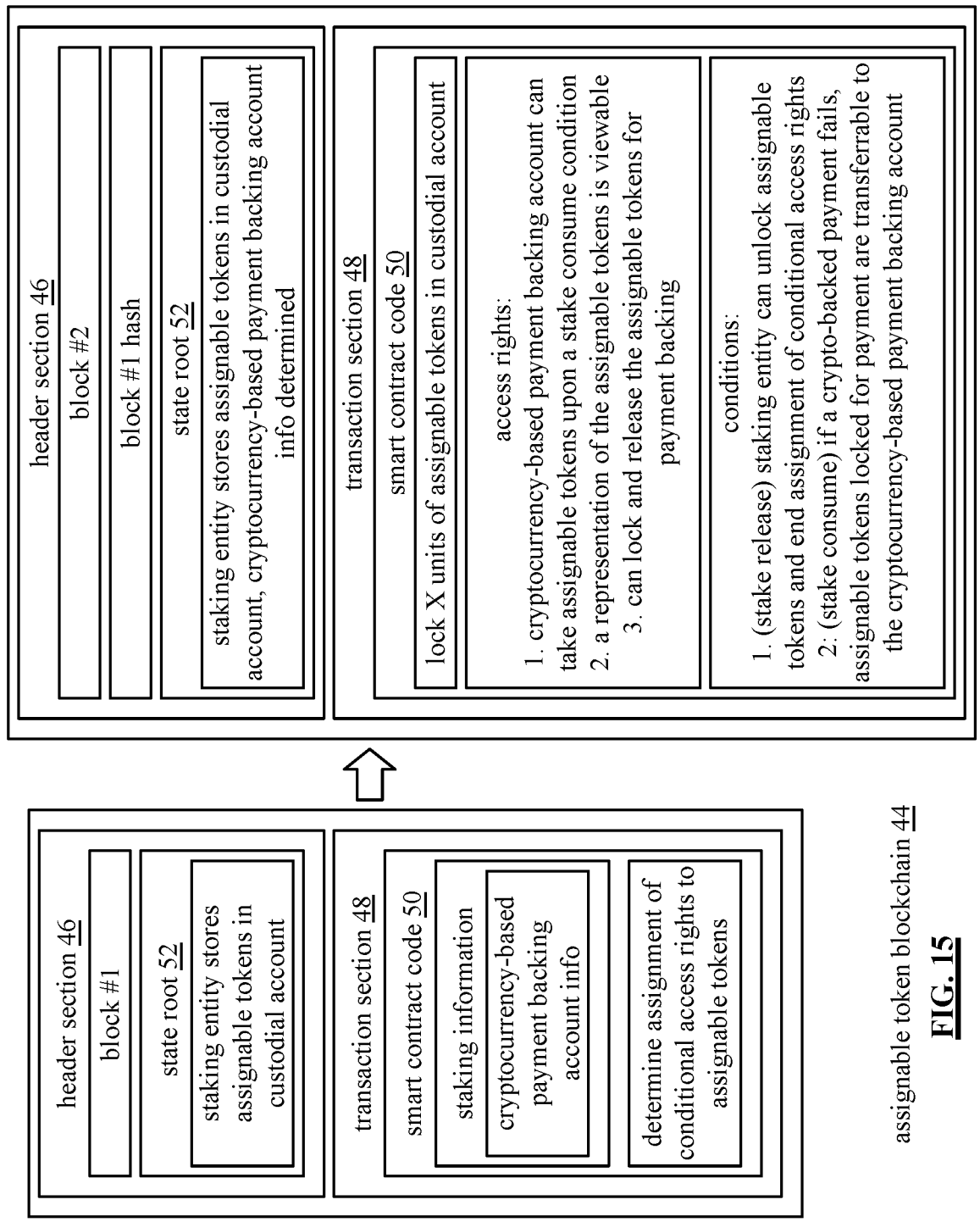
FIG. 15 is a schematic block diagram of an embodiment of an assignable token blockchain in accordance with the present invention.

FIG. 15 is a schematic block diagram of an embodiment of an assignable token blockchain 44. The assignable token blockchain 44 of FIG. 15 is similar to the assignable token blockchain of FIG. 4 except that the assignable token blockchain 44 of FIG. 15 shows information relating to cryptocurrency-backed payments of the cryptocurrency payment network of FIG. 12.

For simplicity, beginning the assignment of conditional access rights to assignable tokens begins with block #1 although numerous blocks would proceed this block. The header section 46 of block #1 includes a state root 52 which includes a current summary of the states of the accounts of the system. Here, state root 52 includes an entry that a staking entity stores assignable tokens in a custodial account (e.g., of the digital asset custodial device). When the staking entity initiates a stake to the cryptocurrency payment system using assignable tokens, the transaction section 48 of block #1 includes smart contract code 50 which includes code for staking information and that the assignment conditional access rights to assignable tokens has been determined based on the initiation of the staking. The staking information includes either establishing an account with the cryptocurrency-based payment backing account device or locating an account address for an existing cryptocurrency-based payment backing account. As block #1 is mined, the smart contract code 50 of block #1 runs.

The header section 46 of block #2 includes a hash of block #1 and a state root 52. The state root 52 includes information pertaining to the current state of the assignable token accounts. For example, the state root 52 of block #2 states that the staking entity stores assignable tokens in the custodial account and that the cryptocurrency-based payment backing account has been identified (e.g., created or found). The transaction section 48 of block #2 includes smart contract code 50 which includes the details of the assignment of conditional access rights to the assignable tokens. For example, the smart contract code 50 states that X units of assignable tokens are locked in the custodial account and lists the access rights and conditions of the assignment. The access rights include the cryptocurrency-based payment backing account's ability to take (e.g., via an on-chain transaction) an amount of the assignable tokens involved in the assignment upon a stake consume condition. The access rights further include a right for the cryptocurrency-based payment backing account to view a representation of the assignable tokens involved in the assignment, and the cryptocurrency-based payment backing account's ability to lock and unlock amounts of the assignable tokens involved in the assignment to back payments of the cryptocurrency payment system.

The conditions include a stake release condition and a stake consume condition. The stake release condition specifies that the staking entity can unlock (i.e., un-stake) any amount of X units of assignable tokens and end the assignment of conditional access rights to the amount of the X amounts if desired. Rules regarding timing and/or the amount of a stake release may be included such that the stake release would not result in cryptocurrency-based payments proceeding without adequate backing. The stake consume condition specifies that if a payment fails within the cryptocurrency payment system, the amount of assignable tokens locked by the cryptocurrency-based payment backing account for that payment are transferable to the cryptocurrency-based payment backing account and no longer available to the custodial account. As block #2 is mined, the smart contract code 50 of block #2 runs.

Figure 16A:
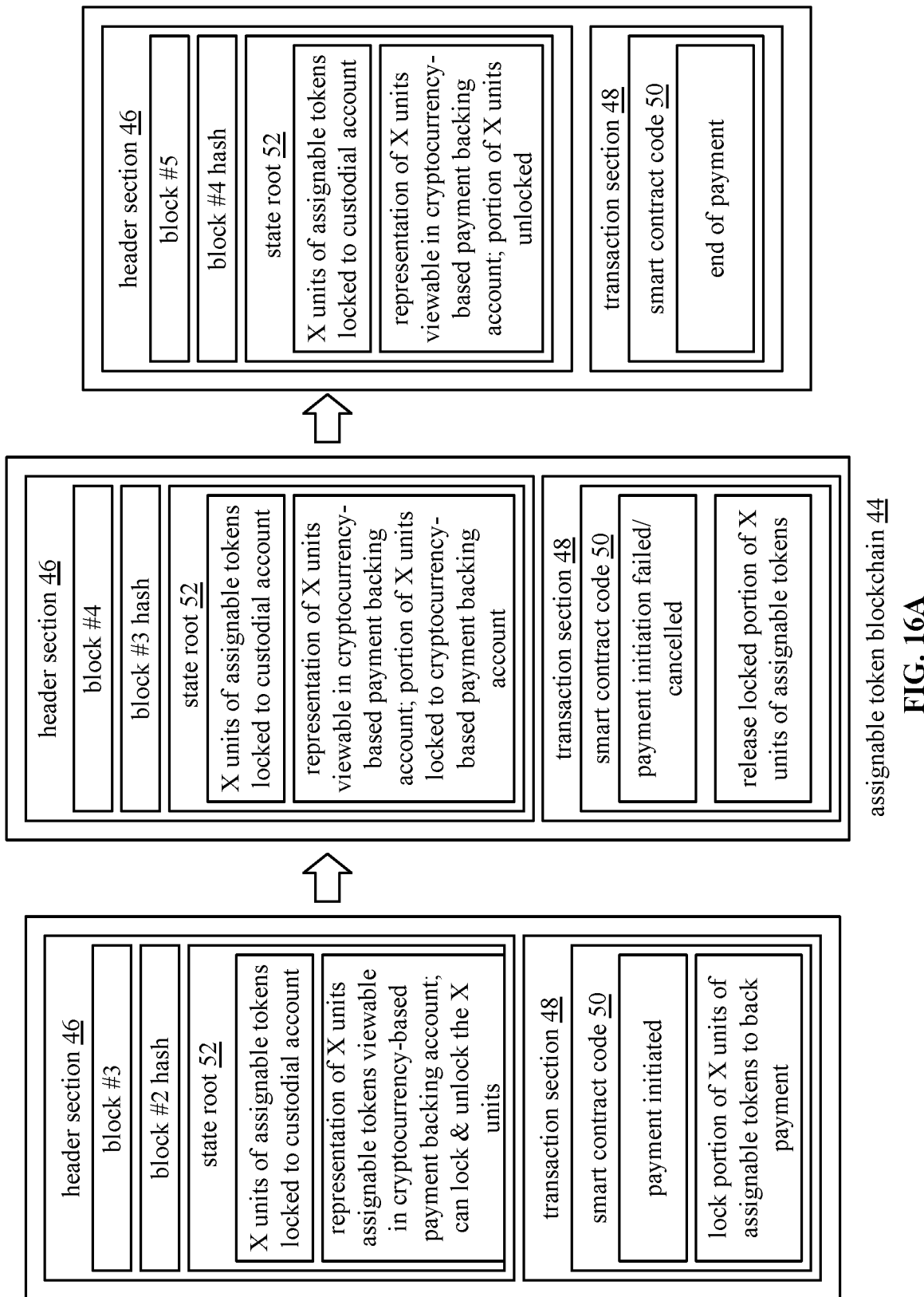

FIGS. 16A-16D are schematic block diagrams of an embodiment of an assignable token blockchain 44. FIG. 16A continues the example of FIG. 15 and includes an example of locking and unlocking assignable tokens involved in the assignment of conditional access rights to back a payment of the cryptocurrency payment system. The header section 46 of block #3 includes a hash of block #2 and a state root 52. The state root 52 includes information pertaining to the current state of the assignable token accounts.

For example, the state root 52 of block #3 states that X units of assignable tokens are locked to the custodial account and that the cryptocurrency-based payment backing account can view, lock, and unlock the X units of assignable tokens in accordance with the assigned conditional access rights. The transaction section 48 of block #3 includes smart contract code 50 which includes an indication that a payment related to the cryptocurrency-based payment backing account in the cryptocurrency payment system is initiated (e.g., the payment is initiated with a digital wallet developed by the staking entity associated with the cryptocurrency-based payment backing account). When the payment is initiated, the cryptocurrency-based payment backing account locks a portion of the X units of assignable tokens to back the payment.

The header section 46 of block #4 includes a hash of block #3 and a state root 52. The state root 52 includes information pertaining to the current state of the assignable token accounts. For example, the state root 52 of block #4 states that the X units of assignable tokens are locked to the custodial account, that the cryptocurrency-based payment backing account can view the X units of assignable tokens, and that the portion of the X units of assignable tokens are locked to the cryptocurrency-based payment backing account (e.g., the cryptocurrency-based payment backing account cannot use the locked portion to back other payments). The transaction section 48 of block #4 includes smart contract code 50 which includes an indication that the payment initiation failed or was canceled. When a payment initiation fails, the cryptocurrency-based payment backing account releases (i.e., unlocks) the locked portion of the X units of assignable tokens (e.g., the cryptocurrency-based payment backing account can now use the unlocked portion to back other payments).

The header section 46 of block #5 includes a hash of block #4 and a state root 52. The state root 52 includes information pertaining to the current state of the assignable token accounts. For example, the state root 52 of block #5 states that X units of assignable tokens are locked to the custodial account, that the cryptocurrency-based payment backing account can view the X units of assignable tokens, and that the portion of the X units of assignable tokens are unlocked to the cryptocurrency-based payment backing account. The transaction section 48 of block #5 includes smart contract code 50 indicating that the payment has ended.

Figure 16B:
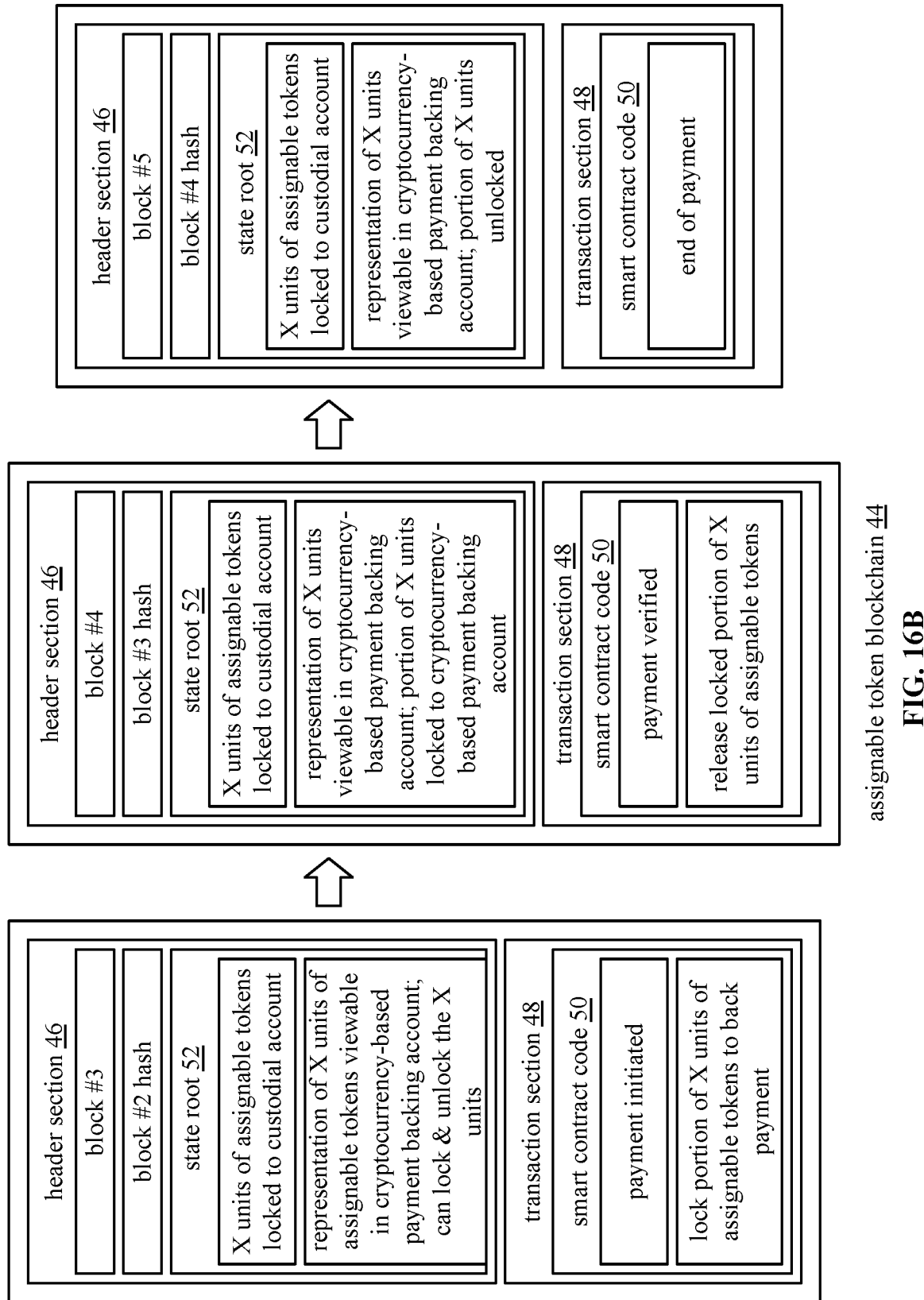

FIG. 16B continues the example of FIG. 15 and includes another example of locking and unlocking assignable tokens involved in the assignment of conditional access rights to back a payment of the cryptocurrency payment system. The header section 46 of block #3 includes a hash of block #2 and a state root 52. The state root 52 includes information pertaining to the current state of the assignable token accounts.

For example, the state root 52 of block #3 states that X units of assignable tokens are locked to the custodial account and that the cryptocurrency-based payment backing account can view, lock, and unlock the X units of assignable tokens in accordance with the assigned conditional access rights. The transaction section 48 of block #3 includes smart contract code 50 which includes an indication that a payment related to the cryptocurrency-based payment backing account in the cryptocurrency payment system is initiated (e.g., the payment is initiated with a digital wallet developed by the staking entity associated with the cryptocurrency-based payment backing account). When the payment is initiated, the cryptocurrency-based payment backing account locks a portion of the X units of assignable tokens to back the payment.

The header section 46 of block #4 includes a hash of block #3 and a state root 52. The state root 52 includes information pertaining to the current state of the assignable token accounts. For example, the state root 52 of block #4 states that the X units of assignable tokens are locked to the custodial account, that the cryptocurrency-based payment backing account can view the X units of assignable tokens, and that the portion of the X units of assignable tokens are locked to the cryptocurrency-based payment backing account (e.g., the cryptocurrency-based payment backing account cannot use the locked portion to back other payments). The transaction section 48 of block #4 includes smart contract code 50 which includes an indication that the payment was verified (e.g., verified by a consensus network). When a payment is verified, the cryptocurrency-based payment backing account releases (i.e., unlocks) the locked portion of the X units of assignable tokens (e.g., the cryptocurrency-based payment backing account can now use the unlocked portion to back other payments).

The header section 46 of block #5 includes a hash of block #4 and a state root 52. The state root 52 includes information pertaining to the current state of the assignable token accounts. For example, the state root 52 of block #5 states that X units of assignable tokens are locked to the custodial account, that the cryptocurrency-based payment backing account can view the X units of assignable tokens, and that the portion of the X units of assignable tokens are unlocked to the cryptocurrency-based payment backing account. The transaction section 48 of block #5 includes smart contract code 50 indicating that the payment has ended.

Figure 16C:
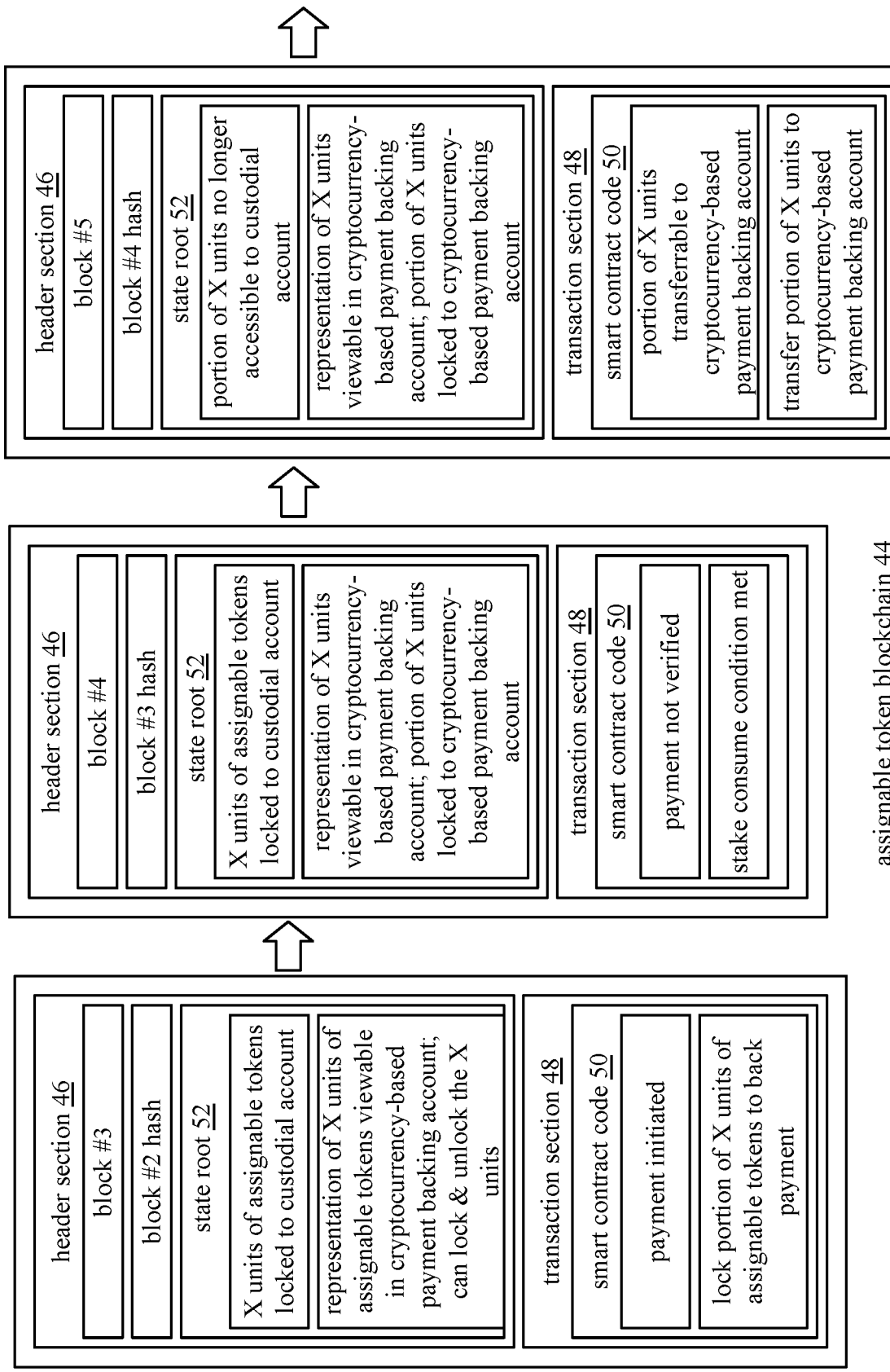
Figure 16E:
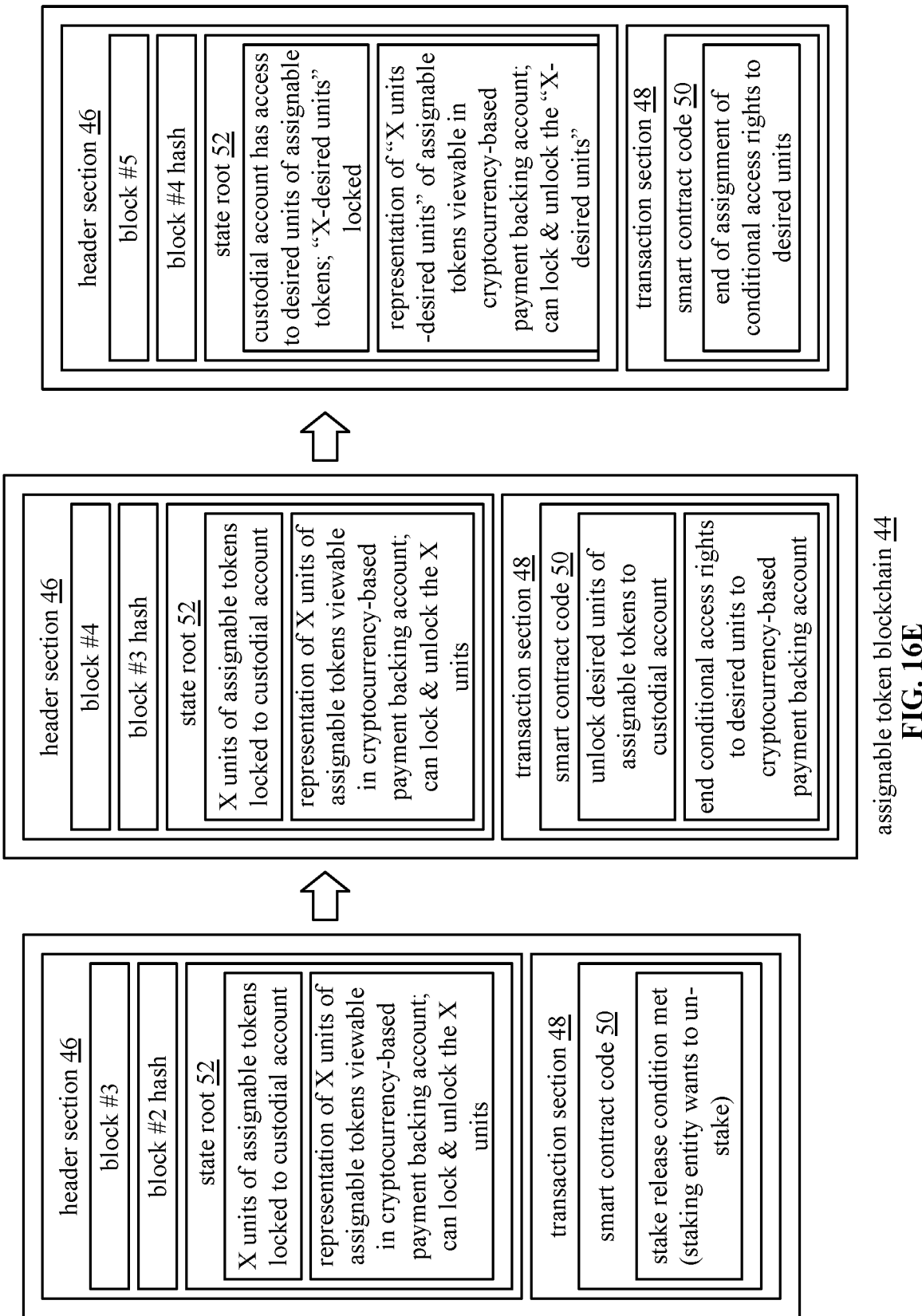

FIGS. 16C-16E continue the example of FIG. 15 and include an example of detecting a stake consume condition. In FIG. 16C, the header section 46 of block #3 includes a hash of block #2 and a state root 52. The state root 52 includes information pertaining to the current state of the assignable token accounts.

For example, the state root 52 of block #3 states that X units of assignable tokens are locked to the custodial account and that the cryptocurrency-based payment backing account can view, lock, and unlock the X units of assignable tokens in accordance with the assigned conditional access rights. The transaction section 48 of block #3 includes smart contract code 50 which includes an indication that a payment related to the cryptocurrency-based payment backing account in the cryptocurrency payment system is initiated (e.g., the payment is initiated with a digital wallet developed by the staking entity associated with the cryptocurrency-based payment backing account). When the payment is initiated, the cryptocurrency-based payment backing account locks a portion of the X units of assignable tokens to back the payment.

The header section 46 of block #4 includes a hash of block #3 and a state root 52. The state root 52 includes information pertaining to the current state of the assignable token accounts. For example, the state root 52 of block #4 states that the X units of assignable tokens are locked to the custodial account, that the cryptocurrency-based payment backing account can view the X units of assignable tokens, and that the portion of the X units of assignable tokens are locked to the cryptocurrency-based payment backing account (e.g., the cryptocurrency-based payment backing account cannot use the locked portion to back other payments). The transaction section 48 of block #4 includes smart contract code 50 which includes an indication that the payment was not verified. When a payment is not verified, a stake consume condition is met.

The header section 46 of block #5 includes a hash of block #4 and a state root 52. The state root 52 includes information pertaining to the current state of the assignable token accounts. For example, the state root 52 of block #5 states that the portion of the X units of assignable tokens is no longer accessible to the custodial account, that the cryptocurrency-based payment backing account can view the X units of assignable tokens, and that the portion of the X units of assignable tokens are locked to the cryptocurrency-based payment backing account (e.g., the cryptocurrency-based payment backing account cannot use the locked portion to back other payments). The transaction section 48 of block #5 includes smart contract code 50 indicating that the portion of the X units of assignable tokens is transferrable to the cryptocurrency-based payment backing account and is transferred to the cryptocurrency-based payment backing account (e.g., automatically or upon instruction via a data input).

FIG. 16D includes block #6 and continues the example of FIG. 16C. The header section 46 of block #6 includes a hash of block #5 and a state root 52. The state root 52 includes information pertaining to the current state of the assignable token accounts. For example, the state root 52 of block #5 states that the portion of the X units of assignable tokens is removed from the custodial account and is now stored in the cryptocurrency-based payment backing account. The transaction section 48 of block #6 includes smart contract code 50 indicating that the assignment of the conditional access rights to the portion of the X units of assignable tokens has ended.

FIG. 16E continues the example of FIG. 15 and includes an example of detecting a stake release condition. The header section 46 of block #3 includes a hash of block #2 and a state root 52. The state root 52 includes information pertaining to the current state of the assignable token accounts.

For example, the state root 52 of block #3 states that X units of assignable tokens are locked to the custodial account and that the cryptocurrency-based payment backing account can view, lock, and unlock the X units of assignable tokens in accordance with the assigned conditional access rights. The transaction section 48 of block #3 includes smart contract code 50 which includes an indication that a stake release condition is met. For example, the staking entity requests that a desired portion of the X units be un-staked (e.g., unlocked and made available to the staking entity in the custodial account). The desired portion of the X units may be some or all of the X units of assignable tokens.

The header section 46 of block #4 includes a hash of block #3 and a state root 52. The state root 52 includes information pertaining to the current state of the assignable token accounts. For example, the state root 52 of block #4 states that X units of assignable tokens are locked to the custodial account and that the cryptocurrency-based payment backing account can view, lock, and unlock the X units of assignable tokens in accordance with the assigned conditional access rights. The transaction section 48 of block #4 includes smart contract code 50 to unlock the desired portion of the X units of the assignable tokens in the custodial account and to end the conditional access rights to the desired portion of the X units of the assignable tokens to the cryptocurrency-based payment backing account.

The header section 46 of block #5 includes a hash of block #4 and a state root 52. The state root 52 includes information pertaining to the current state of the assignable token accounts. For example, the state root 52 of block #5 states that the custodial account has access to the desired portion of the X units of the assignable tokens (e.g., where X minus the desired portion of X units are still locked) and that the cryptocurrency-based payment backing account can view, lock, and unlock X units minus the desired portion of X units of assignable tokens in accordance with the assigned conditional access rights. The transaction section 48 of block #5 includes smart contract code 50 indicating that the assignment of conditional access rights to the desired portion of the X units of the assignable tokens to the cryptocurrency-based payment backing account has ended.

Figures 17, 18:
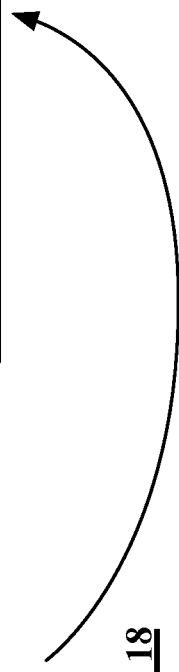
FIG. 17 is a schematic block diagram of an embodiment of an assignable token balance distribution with staking in accordance with the present invention.
FIG. 18 is a schematic block diagram of an embodiment of an assignable token balance distribution with a staking rewards transfer in accordance with the present invention.

FIG. 17 is a schematic block diagram of an embodiment of an assignable token balance distribution with staking. Staking is the collateral backing of cryptocurrency payment system payments via assignable tokens as discussed with one or more of the previous Figures. The assignable token balance distribution of FIG. 17 is similar to the example of FIG. 10B and includes a first assignable token holder with an address 1, a second assignable token holder with an address 2, a third assignable token holder with an address 3, and a collateral manager 164 with an address 4. In this example, each address includes four partitions: a zero partition (partition 0), a partition 1, a partition 2 controlled by the collateral manager 164, and a partition 3 controlled by the collateral manager 164. Assignable tokens distributed to partitions controlled by the collateral manager 164 is referred to as staking. In this example, the collateral manager 164 operates similarly to the cryptocurrency-payment backing account device of previous Figures and the addresses 1-4 may be addresses (i.e., accounts) with a digital asset custodial device as discussed with reference to one or more previous Figures.

A partition owner (e.g., the collateral manager 164 is the partition owner of partitions 2 and 3) is given permission to call the transfer by partition function for any address for any partition within its owned space. This strategy allows for a stake-in-place collateralization mechanism where a holder retains the assignable tokens at their address while simultaneously providing the assignable tokens as collateral to the delegated collateral manager 164. Any changes that affect the balance (e.g., if staking rewards are granted or collateral is consumed) are reflected directly in the partition by on-chain transfers executed by the collateral manager 164.

In this example, the collateral manager 164 controls 300 assignable tokens (denoted with an asterisk) across partitions 2 and 3. The amount staked by each address in each partition is recorded independently. Addresses 1-3 have total balances of 100, 200, and 300 respectively and each have delegated control of only a portion of their assignable tokens to the collateral manager 164.

The address 1 has an assignable token balance of 100 where 50 assignable tokens are within partition 1 and controlled by the first assignable token holder and 50 assignable tokens are within partition 2 and controlled by the collateral manager 164. The address 2 has an assignable token balance of 150 where 50 assignable tokens are within partition 1 and controlled by the second assignable token holder, 50 assignable tokens are within partition 2 and controlled by the collateral manager 164, and 100 assignable tokens are within partition 3 and controlled by the collateral manager 164. The address 3 has an assignable token balance of 300 where 200 assignable tokens are within partition 0 and controlled by the third assignable token holder and 100 assignable tokens are within partition 3 and controlled by the collateral manager 164.

The collateral manager 164 holds 1000 assignable tokens in the zero partition of address 4 which it could use to grant staking rewards to the first, second, and third assignable token holders as an incentive for delegating assignable tokens to the collateral manager 164.

To remove (i.e., un-stake) assignable tokens delegated to the collateral manager 164, an assignable token holder can invoke the transfer by partition function to transfer assignable tokens from partitions 2 or 3 to any of their other partitions. The collateral manager 164 will receive a tokens to transfer hook which is capable of rejecting the operation if the transfer is not authorized due to staking conditions. This could be used to enforce rules custom to the collateral manager 164 such as staking duration requirements or withdrawal limits.

FIG. 18 is a schematic block diagram of an assignable token balance distribution with a staking rewards transfer. In this example, the collateral manager 164 distributes (using the transfer by partition function) a staking reward of 25 assignable tokens to each non-zero address-partition combination that has delegated assignable tokens to the collateral manager 164.

After the staking rewards have been distributed, address 1, partition 2 has a balance of 75 assignable tokens; address 2, partition 2 has a balance of 75 assignable tokens; address 2, partition 3 has a balance of 125 assignable tokens; and address 3, partition 3 has a balance of 125 assignable tokens. The assignable token holders receiving rewards can observe their distributions on chain within the scope of their own addresses.

The collateral manager 164 controls 400 assignable tokens (denoted with an asterisk) across the two partitions after the rewards distribution. The collateral manager's zero partition balance is reduced from 1000 to 900 such that the token assignable token supply is unchanged.

FIG. 19 is a schematic block diagram of an embodiment of an assignable token balance distribution with a collateral pool manager 166. The distribution includes a first assignable token holder with an address 1, a second assignable token holder with an address 2, a third assignable token holder with an address 3, and a collateral pool manager 166 with an address 4. In this example, each address includes four partitions: a zero partition (partition 0), a partition 1, a partition 2 controlled by a collateral pool manager 166, and a partition 3 controlled by the collateral pool manager 166.

The collateral pool manager 166 is similar to the collateral manager of previous Figures. A collateral pool refers to the assignable tokens staked in partitions 2 and 3 that have been "pooled" or transferred to partitions 2 and 3 of the collateral pool manager's 166 address. With the collateral pool example, every address is considered to be an operator on all partitions controlled by the collateral pool manager 166 such that even though the assignable tokens are not associated with the holders' addresses, the holders have the ability to use the transfer by partition function to transfer assignable tokens to a non-collateral pool managed partition of their address. Limits on transfers (beyond the standard limits on balance set forth in the assignable token contract) out of the collateral pool manager managed partitions is delegated to the collateral pool manager 166 (e.g., the collateral pool manager 166 is responsible for tracking the amount transferrable out of the collateral pool manager managed partitions for individual stakers).

In this example, a total of 300 assignable tokens have been delegated to the collateral pool manager 166 (denoted with an asterisk) across partitions 2 and 3. As in FIG. 17, addresses 1-3 have total balances of 100, 200, and 300 respectively and each have delegated control of only a portion of their assignable tokens to the collateral manager 164. The address 1 has an assignable token balance of 100 where 50 assignable tokens are within partition 1 and controlled by the first assignable token holder and 50 assignable tokens are within partition 2 of the collateral pool manager 166 address. The address 2 has an assignable token balance of 150 where 50 assignable tokens are within partition 1 and controlled by the second assignable token holder, 50 assignable tokens are within partition 2 of the collateral pool manager 166 address, and 100 assignable tokens are within partition 3 of the collateral pool manager 166 address. The address 3 has an assignable token balance of 300 where 200 assignable tokens are within partition 0 and controlled by the third assignable token holder and 100 assignable tokens are within partition 3 of the collateral pool manager 166 address.

The collateral pool manager 166 tracks the balances within each pool within the collateral manager contract or by an off-chain method (e.g., an off-chain oracle). The immutability of the assignable token supply is guaranteed by the assignable token contract while holders can observe the overall pool balances increase.

The collateral manager 164 holds 1000 assignable tokens in the zero partition of address 4 which it could use to grant staking rewards to the first, second, and third assignable token holders as an incentive for delegating assignable tokens to the collateral pool manager 166.

To remove (i.e., un-stake) assignable tokens delegated to the collateral pool manager 166, an assignable token holder can invoke the transfer by partition function to transfer assignable tokens from partitions 2 or 3 to any of their other partitions. The collateral pool manager 166 will receive a tokens to transfer hook which is capable of rejecting the operation if the transfer is not authorized due to staking conditions and/or the individual balance limits tracked by the collateral pool manager 166.

FIG. 20 is a schematic block diagram of an assignable token balance distribution with a pool-based staking rewards transfer. Similar to the example of FIG. 18, the collateral pool manager 166 distributes a staking reward of 25 assignable tokens to each non-zero address-partition combination that has delegated assignable tokens to the collateral manager 164. However, in this example, the staking rewards are pooled to partitions 2 and 3 of the collateral pool manager address 3 and the collateral pool manager keeps track of the new balances.

For example, the collateral pool manager 166 controls 400 assignable tokens (denoted with an asterisk) across partitions 2 and 3 of address 3 after the rewards distribution. The collateral pool manager's zero partition balance is reduced from 1000 to 900 such that the token assignable token supply is unchanged. The collateral pool manager 166 keeps track of the individual holder's balances (e.g., address 1, partition 2 has a balance of 75 assignable tokens; address 2, partition 2 has a balance of 75 assignable tokens; address 2, partition 3 has a balance of 125 assignable tokens; and address 3, partition 3 has a balance of 125 assignable tokens). The assignable token holders receiving rewards can observe cumulative rewards on chain.

With reference to the cryptocurrency payment system of previous Figures, the partitioning scheme with collateral managers allow the cryptocurrency payment system to liquidate (i.e., consume) supplied collateral if a payment is not settled and distribute rewards to stakers based on successful payments facilitated by the staked collateral.

For cryptocurrency payment system enabled payments, the maximum payment rate (and therefore collateral-related operations) may exceed the maximum transaction throughput of the blockchain hosting the assignable tokens (e.g., the Ethereum blockchain) necessitating the use of a pool partition validator strategy (i.e., use of the collateral pool manager). Cryptocurrency payment system rewards may be calculated on a per-transaction basis in an off-chain (e.g., oracle) system and represented on-chain using periodic batch transactions. With increased scalability, the cryptocurrency payment system could leverage distinct collateral partition validator strategies enabling collateral transfers and on-chain balances.

To stake on the cryptocurrency payment system, each network application (e.g., digital wallet application) generates a unique partition within the scope of the strategy and collateral manager to which application-specific rewards are deposited (e.g., successful settlement) and from which consumed collateral is transferred (e.g., failed settlement). These pools are represented as sub-partitions within the partition scope for the collateral manager.

To stake collateral to a particular application on the cryptocurrency payment system, assignable token holders transfer assignable tokens to the partition corresponding to the desired application using the transfer by partition function. Valid partitions must be registered within the collateral manager and transfers to partitions outside of the allow list are blocked by the transfer validation hook from the assignable token contract. There are no other restrictions on assignable token holders supplying assignable tokens to the cryptocurrency payment system collateral pool manager.

Since all addresses are operators on the partitions within the collateral pool manager partition scope (per the collateral pool partition validator registration) any user can call transfer by partition on assignable tokens with the from address of the collateral pool manager, the from partition (a cryptocurrency payment system collateral pool), and any "to" address. The validation of the transfer includes calling the tokens to transfer hook on the collateral pool manager to approve/disapprove the transfer.

To approve transfers, the cryptocurrency payment system can maintain a set of authorized outgoing transfers on the collateral pool manager contract. In order to handle frequent requests, withdrawal authorizations can be hashed within a data structure such as Merkle trees where corresponding roots are published regularly within the contract itself. Proofs supplied to holders are not valid for subsequent trees so a continuous set of valid roots is available to provide adequate time to execute withdrawals (inclusive of on-chain confirmation). To ensure withdrawal is authorized and multiple valid roots can only be executed once, a withdrawal authorization ledger can be maintained across the trees. While Merkle trees are referenced throughout, other data structures that serve to verify and synchronize data may be used.

The transactions recorded within the Merkle tree represent an updated, withdrawable balance for a given account. To ensure that multiple instances of balance updated cannot by claimed, each transaction may include a nonce and a maximum last-nonce. The latest used nonce for every address/partition combination is stored within the collateral manager contract. In addition to tracking the last withdrawal nonce used by each account and partition, the contract also tracks the cumulative sum of executed withdrawals. When a withdrawal balance is updated, its hash can be stored in a Merkle tree along with previous balance updates for batch inclusion. The withdrawal authorization data included in each leaf node may include the supplier (i.e., the assignable token staker address), the partition (i.e., the partition from which the assignable tokens will be withdrawn), the assignable token amount for withdrawal, and the maximum last nonce value of the last executed withdrawal authorization for the user and partition.

After a collateral withdrawal has been authorized, the user can execute it using the transfer by partition method. This is similar to a standard transfer, except that the withdrawal authorization data is included in the operator data field and is passed to the collateral manager for the explicit purpose of opening a channel to the staker (i.e., supplier). The data included in the field for withdrawals can include the withdrawal type, the staker, the maximum last nonce, and the Merkle tree proof. These values can be encoded. The assignable token contract passes the operator data to the collateral manager through the standard assignable token transfer hold and the validation of the supplied data against the set of current Merkle roots can be performed on chain. This approach demonstrates the extensibility of the open interface between the assignable tokens and various collateral manager contracts and gives the cryptocurrency payment system ability to rapidly authorize transfers regardless of the hosting blockchain's network conditions.

To prevent attacks against the cryptocurrency payment system collateral manager, staked collateral is not automatically authorized for withdrawal and must be requested. Prior to releasing collateral and appending a withdrawal authorization Merkle tree, all payments backed by the collateral need to be settled (or if not settled, then the assignable tokens are consumed). After this process is completed, the requested or maximum allowed withdrawal (whichever is less) can be authorized on chain and is considered released. Stakers request a withdrawal by calling the request release function on the cryptocurrency payment system collateral manager. Once the collateral is released, the cryptocurrency payment system provides the amount authorized, nonces, and Merkle tree proof. On-chain release requests ensure that account authorization cannot be compromised. The response from the cryptocurrency payment system is safe to broadcast publicly as the cryptocurrency payment system collateral manager only allows withdrawal transfers to be initiated by the original staker or approved operators of the collateral manager contract (i.e., operators are immutable for withdrawal authorizations).

The release request function and event may contain an open data field that can be used to incorporate destination information. This metadata can be used by the cryptocurrency payment system to autonomously complete withdrawal transfer.

Given the permissionless platform that decentralized finance provides, withdrawal functions should ensure autonomous operation in the unlikely scenario that the cryptocurrency payment system ceases to publish withdrawal roots for any reason (i.e., assignable tokens will always remain recoverable from collateral managers). To achieve this, the assignable token contracts may include a time-locked fallback withdrawal mechanism that allows users to recover funds after a period of inactivity. The fallback mechanism may achieve this by proactively tracking the number of unreleased assignable tokens available for withdrawal on chain (inclusive of balance updates due to collateral consumption and earned rewards), as well as which supply receipts have been unrecognized and therefore reversible.

A tokens received hook is designed to not only seek authorization for the receipt of tokens from collateral managers, but also to store metadata for received transfers. This can be leveraged in the cryptocurrency payment system collateral manager by storing a record of every received transfer along with a nonce. The same data can also be emitted in an event that is observable off-chain which is useful for tagging aggregate data published asynchronously to the contract.

To authorize the retrieval of the balance of all accounts and partitions in the event that the cryptocurrency payment system discontinues operating the collateral manager contract, the full set of balances is preemptively and routinely published. A fallback Merkle tree can be generated (separately from the standard withdrawal authorization Merkle trees) and published to the contract. Each leaf in the tree may contain the address, the partition, and the maximum cumulative withdrawal amount. The maximum cumulative withdrawal amount is the sum of all previous withdrawal amounts, currently authorized withdrawal amounts, and the current number of unreleased assignable tokens for the address and partition.

Note this value increases geometrically, but given assignable token total supply of 100,000,000,000 tokens, approximately $10^{48}$ withdrawals of total supply are required prior to unit 256 value overflow. The data is generated for all addresses and partitions and subsequently hashed to generate the fallback withdrawal authorization Merkle tree. The root of the fallback tree is published, along with the latest observed supply receipt nonce to reset the configures fallback time-lock period. Unlike the standard withdrawal process, this does not require a ledger of authorized trees; only the most recent values stored on-chain.

After the configure time-lock period has expired, stakers can withdraw their full balances using the assignable token transfer by partition function. Similar to standard withdrawals, the authorization data validated against the current fallback authorization Merkle tree can be encoded (e.g., ABI-encoded) and sent in the operator data parameter. The assignable token contract passes the operator data (including the source, destination, and number of tokens) to the collateral manager through the standard token transfer hooks, and its validation against the current Merkle root is performed on chain.

Stake receipts with nonce values less than or equal to the record highest deposit nonce are accounted for within the fallback withdrawal data, while supply receipts with higher nonces are not. It is possible that transfers are made to the collateral manager contract after the last fallback withdrawal authorization root is published; those stakes should also be unlocked. To make those assignable tokens available in the fallback scenario, there is an additional withdrawal type that can be executed by stakers to reverse transfers via the standard assignable token transfer by partition function with the operator data of withdrawal type and supply receipt nonce. The fallback withdrawal mechanism is natively integrated with the hooks provided by the assignable token.

The assignable token smart contract is compatible with existing network limitation and is compatible with scaling enhancement such as zero-knowledge proof (ZKP) systems, optimistic rollups, and Ethereum 2.0. It is expected that at scale, collateral managers will have access to secure micro-collateralization transactions on-chain. Additionally, future assignable tokens rewards distributions can be made using verifiable and trustless ZKPs to decrease transaction costs as well as preserve network data privacy. Assignable token partitions can also enable the issuance of new types of collateral assets for simultaneous use across platforms. Collateral managers can mint bearer tokens based on any staked collateral; for instance, allowing non-custodial transfers of proxy yield tokens derived from assignable tokens. This method is also practical for DLT-based networks to facilitate cross-chain token minting for rapid collateral deployment.

Assignable tokens have been designed as a low-volatility collateral token that continuously appreciates in value as a direct result of its utility. It mirrors a shift toward open token networks wherein users create and derive all intrinsic platform value through endogenous economic incentives. Since assignable tokens are backed by its literal use and not extrinsic assets, it is critical to model its economic foundation. Ultimately, this model is more cost efficient and productive than existing business models. Assignable tokens employ simple and transparent financial primitives (e.g., fixed supply, rudimentary staking mechanics), and avoids complicated synthetic or derivative instruments, rebasing mechanisms, multi-asset algorithmic models, and artificial constraints that are overly complex to users. Instead, assignable tokens focus on providing high-quality collateral, stability, and self-sustaining characteristics to create exponentially more utility. As such, the virtuous cycle of staking and rewards distribution supports collateral integrity.

Figure 21:
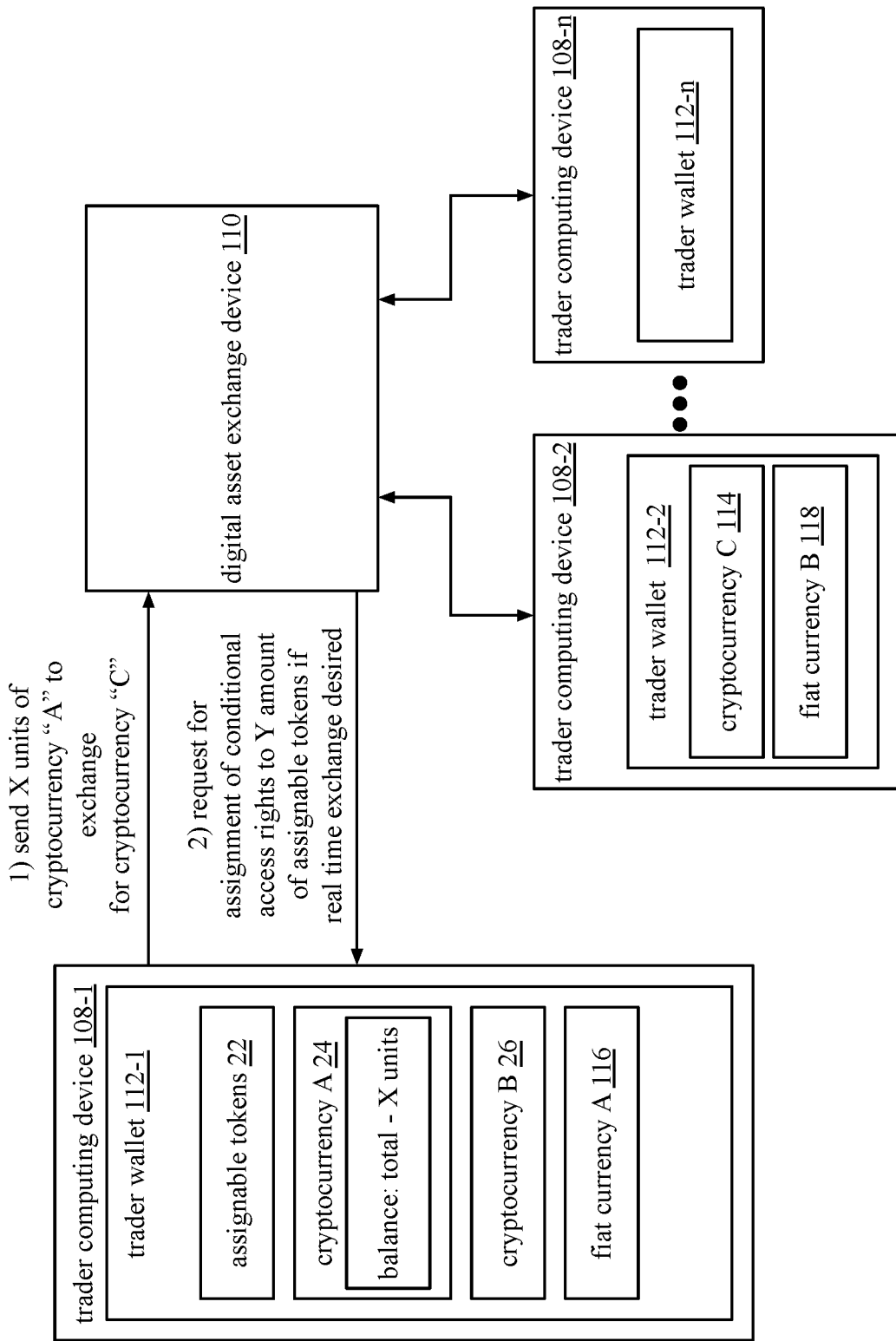
FIG. 21 is a flowchart of a method of an example of assigning conditional access rights to assignable tokens for real-time digital asset exchange in accordance with the present invention.

FIG. 21 is a flowchart of a method of an example of assigning conditional access rights to assignable tokens for real-time digital asset exchange. FIG. 21 includes a plurality of trader computing devices 108-1 through 108-n and a digital asset exchange device 110.

The trader computing devices 108-1 through 108-n and the digital asset exchange device 110 may be portable computing devices and/or fixed computing devices. A portable computing device may be a social networking device, a gaming device, a cell phone, a smart phone, a digital assistant, a digital music player, a digital video player, a laptop computer, a handheld computer, a tablet, a video game controller, a portable merchant point-of-sale (POS) device (e.g., a mobile device with POS capabilities) and/or any other portable device that includes a computing core. A fixed computing device may be a computer (PC), a computer server, a cable set-top box, a satellite receiver, a television set, a printer, a fax machine, home entertainment equipment, a video game console, a fixed merchant point-of-sale (POS) device (e.g., cash register), and/or any type of home or office computing equipment.

The digital asset exchange device 110 is associated with a digital asset exchange company that may be specially licensed and insured to exchange digital assets such as cryptocurrency, cryptocurrency tokens, etc. The digital asset exchange company may further be certified as a cryptocurrency holding company that may be specially licensed to custody (e.g., hold, move, and protect) digital assets.

The trader computing devices 108-1 through 108-n 1 include trader wallets 112-1 through 112-n that are associated with the digital asset exchange device 110 and function to store, manage, and connect to the digital asset exchange device 110 to exchange digital assets. For example, the trader wallets 112-1 through 112-n are digital wallets that may be custodial digital wallets associated with the digital asset exchange device 110 (e.g., when the digital asset exchange company associated with the digital asset exchange device 110 is certified to custody digital assets). Alternatively, the trader wallets 112-1 through 112-n may be non-custodial digital wallets associated with the digital asset exchange device 110 where the non-custodial digital wallets store digital assets and the computing devices 108-1 through 108-n manage the private keys to the non-custodial digital wallets. Alternatively, the trader wallets 112-1 through 112-n may be network enabled smart contracts.

As shown, the trader wallet 112-1 of the trader computing device 108-1 stores and manages a variety of digital assets including assignable tokens 22, cryptocurrency A 24, cryptocurrency B 26, and fiat currency A 116 (e.g., US dollars). The trader wallet 112-2 of the trader computing device 108-2 stores and manages cryptocurrency C 114 and fiat currency B 118 (e.g., Canadian dollars). Instead of (or in addition to) directly storing fiat currency, a user of a trader computing device may link a bank account to its trader wallet to trade fiat currency with the digital asset exchange device 110.

The digital asset exchange device 110 exchanges digital assets by connecting buyers and sellers (e.g., trader computing devices 108-1 through 108-n) of digital assets. The digital asset exchange device 110 sets exchange rates based on the actions of the plurality of trader computing devices 108-1 through 108-n. For example, a currency exchange rate is based on a total volume of trades involving the currency and the supply and demand of the plurality of trader computing devices 108-1 through 108-n for the currency. A larger volume of traders and activity allows an exchange to have market relevant exchange rates.

When an exchange involves cryptocurrency (or other digital asset) that is not custodied for the trader by the digital asset exchange device, the cryptocurrency must be sent to the digital asset exchange device 110 where the digital asset exchange device 110 must verify the cryptocurrency sent. For example, the digital asset exchange device 110 connects to a consensus network to verify the amount of the cryptocurrency received for exchange. The consensus network implements a verification process that may take minutes to hours of time.

For example, in the Bitcoin blockchain, miners record new transactions into blocks that verify all previous transactions within the blockchain. At the filing of this application, it takes a miner ten minutes on average to write a block on the Bitcoin blockchain and the average block time depends on a total hash power of the Bitcoin network. Once a block is created and a new transaction is verified and included in a block, the transaction will have one confirmation. Each subsequent block (which verifies the previous state of the blockchain) provides one additional network confirmation.

Typically, between 5-10 transaction confirmations (depending on the monetary value of the transaction) are acceptable for cryptocurrency exchanges to avoid losses due to potential fraud. Therefore, if a trader computing device is exchanging Bitcoin, the digital asset exchange device 110 seeks a desired number of confirmations of the amount of the Bitcoin received by the trader computing device from the consensus network (e.g., via Bitcoin miners). As such, the transaction may not be verified by the digital asset exchange device 110 for an hour or more.

To exchange cryptocurrency (or other digital assets) in real-time (e.g., within seconds to a minute of time), a trader computing device can assign the digital asset exchange device 110 conditional access rights to an amount of assignable tokens in order to back the cryptocurrency exchange. As discussed with reference to one or more previous Figures, the partitioning scheme and collateral manager concepts of assignable tokens allows one party to assign conditional access rights to the assignable tokens 22 to another party while maintaining custody of the assignable tokens 22.

For example, the method begins with step 1 where the trader computing device 108-1 sends X units of cryptocurrency A to the digital asset exchange device 110 to exchange for cryptocurrency C. The trader wallet 112-1 is shown as storing a balance of "total minus X units" of cryptocurrency A 24 after sending the X units of cryptocurrency A to the digital asset exchange device 110.

The method continues with step 2 where the digital asset exchange device 110 sends the trader computing device 108-1 a request for assignment of conditional access rights to Y amount of assignable tokens if the trader computing device 108-1 wishes to exchange cryptocurrency A to cryptocurrency C in real-time. The Y amount of assignable tokens has a monetary value that is a substantial equivalent to X units of cryptocurrency A at that point in time. Alternatively, the trader computing device 108-1 sends X units of cryptocurrency A to the digital asset exchange device 110 along with an assignment of conditional access rights to Y amount of assignable tokens in step 1 (e.g., without a query from the digital asset exchange device 110). The digital asset exchange device 110 is operable to alert the trader computing device 108-1 if the assignment of the conditional access rights to an amount of assignable tokens requires adjustment (e.g., the exchange is not adequately backed by the amount assigned).

Figure 22:
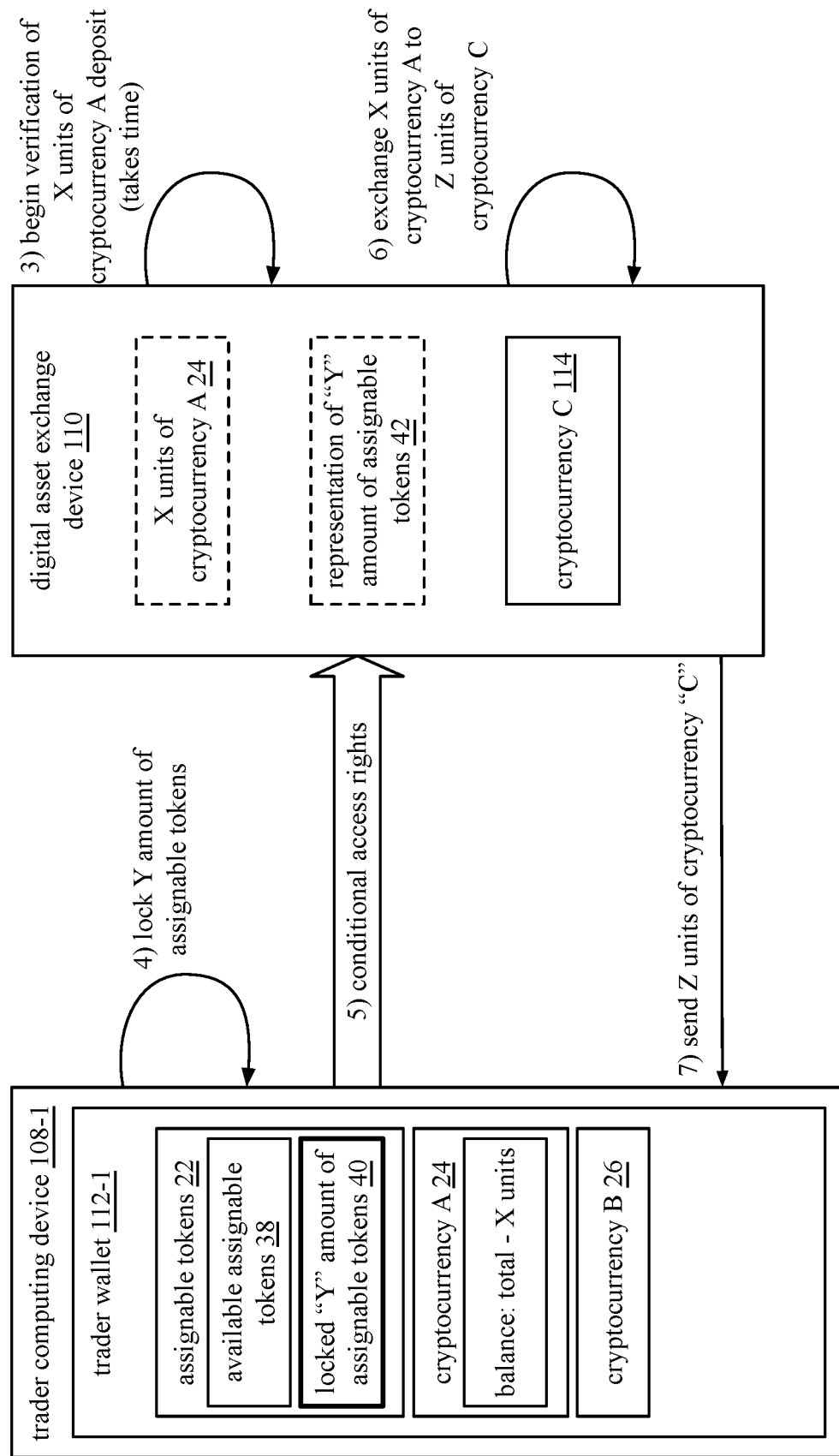
FIG. 22 is a flowchart of a method of an example of assigning conditional access rights to assignable tokens for real-time digital asset exchange in accordance with the present invention.

FIG. 22 is a flowchart of a method of an example of assigning conditional access rights to assignable tokens for real-time digital asset exchange that continues the method of FIG. 11. The method continues with step 3 where the digital asset exchange device 110 begins verification of the deposit of the X units of cryptocurrency A (e.g., the digital asset exchange device 110 waits for a desired number of confirmations from a consensus network).

The method continues with step 4 where the trader computing device 108-1 locks Y amount of assignable tokens. In this example, the trader wallet 112-1 of the trader computing device 108-1 also stored available assignable tokens 38 (e.g., an amount of assignable tokens that are not locked). The method continues with step 5 where the conditional access rights to the Y amount of the assignable tokens is provided to the digital asset exchange device 110. For example, access rights include a right of the digital asset exchange device 110 to take the Y amount of assignable tokens 42 (e.g., the Y amount of assignable tokens are transferrable to the digital asset exchange device 110 via an on-chain transaction) upon a consume condition, the right to view a representation of the Y amount of assignable tokens 42, etc. As another example, the digital asset exchange device 110 may have some access rights to control (e.g., lock, unlock, etc.) move, transfer, assign, etc., the Y amount of assignable tokens during the assignment.

The assignment of conditional access rights is in accordance with a set of conditions. The set of conditions include one or more release conditions and one or more consume conditions. A release condition is an event that triggers a release (i.e., ending) of the assignment of the conditional access rights to the Y amount of assignable tokens. A release removes the access rights provided and/or promised to the digital asset exchange device 110 and makes the Y amount of assignable tokens available to the trader wallet 112-1. A consume condition is an event that allows the digital asset exchange device 110 to consume (i.e., take) the amount of the assignable tokens. A consume renders the Y amount of assignable tokens transferrable to the digital asset exchange device 110 and no longer available to the trader wallet 112-1. The transfer may occur automatically or in response to an instruction by a data input. Examples of release and consume conditions are discussed with reference to FIGS. 13A-13B.

The method continues with step 6 where, when the conditional access rights to the Y amount of assignable tokens are assigned, the digital asset exchange device 110 exchanges the X units of cryptocurrency A to Z units of cryptocurrency C where Z units of cryptocurrency C is substantially equal to the X units of cryptocurrency A at that time. The digital asset exchange device 110 has access to an amount of verified cryptocurrency C 114 to execute the exchange (e.g., via a trader (e.g., such as the trader computing device 108-2) deposit, a liquidity pool, a trader's custodial account, etc.).

The method continues with step 7 where the digital asset exchange device 110 sends the Z units of cryptocurrency C to the trader computing device 108-1 to complete the real-time cryptocurrency exchange.

Figure 23A:
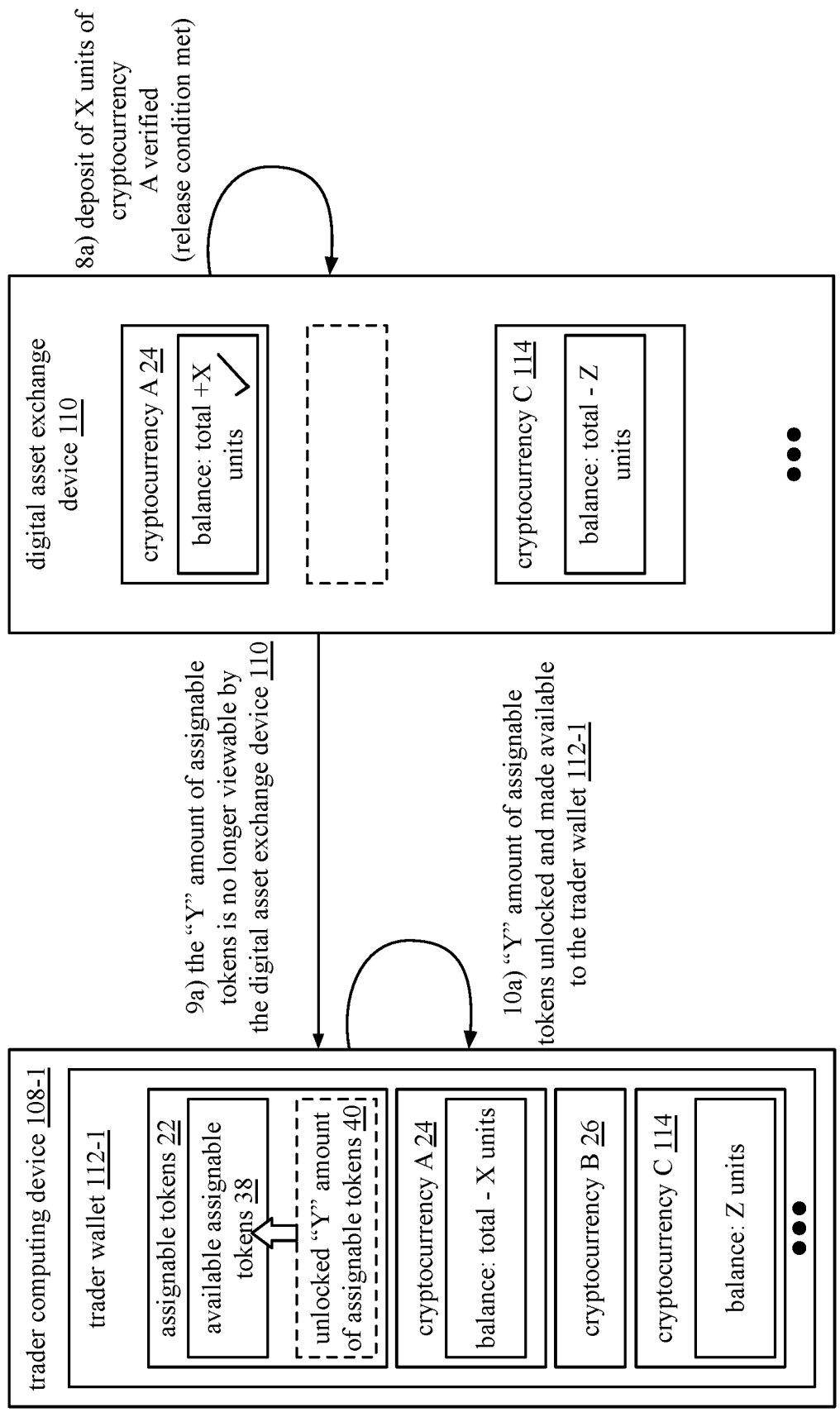
FIGS. 23A-23B are flowcharts of an example of a method of assigning conditional access rights to assignable tokens for real-time digital asset exchange in accordance with the present invention.
Figure 23B:
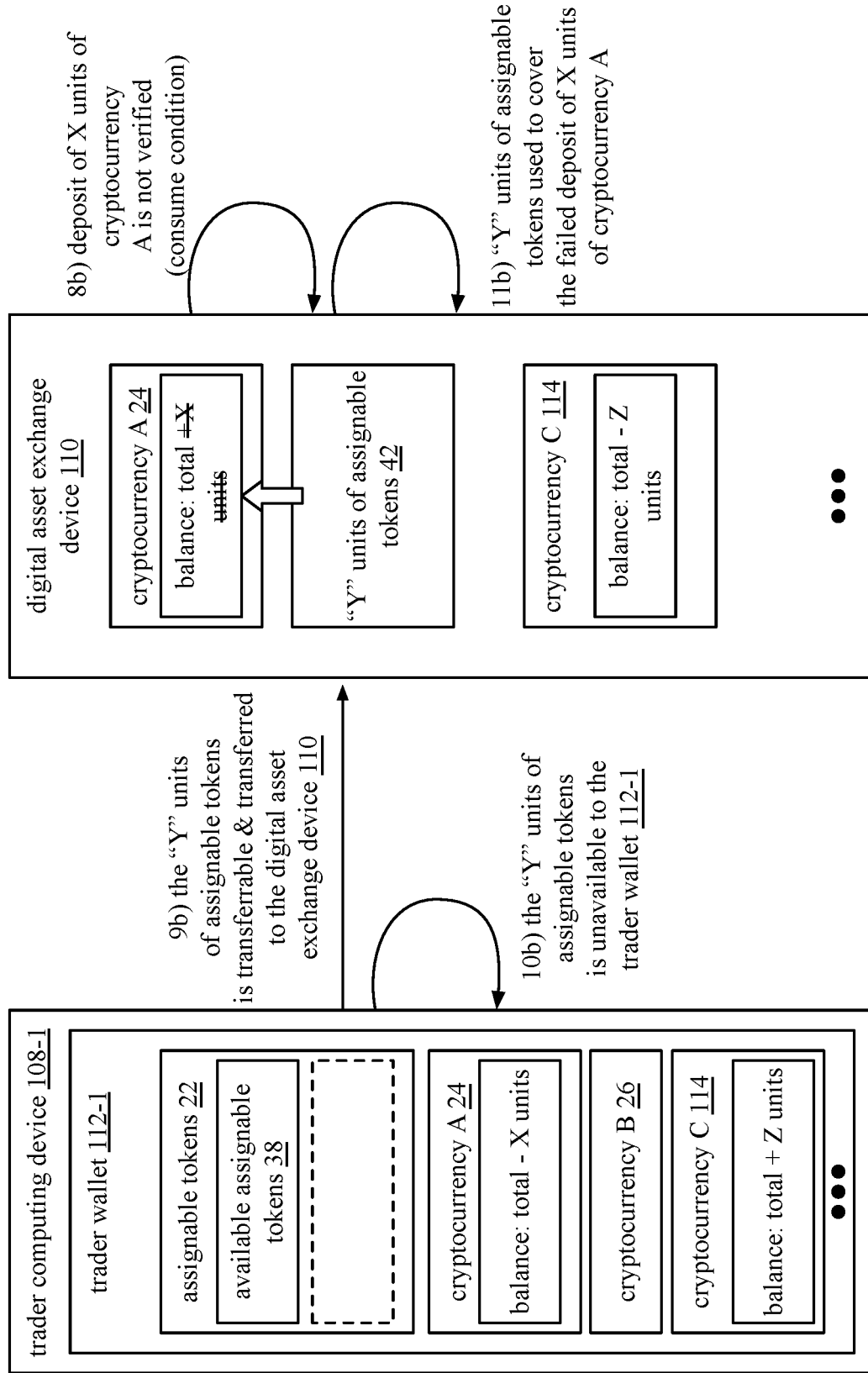

FIGS. 23A-23B are flowcharts of an example of a method of assigning conditional access rights to assignable tokens for real-time digital asset exchange. FIG. 23A continues the method of FIGS. 21-22 and depicts an example of detecting a release condition. The trader wallet 112-1 is now shown as storing Z units of cryptocurrency C 114 after the real-time exchange. The assignable token distributed ledger technology is operable to detect when a release condition occurs. For example, the smart contract code pertaining to the assignment of the amount of the assignable tokens receives one or more data inputs (e.g., other smart contracts) containing information related to the verification of a cryptocurrency deposit. The release condition is a successful verification of a cryptocurrency deposit.

The method continues with step 8a) where a release condition is met when the deposit of X units of cryptocurrency A is verified. For example, the smart contract code managed by the assignable token distributed ledger technology receives a data input indicating a successful verification. A release ends the assignment of the conditional access rights. The method continues with step 9a) where, when the release condition is detected, the Y amount of the assignable tokens is no longer viewable by digital asset exchange device 110. The method continues with step 10a) where the Y amount of the assignable tokens is unlocked and made available to the trader wallet 112-1. As such, a release involves removing the conditional access rights to the Y amount of assignable tokens provided to the digital asset exchange device 110 and making the Y amount of assignable tokens fully available to the trader wallet 112-1.

FIG. 23B continues the method of FIGS. 21-22 and depicts an example where a consume condition occurs. The trader wallet 112-1 is now shown as storing Z units of cryptocurrency C 114 after the real-time exchange. The smart contract code of the assignable token distributed ledger technology is operable to verify when a consume condition occurs. The consume condition is an unsuccessful verification of a cryptocurrency deposit. The method continues with step 8b) where a consume condition is met when the deposit of X units of cryptocurrency A is not verified. For example, the smart contract code managed by the assignable token distributed ledger technology receives a data input indicating an unsuccessful verification.

The method continues with step 9b) where, when the consume condition is met, the Y amount of the assignable tokens is transferrable (e.g., via an on-chain transaction) to the digital asset exchange device 110 and transferred to the digital asset exchange device 110 (e.g., automatically or based on an instruction from a data input). The method continues with step 10b) where the Y amount of assignable tokens is made unavailable to the trader wallet 112-1. The method continues with step 11b) where the digital asset exchange device 110 is operable to use the Y amount of assignable tokens to cover the failed deposit of X units of cryptocurrency A. As such, a consume involves making the Y amount of assignable tokens unavailable to the trader wallet 112-1 and transferrable to digital asset exchange device 110.

Figure 24:
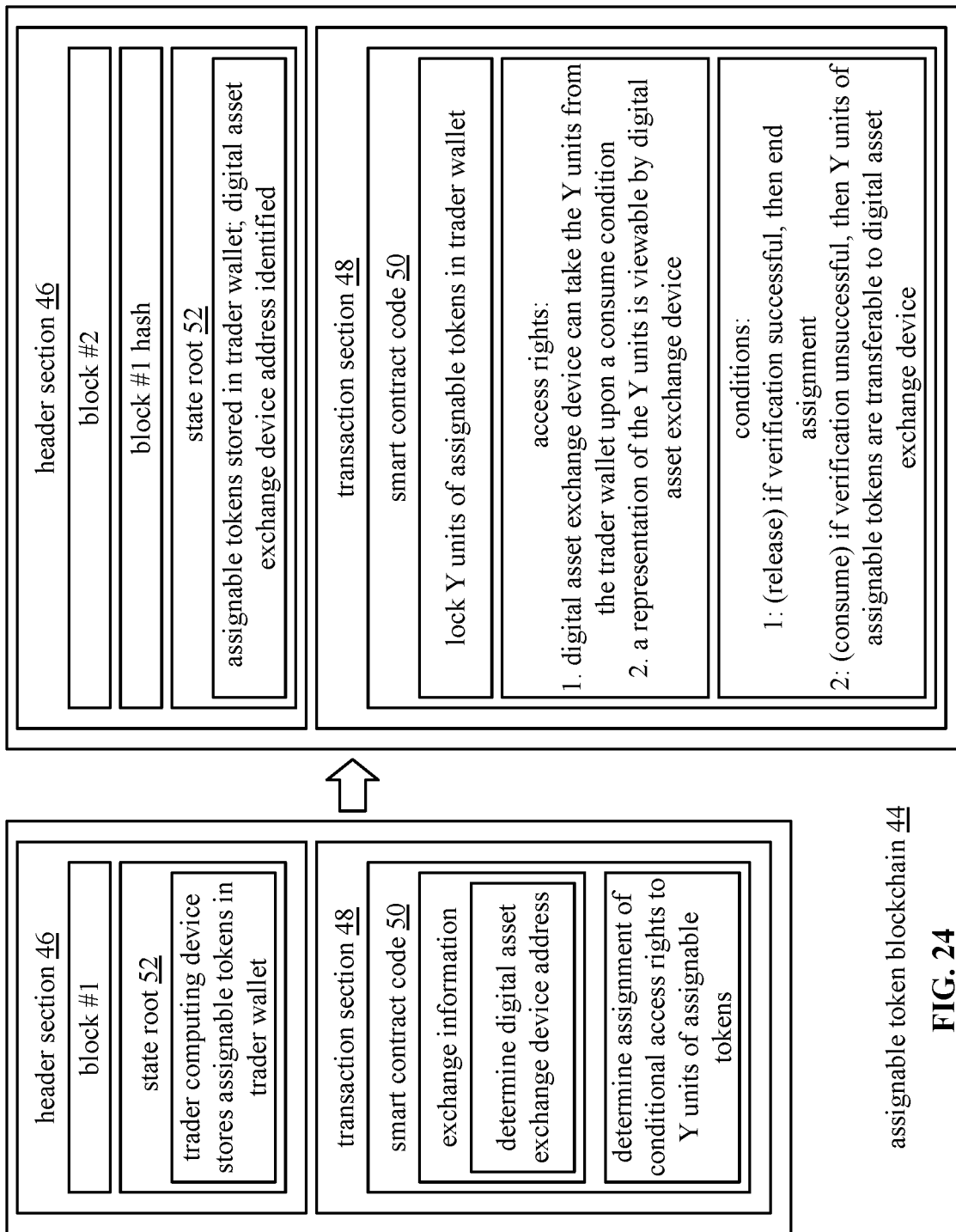
FIG. 24 is a schematic block diagram of an embodiment of an assignable token blockchain in accordance with the present invention.

FIG. 24 is a schematic block diagram of an embodiment of an assignable token blockchain 44. Assignable tokens are smart contracts that can be embedded in a blockchain or similar database implementation, and executable by network users. The assignable token blockchain 44 shown is based on a simplified version of an Ethereum blockchain. An Ethereum block includes a header section 46 and a transaction section 48. The structure of the Ethereum blockchain is similar to the structure of other traditional blockchains such as Bitcoin in that it is a shared record of the entire transaction history.

However, an Ethereum block stores not only transactions that have been collected since the last block in the blockchain was mined (like in Bitcoin) but also the recent "state" of each smart contract. A consensus network (i.e., a network of miners) is responsible for shifting the smart contract from state to state. The header section 46 includes these states in a root hash value (i.e., the state root 52) which summarizes the state changes. The header section 46 further includes other identifying information such as a block number and a hash of a previous block.

The transaction section 48 in Ethereum includes a nonce (a unique transaction identifier), an address of a recipient account, a value, a sending account's signature, code to be run (e.g., smart contract code 50), mining related fields (e.g., start gas and gas price), and possibly some data (e.g., input values for the code). Here, the transaction section 48 is shown as including the smart contract code 50 for simplicity.

FIG. 24 depicts an example of a trader computing device assigning conditional access rights to an amount of assignable tokens to a digital asset exchange device to back a real-time cryptocurrency exchange similar to the method discussed with reference to FIGS. 11-12. For simplicity, the assignment of conditional access rights to the amount of assignable tokens begins with block #1 although numerous blocks would proceed this block. The header section 46 of block #1 includes a state root 52 which includes a current summary of the states of the accounts of the system.

Here, state root 52 includes an entry that the trader computing device stores assignable tokens in a trader wallet. The transaction section 48 of block #1 includes smart contract code 50 which includes code for real-time exchange information (from a newly initiated exchange). The exchange information includes determining a destination address for the digital asset exchange device and determining to assign conditional access rights to Y units of assignable to back the real-time exchange. As block #1 is mined, the smart contract code 50 of block #1 runs.

The header section 46 of block #2 includes a hash of block #1 and a state root 52. The state root 52 includes information pertaining to the current state of the assignable token accounts. For example, the state root 52 of block #2 states that the trader computing device stores assignable tokens in its trader wallet and that a digital asset exchange device address has been identified.

The transaction section 48 of block #2 includes smart contract code 50 which includes the terms of the assignment of conditional access rights. For example, the smart contract code 50 states that Y units of assignable tokens are locked to the trader wallet and that digital asset exchange device is provided conditional access rights to the Y units (e.g., the access rights provided and the conditions to those access rights). In this example, the access rights include the digital asset exchange device's ability to take the Y units of assignable tokens upon detection of a consume condition and that the digital asset exchange device can view a representation of the Y units of assignable tokens (even though the digital asset exchange device does not store the Y units of assignable tokens). Other access rights may be possible. The set of conditions to the access rights includes a release condition, and a consume condition, however, more or less conditions are possible.

In this example, the release condition specifies that if verification of the cryptocurrency deposited by the trader computing device is successful, the assignment of conditional access rights ends. Definitions are included to specify what a successful verification is, how it is verified, and what ending the assignment of conditional access rights (i.e., executing a release) entails. For example, a release unlocks the Y units of assignable tokens to the trader wallet, removes the representation of the Y to the digital asset exchange device, and removes any access rights provided to the digital asset exchange device.

In this example, the consume condition specifies that if the verification of the cryptocurrency deposited by the trader computing device is unsuccessful, then the Y units of assignable tokens are transferrable to digital asset exchange device's address (e.g., as an on-chain transaction). For example, the Y units of assignable tokens may be automatically transferred upon a consume condition or upon a data input that instructs the transfer. Definitions are included to specify what an unsuccessful verification is and how it is verified. As block #2 is mined, the smart contract code 50 of block #2 runs.

Figure 25A:
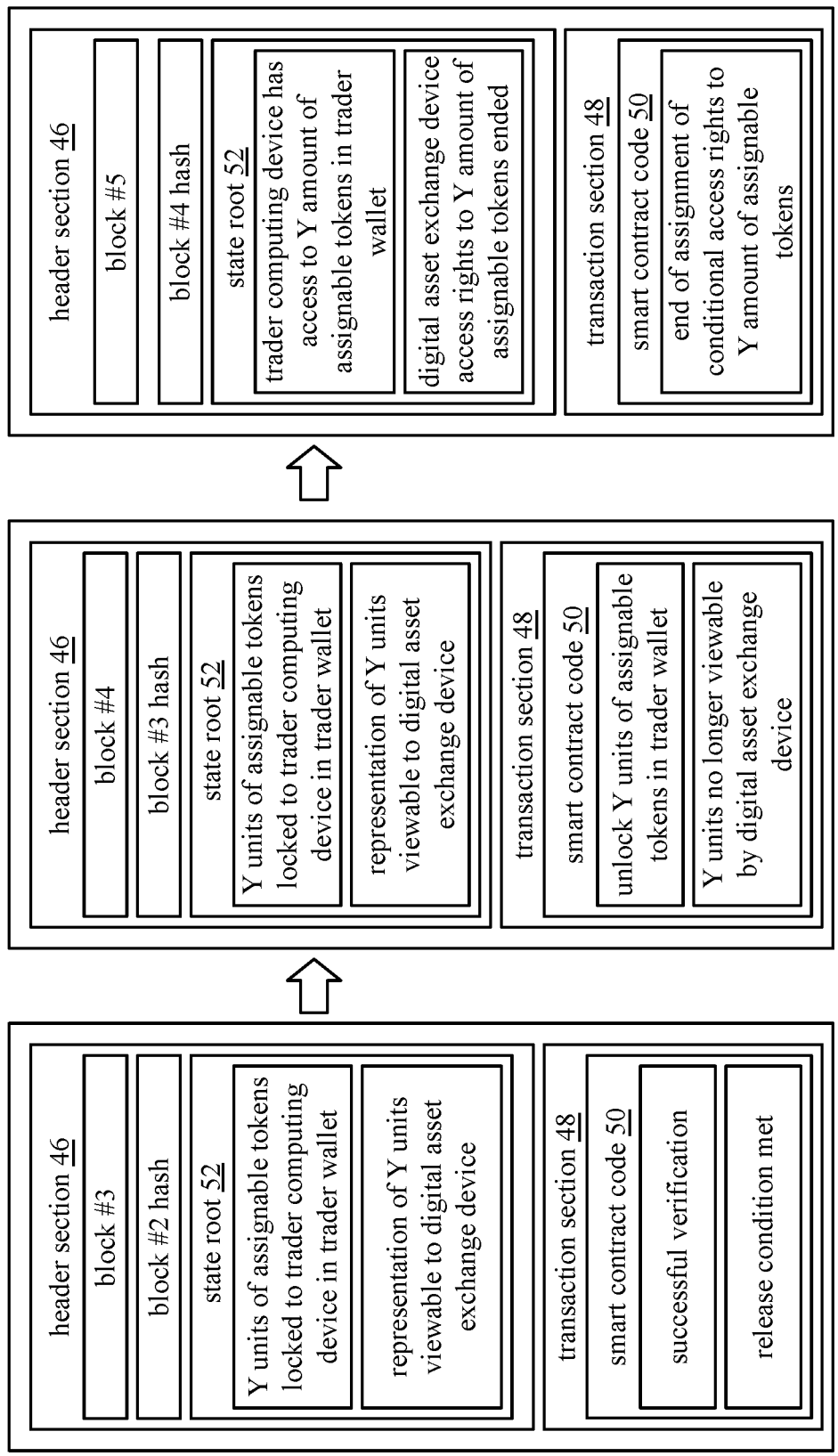
FIGS. 25A-25B are a schematic block diagrams of embodiments of an assignable token blockchain in accordance with the present invention.
Figure 25B:
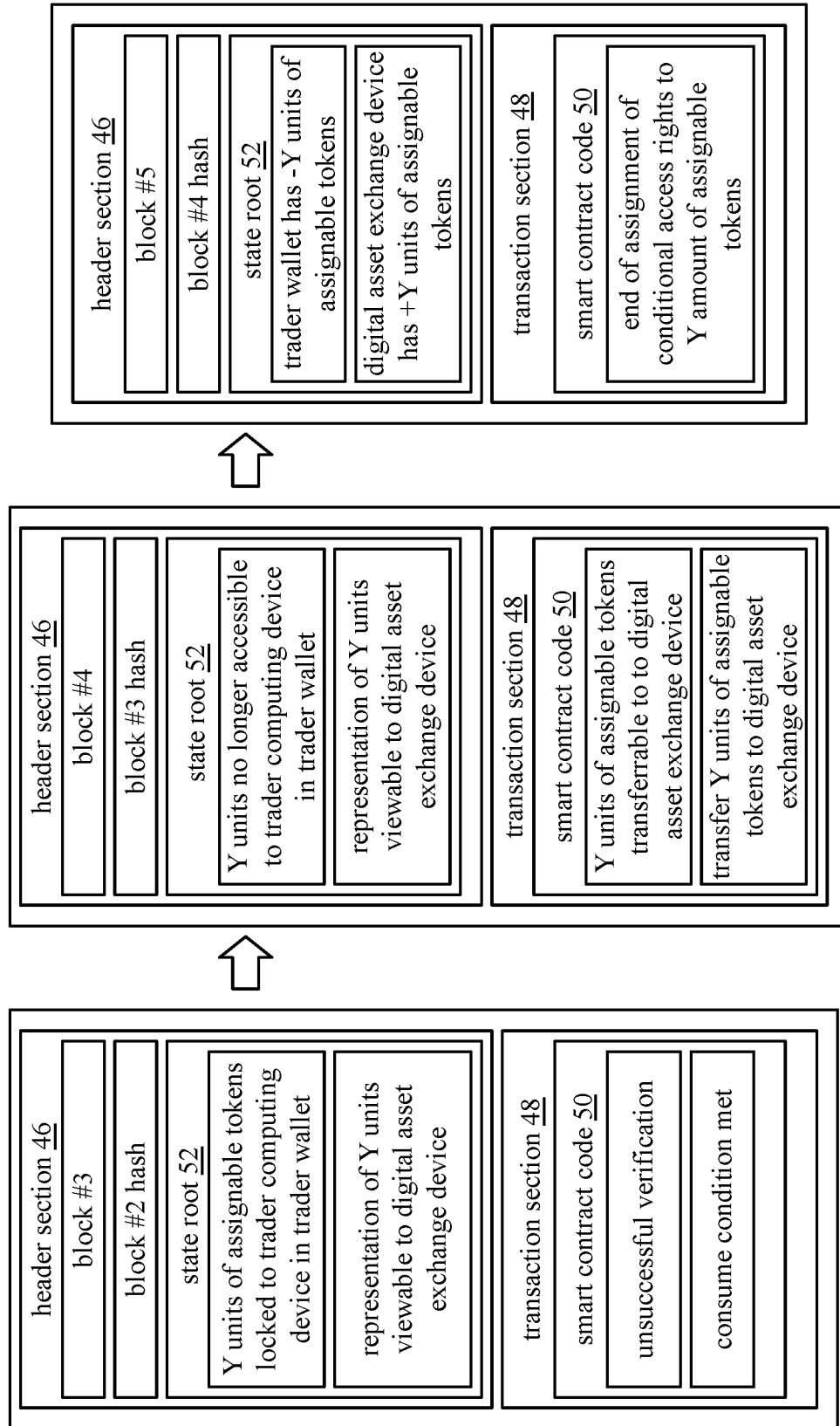

FIGS. 25A-25B are schematic block diagrams of an embodiment of an assignable token blockchain 44. FIG. 25A continues the example of FIG. 24 and includes an example of identifying a release condition. The header section 46 of block #3 includes a hash of block #2 and a state root 52. The state root 52 includes information pertaining to the current state of the assignable token accounts.

For example, the state root 52 of block #3 states that the Y units of assignable tokens are locked to the trader computing device in the trader wallet and that the digital asset exchange device can view a representation of the Y units of assignable tokens. The transaction section 48 of block #3 includes smart contract code 50 which includes an indication that the verification of the cryptocurrency deposited by the trader computing device is successful and that the release condition is met. For example, the assignable token blockchain 44 is provided a data input (e.g., another smart contract) indicating that the verification was successful.

The header section 46 of block #4 includes a hash of block #3 and a state root 52. The state root 52 includes information pertaining to the current state of the assignable token accounts. For example, the state root 52 of block #4 states that the Y units of assignable tokens are locked to the trader computing device in the trader wallet and are viewable to the digital asset exchange device. The transaction section 48 of block #4 includes smart contract code 50 which includes the actions associated with a release. Here, the release causes the Y units of assignable tokens to be unlocked in the trader wallet to the first computing device and for the digital asset exchange device to no longer have conditional access rights to the Y units (e.g., the Y units are no longer viewable to the digital asset exchange device and other access rights (ability to take) are removed).

The header section 46 of block #5 includes a hash of block #4 and a state root 52. The state root 52 includes information pertaining to the current state of the assignable token accounts. For example, the state root 52 of block #4 states that the trader computing device can access the Y units of assignable tokens in the trader wallet (e.g., the Y units of assignable tokens are unlocked to the trader computing device). The state root 52 of block #4 also states that the access rights to the Y units of assignable tokens provided to the digital asset exchange device has ended. The transaction section 48 of block #5 includes smart contract code 50 indicating that the assignment of conditional access rights to the Y amount of assignable tokens has ended.

FIG. 25B continues the example of FIG. 24 and includes an example of identifying a consume condition. The header section 46 of block #3 includes a hash of block #2 and a state root 52. The state root 52 includes information pertaining to the current state of the assignable token accounts.

For example, the state root 52 of block #3 states that the Y units of assignable tokens are locked to the trader computing device in the trader wallet and that the digital asset exchange device can view a representation of the Y units of assignable tokens. The transaction section 48 of block #3 includes smart contract code 50 which includes an indication that the verification of the cryptocurrency deposited by the trader computing device is unsuccessful and that the consume condition is met. For example, the assignable token blockchain is provided a data input (e.g., another smart contract) indicating that the verification was unsuccessful.

The header section 46 of block #4 includes a hash of block #3 and a state root 52. The state root 52 includes information pertaining to the current state of the assignable token accounts. For example, the state root 52 of block #4 states that the Y units of assignable tokens are no longer available to the trader computing device in the trader wallet and the digital asset exchange device can view a representation of the Y units of assignable tokens. The transaction section 48 of block #4 includes smart contract code 50 which includes the actions associated with a consume. Here, the consume causes the Y units of assignable tokens to be transferrable (e.g., as an on-chain transaction) to the digital asset exchange device's identified address. The smart contract code 50 further indicates a transfer of the Y units of assignable tokens (e.g., as an on-chain transaction) to the digital asset exchange device's address (e.g., in response to a data input).

The header section 46 of block #5 includes a hash of block #4 and a state root 52. The state root 52 includes information pertaining to the current state of the assignable token accounts. For example, the state root 52 of block #4 states that the Y units of assignable tokens have been removed from the trader computing device's trader wallet and that the digital asset exchange device's address now stores the Y units of assignable tokens. The transaction section 48 of block #5 includes smart contract code 50 indicating that the assignment of the conditional access rights to the Y amount of assignable tokens has ended.

It is noted that terminologies as may be used herein such as bit stream, stream, signal sequence, etc. (or their equivalents) have been used interchangeably to describe digital information whose content corresponds to any of a number of desired types (e.g., data, video, speech, text, graphics, audio, etc. any of which may generally be referred to as 'data').

As may be used herein, the terms "substantially" and "approximately" provides an industry-accepted tolerance for its corresponding term and/or relativity between items. For some industries, an industry-accepted tolerance is less than one percent and, for other industries, the industry-accepted tolerance is 10 percent or more. Other examples of industry-accepted tolerance range from less than one percent to fifty percent. Industry-accepted tolerances correspond to, but are not limited to, component values, integrated circuit process variations, temperature variations, rise and fall times, thermal noise, dimensions, signaling errors, dropped packets, temperatures, pressures, material compositions, and/or performance metrics. Within an industry, tolerance variances of accepted tolerances may be more or less than a percentage level (e.g., dimension tolerance of less than +/−1%). Some relativity between items may range from a difference of less than a percentage level to a few percent. Other relativity between items may range from a difference of a few percent to magnitude of differences.

As may also be used herein, the term(s) "configured to", "operably coupled to", "coupled to", and/or "coupling" includes direct coupling between items and/or indirect coupling between items via an intervening item (e.g., an item includes, but is not limited to, a component, an element, a circuit, and/or a module) where, for an example of indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to".

As may even further be used herein, the term "configured to", "operable to", "coupled to", or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item.

As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1. As may be used herein, the term "compares unfavorably", indicates that a comparison between two or more items, signals, etc., fails to provide the desired relationship.

As may be used herein, one or more claims may include, in a specific form of this generic form, the phrase "at least one of a, b, and c" or of this generic form "at least one of a, b, or c", with more or less elements than "a", "b", and "c". In either phrasing, the phrases are to be interpreted identically. In particular, "at least one of a, b, and c" is equivalent to "at least one of a, b, or c" and shall mean a, b, and/or c. As an example, it means: "a" only, "b" only, "c" only, "a" and "b", "a" and "c", "b" and "c", and/or "a", "b", and "c".

As may also be used herein, the terms "processing module", "processing circuit", "processor", "processing circuitry", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, processing circuitry, and/or processing unit may be, or further include, memory and/or an integrated memory element, which may be a single memory device, a plurality of memory devices, and/or embedded circuitry of another processing module, module, processing circuit, processing circuitry, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, processing circuitry, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, processing circuitry and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, processing circuitry and/or processing unit executes, hard coded and/or operational instructions corresponding to at least some of the steps and/or functions illustrated in one or more of the Figures. Such a memory device or memory element can be included in an article of manufacture.

One or more embodiments have been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality.

To the extent used, the flow diagram block boundaries and sequence could have been defined otherwise and still perform the certain significant functionality. Such alternate definitions of both functional building blocks and flow diagram blocks and sequences are thus within the scope and spirit of the claims. One of average skill in the art will also recognize that the functional building blocks, and other illustrative blocks, modules and components herein, can be implemented as illustrated or by discrete components, application specific integrated circuits, processors executing appropriate software and the like or any combination thereof.

In addition, a flow diagram may include a "start" and/or "continue" indication. The "start" and "continue" indications reflect that the steps presented can optionally be incorporated in or otherwise used in conjunction with one or more other routines. In addition, a flow diagram may include an "end" and/or "continue" indication. The "end" and/or "continue" indications reflect that the steps presented can end as described and shown or optionally be incorporated in or otherwise used in conjunction with one or more other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

The one or more embodiments are used herein to illustrate one or more aspects, one or more features, one or more concepts, and/or one or more examples. A physical embodiment of an apparatus, an article of manufacture, a machine, and/or of a process may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of one or more of the embodiments. A module implements one or more functions via a device such as a processor or other processing device or other hardware that may include or operate in association with a memory that stores operational instructions. A module may operate independently and/or in conjunction with software and/or firmware. As also used herein, a module may contain one or more sub-modules, each of which may be one or more modules.

As may further be used herein, a computer readable memory includes one or more memory elements. A memory element may be a separate memory device, multiple memory devices, or a set of memory locations within a memory device. Such a memory device may be a read-only memory, random access memory, volatile memory, non-volatile memory, static memory, dynamic memory, flash memory, cache memory, a quantum register or other quantum memory and/or any other device that stores data in a non-transitory manner. Furthermore, the memory device may be in a form of a solid-state memory, a hard drive memory or other disk storage, cloud memory, thumb drive, server memory, computing device memory, and/or other non-transitory medium for storing data. The storage of data includes temporary storage (i.e., data is lost when power is removed from the memory element) and/or persistent storage (i.e., data is retained when power is removed from the memory element). As used herein, a transitory medium shall mean one or more of: (a) a wired or wireless medium for the transportation of data as a signal from one computing device to another computing device for temporary storage or persistent storage; (b) a wired or wireless medium for the transportation of data as a signal within a computing device from one element of the computing device to another element of the computing device for temporary storage or persistent storage; (c) a wired or wireless medium for the transportation of data as a signal from one computing device to another computing device for processing the data by the other computing device; and (d) a wired or wireless medium for the transportation of data as a signal within a computing device from one element of the computing device to another element of the computing device for processing the data by the other element of the computing device. As may be used herein, a non-transitory computer readable memory is substantially equivalent to a computer readable memory. A non-transitory computer readable memory can also be referred to as a non-transitory computer readable storage medium.

While particular combinations of various functions and features of the one or more embodiments have been expressly described herein, other combinations of these features and functions are likewise possible. The present disclosure is not limited by the particular examples disclosed herein and expressly incorporates these other combinations.

What is claimed is:

1. A method comprises:
storing, by a trader computing device, assignable tokens in a structure having a partitioning scheme, wherein a first dimension of the structure having the partitioning scheme represents addresses, wherein a second dimension of the structure having the partitioning scheme represents partitions, and wherein a first address of the addresses includes a first plurality of partitions of the partitions;

sending, by the trader computing device, an amount of a first digital asset to a digital asset exchange device for a real-time digital asset-based exchange of the amount of the first digital asset to an amount of a second digital asset, wherein the digital asset exchange device facilitates digital asset exchanges between a plurality of trader computing devices;

determining, by the trader computing device, to assign conditional access rights to an amount of assignable tokens of the assignable tokens to the digital asset exchange device to back the real-time digital asset-based exchange, wherein the conditional access rights are in accordance with a set of conditions, wherein the assignment of the conditional access rights is a self-enforcing smart contract embedded in an assignable token distributed ledger technology, and wherein the self-enforcing smart contract is operable to verify one or more aspects of the real-time digital asset-based exchange;

locking, by the trader computing device and in accordance with the self-enforcing smart contract, the amount of the assignable tokens in the first address, wherein the first address is associated with the trader computing device;

transferring, by the trader computing device, the amount of assignable tokens to a first partition of the first plurality of partitions;

providing, by the trader computing device and in accordance with the self-enforcing smart contract, the conditional access rights to the amount of the assignable tokens in the first partition to the digital asset exchange device;

exchanging, by the digital asset exchange device, the amount of the first digital asset to the amount of the second digital asset, wherein the amount of the first digital asset is substantially equivalent to the amount of the second digital asset; and sending, by the digital asset exchange device, the amount of the second digital asset to the trader computing device.

2. The method of claim 1, wherein the set of conditions includes:
one or more release conditions; and
one or more consume conditions.

3. The method of claim 2, wherein the self-enforcing smart contract is operable to detect a release condition of the one or more release conditions, wherein the detection of the release condition triggers a release, wherein the release includes:
unlocking, by the trader computing device in accordance with the self-enforcing smart contract, the amount of the assignable tokens stored in the first address; and
terminating, by the trader computing device in accordance with the self-enforcing smart contract, the conditional access rights to the amount of the assignable tokens to the digital asset exchange device.

4. The method of claim 2, wherein the self-enforcing smart contract is operable to detect a consume condition of the one or more consume conditions, wherein the detection of the consume condition triggers a consume, wherein the consume includes:

rendering, by the trader computing device in accordance with the self-enforcing smart contract, the amount of the assignable tokens transferrable to the digital asset exchange device; and rendering, by the trader computing device in accordance with the self-enforcing smart contract, the amount of the assignable tokens unavailable to the trader computing device.

5. The method of claim 2, wherein a release condition of the one or more release conditions includes one of:
a verification that the amount of a first digital asset is successfully obtained by the digital asset exchange device; and
an authorized termination of the exchange.

6. The method of claim 2, wherein a consume condition of the one or more consume conditions includes one of:
a verification that the amount of a first digital asset is not successfully obtained by the digital asset exchange device; and
an unauthorized termination of the exchange.

7. The method of claim 1, wherein the determining to assign conditional access rights to the amount of the assignable tokens to the digital asset exchange device further comprises:
receiving, by the trader computing device, a request to assign the conditional access rights from the digital asset exchange device.

8. The method of claim 1, wherein the assignable token distributed ledger technology comprises:
an assignable token blockchain operable to execute self-enforcing smart contracts.

9. The method of claim 1, wherein the self-enforcing smart contract is operable to verify one or more aspects of the exchange by one or more of:
receiving, by the self-enforcing smart contract, one or more data inputs containing information related to the one or more aspects of the exchange; and
verifying, by the self-enforcing smart contract, information related to the one or more aspects of the exchange included in the self-enforcing smart contract.

10. The method of claim 1, wherein access rights of the conditional access rights include one or more of:
a right to take the amount of the assignable tokens via an on-chain transaction;
a right to view a representation of the amount of assignable tokens;
a right to lock at least a portion of the amount of assignable tokens;
a right to unlock at least a portion of the amount of assignable tokens;
a right to assign at least a portion of the amount of assignable tokens;
a right to transfer at least a portion of the amount of assignable tokens;
a right to move at least a portion of the amount of assignable tokens; and
a right to exchange at least a portion of the amount of assignable tokens.

11. A non-transitory computer readable memory comprises:
a first memory element that stores operational instructions that, when executed by a trader computing device, causes the trader computing device to:
store assignable tokens in a structure having a partitioning scheme, wherein a first dimension of the structure having the partitioning scheme represents addresses, wherein a second dimension of the structure having the partitioning scheme represents partitions, and wherein a first address of the addresses includes a first plurality of partitions of the partitions;

send an amount of a first digital asset to a digital asset exchange device for a real-time digital asset-based exchange of the amount of the first digital asset to an amount of a second digital asset, wherein the digital asset exchange device facilitates digital asset exchanges between a plurality of trader computing devices;

determine to assign conditional access rights to an amount of assignable tokens of the assignable tokens to the digital asset exchange device to back the real-time digital asset-based exchange, wherein the conditional access rights are in accordance with a set of conditions, wherein the assignment of the conditional access rights is a self-enforcing smart contract embedded in an assignable token distributed ledger technology, and wherein the self-enforcing smart contract is operable to verify one or more aspects of the real-time digital asset-based exchange;

lock in accordance with the self-enforcing smart contract, the amount of the assignable tokens of the assignable tokens in the first address, wherein the first address is associated with the trader computing device;

transfer the amount of assignable tokens to a first partition of the first plurality of partitions; and provide in accordance with the self-enforcing smart contract, the conditional access rights to the amount of the assignable tokens in the first partition to the digital asset exchange device; and a second memory element that stores operational instructions that, when executed by the digital asset exchange device, causes the digital asset exchange device to:

exchange the amount of the first digital asset to the amount of the second digital asset, wherein the amount of the first digital asset is substantially equivalent to the amount of the second digital asset; and send the amount of the second digital asset to the trader computing device.

12. The non-transitory computer readable memory of claim 11, wherein the set of conditions includes:
one or more release conditions; and
one or more consume conditions.

13. The non-transitory computer readable memory of claim 12, wherein the first memory element further stores operational instructions that, when executed by the trader computing device, causes the trader computing device to, in accordance with the self-enforcing smart contract, detect a release condition of the one or more release conditions, wherein the detection of the release condition triggers a release, wherein the release includes:
unlocking the amount of the assignable tokens stored in the first address; and
terminating the conditional access rights to the amount of the assignable tokens to the digital asset exchange device.

14. The non-transitory computer readable memory of claim 12, wherein the first memory element further stores operational instructions that, when executed by the trader computing device, causes the trader computing device to, in accordance with the self-enforcing smart contract, detect a consume condition of the one or more consume conditions, wherein the detection of the consume condition triggers a consume, wherein the consume includes:
rendering the amount of the assignable tokens transferrable to the digital asset exchange device; and
rendering the amount of the assignable tokens unavailable to the trader computing device.

15. The non-transitory computer readable memory of claim 12, wherein a release condition of the one or more release conditions includes one of:
a verification that the amount of a first digital asset is successfully obtained by the digital asset exchange device; and
an authorized termination of the exchange.

16. The non-transitory computer readable memory of claim 12, wherein a consume condition of the one or more consume conditions includes one of:
a verification that the amount of a first digital asset is not successfully obtained by the digital asset exchange device; and
an unauthorized termination of the exchange.

17. The non-transitory computer readable memory of claim 11, wherein the first memory element further stores operational instructions that, when executed by the trader computing device, causes the trader computing device to determine to assign conditional access rights to the amount of the assignable tokens to the digital asset exchange device by:
receiving a request to assign the conditional access rights from the digital asset exchange device.

18. The non-transitory computer readable memory of claim 11, wherein the assignable token distributed ledger technology comprises:
an assignable token blockchain operable to execute self-enforcing smart contracts.

19. The non-transitory computer readable memory of claim 11, wherein the self-enforcing smart contract is operable to verify one or more aspects of the exchange by one or more of:
receiving one or more data inputs containing information related to the one or more aspects of the exchange; and
verifying information related to the one or more aspects of the exchange included in the self-enforcing smart contract.

20. The non-transitory computer readable memory of claim 11, wherein access rights of the conditional access rights include one or more of:
a right to take the amount of the assignable tokens via an on-chain transaction;
a right to view a representation of the amount of assignable tokens;
a right to lock at least a portion of the amount of assignable tokens;
a right to unlock at least a portion of the amount of assignable tokens;
a right to assign at least a portion of the amount of assignable tokens;
a right to transfer at least a portion of the amount of assignable tokens;
a right to move at least a portion of the amount of assignable tokens; and
a right to exchange at least a portion of the amount of assignable tokens.

* * * * *